(12) United States Patent
Hu et al.

(10) Patent No.: US 12,538,340 B2
(45) Date of Patent: Jan. 27, 2026

(54) DATA TRANSMISSION FOR SIGNALING FIELDS IN A PHYSICAL LAYER PROTOCOL DATA UNIT

(71) Applicant: Huawei Technologies Co., Ltd., Shenzhen (CN)

(72) Inventors: Mengshi Hu, Shenzhen (CN); Jian Yu, Shenzhen (CN); Ming Gan, Shenzhen (CN); Dandan Liang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 411 days.

(21) Appl. No.: 18/048,529

(22) Filed: Oct. 21, 2022

(65) Prior Publication Data

US 2023/0093344 A1 Mar. 23, 2023

Related U.S. Application Data

(63) Continuation of application No. PCT/CN2021/088222, filed on Apr. 19, 2021.

(30) Foreign Application Priority Data

Apr. 22, 2020 (CN) .......................... 202010324346.2

(51) Int. Cl.
*H04W 72/53* (2023.01)
*H04L 5/00* (2006.01)
(Continued)

(52) U.S. Cl.
CPC ........... *H04W 72/53* (2023.01); *H04L 5/0044* (2013.01); *H04W 72/0453* (2013.01); *H04W 84/12* (2013.01)

(58) Field of Classification Search
CPC . H04W 72/53; H04W 72/0453; H04W 84/12; H04W 72/535; H04L 5/0044; H04L 5/0005; H04L 5/0094; H04L 27/2602
(Continued)

(56) References Cited

U.S. PATENT DOCUMENTS

2016/0080043 A1 3/2016 Tian et al.
2017/0048862 A1 2/2017 Choi et al.
(Continued)

FOREIGN PATENT DOCUMENTS

CN 105589506 A 5/2016
CN 110140374 A 8/2019
(Continued)

OTHER PUBLICATIONS

Mengshi Hu et al,"Spoofing Indication in EHT-SIG",IEEE 802.11-20/0971r0,Jun. 30, 2020,total 12 pages.
(Continued)

*Primary Examiner* — Ayman A Abaza
*Assistant Examiner* — Tracy L Williams
(74) *Attorney, Agent, or Firm* — SLATER MATSIL, LLP

(57) ABSTRACT

A method includes: generating a signaling field of a PPDU, and sending a signaling field on a first frequency domain segment, where a channel bandwidth for transmitting the PPDU includes at least two frequency domain segments, at least two frequency domain segments include the first frequency domain segment, and a resource unit allocation subfield in the signaling field indicates a resource unit RU included in the channel bandwidth for transmitting the PPDU, and indicates a quantity of user fields corresponding to an RU that is in the RU and that is allocated to a station parking on the first frequency domain segment. This application may be applied to a Wi-Fi system such as 802.11be or an extremely high throughput EHT.

20 Claims, 23 Drawing Sheets

(51) Int. Cl.
*H04W 72/0453* (2023.01)
*H04W 84/12* (2009.01)

(58) Field of Classification Search
USPC .......................................................... 370/329
See application file for complete search history.

(56) References Cited

U.S. PATENT DOCUMENTS

| | | | |
|---|---|---|---|
| 2017/0230981 | A1 | 8/2017 | Ryu et al. |
| 2018/0184429 | A1 | 6/2018 | Gan et al. |
| 2019/0069298 | A1 | 2/2019 | Chen et al. |
| 2019/0215213 | A1* | 7/2019 | Choi ........................ H04L 25/38 |
| 2019/0373586 | A1 | 12/2019 | Verma et al. |
| 2020/0076552 | A1* | 3/2020 | Cherian ................ H04L 5/0035 |
| 2020/0177425 | A1* | 6/2020 | Chen ................... H04L 27/2602 |
| 2021/0314922 | A1* | 10/2021 | Lim ...................... H04L 5/0044 |
| 2021/0329628 | A1* | 10/2021 | Hu ......................... H04W 74/04 |
| 2022/0095347 | A1* | 3/2022 | Huang ................... H04L 1/0047 |
| 2023/0016370 | A1* | 1/2023 | Kim ....................... H04L 5/0053 |
| 2023/0155755 | A1* | 5/2023 | Lim .......................... H04L 1/00 |
| | | | 370/329 |

FOREIGN PATENT DOCUMENTS

| | | |
|---|---|---|
| CN | 110460415 A | 11/2019 |
| CN | 110768757 A | 2/2020 |
| JP | 2019503151 A | 1/2019 |
| JP | 7528255 B2 | 8/2024 |

OTHER PUBLICATIONS

Vermani, S. et al., "U-SIG Structure and Preamble Processing", IEEE 802.11-20/0380R0, Mar. 2020, 10 pages.

Liu, J., "Efficient EHT Preamble Design", IEEE 802.11-20/0439R0, Mar. 2020, 10 pages.

IEEE P802.11ax/D4.3, Aug. 2019, Draft Standard for Information technology—Tele-communications and information exchange between systems Local and metropolitan area network—Specific requirements, Aug. 2019, 782 pages.

IEEE Std 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Dec. 7, 2016, 3534 pages.

* cited by examiner

| CC1 | Resource unit allocation subfield 1 (484 (1)) | Resource unit allocation subfield 3 (484 (1)) | Resource unit allocation subfield 5 (484 (0)) | Resource unit allocation subfield 7 (484 (1)) | ... |
|---|---|---|---|---|---|
| CC2 | Resource unit allocation subfield 2 (484 (1)) | Resource unit allocation subfield 4 (484 (1)) | Resource unit allocation subfield 6 (484 (0)) | Resource unit allocation subfield 8 (484 (0)) | ... |

FIG. 8B

| | | | | | |
|---|---|---|---|---|---|
| CC3 | Resource unit allocation subfield 17 (996 (0)) | Resource unit allocation subfield 19 (996 (0)) | Resource unit allocation subfield 21 (242 (4)) | Resource unit allocation subfield 23 (484 (0)) | ... |
| CC4 | Resource unit allocation subfield 18 (996 (0)) | Resource unit allocation subfield 20 (996 (0)) | Resource unit allocation subfield 22 (nine 26s) | Resource unit allocation subfield 24 (484 (0)) | ... |

FIG. 8D

DATA TRANSMISSION FOR SIGNALING FIELDS IN A PHYSICAL LAYER PROTOCOL DATA UNIT

CROSS-REFERENCE TO RELATED APPLICATIONS

This application is a continuation of International Application No. PCT/CN2021/088222, filed on Apr. 19, 2021, which claims priority to Chinese Patent Application No. 202010324346.2, filed on Apr. 22, 2020. The disclosures of the aforementioned applications are hereby incorporated by reference in their entireties.

TECHNICAL FIELD

This application relates to the field of communication technologies, and in particular, to a data transmission method and a related apparatus.

BACKGROUND

With the development of a wireless local area network (WLAN), an orthogonal frequency division multiple access (OFDMA) technology is newly introduced, and an entire bandwidth is divided into a plurality of resource units (RUS). In other words, frequency domain resources of users are allocated by resource units instead of by channels. For example, a 20 MHz channel may include a plurality of RUs, which may be a 26-tone RU, a 52-tone RU, and a 106-tone RU, where tone indicates a quantity of subcarriers. In addition, the RU may also be a 242-tone RU, a 484-tone RU, a 996-tone RU, or the like.

In 802.11ax, a high efficiency signaling field (HE-SIG-B) in a physical layer protocol data unit (PPDU) sent by an access point to each of a plurality of stations includes a common field. The common field includes a plurality of resource unit allocation subfields (RU Allocation subfields), and the resource unit allocation subfields in the common field are used to indicate a plurality of resource units. A user specific field in the HE-SIG-B includes all user fields corresponding to each resource unit allocation subfield. In this case, the HE-SIG-B sent to each station includes all user fields corresponding to each resource unit allocation subfield.

With the development of WLAN technologies, to enable the PPDU transmitted by the access point to support more station users, increasingly more user fields in the signaling field of the PPDU need to be transmitted. Consequently, signaling overheads are increasingly large.

SUMMARY

Embodiments of this application provide a data transmission method and a related apparatus, to reduce overheads of a signaling field of a PPDU.

According to a first aspect, an implementation of this application provides a data transmission method, including: generating a signaling field of a physical layer protocol data unit PPDU, where a channel bandwidth for transmitting the PPDU includes at least two frequency domain segments, and the at least two frequency domain segments include a first frequency domain segment, where the signaling field is transmitted on the first frequency domain segment, and includes a common field and a user specific field, the common field includes a resource unit allocation subfield, and the user specific field includes a user field; the resource unit allocation subfield indicates a resource unit RU included in the channel bandwidth for transmitting the PPDU, and indicates a quantity of user fields corresponding to an RU that is in the RU and that is allocated to a station parking on the first frequency domain segment; and the quantity of user fields corresponding to the RU allocated to the station parking on the first frequency domain segment represents a quantity of user fields that are contributed by the RU to one content channel in the user specific field, and the user field is a user field corresponding to the station parking on the first frequency domain segment; and sending the signaling field on the first frequency domain segment.

In this way, in the signaling field transmitted on the first frequency domain segment, the resource unit allocation subfield indicates the resource unit RU included in the channel bandwidth for transmitting the PPDU, and indicates the quantity of user fields corresponding to the RU that is in the RU and that is allocated to the station parking on the first frequency domain segment, but does not indicate, based on an actual resource unit allocation case, a quantity of users not allocated to the station parking on the first frequency domain segment, so that the user field can be simplified. In the user specific field part, a user field corresponding to an RU that does not park on the first frequency domain segment can be omitted or simplified, so that overheads of the signaling field of the PPDU can be reduced by reducing a quantity of user fields.

In some implementations, the resource unit allocation subfield indicates that a quantity of user fields corresponding to an RU that is in the resource unit RU included in the channel bandwidth for transmitting the PPDU and that is not allocated to the station parking on the first frequency domain segment is 0, and the RU not allocated to the station parking on the first frequency domain segment is an RU greater than or equal to a 242-tone RU. In this way, a user field corresponding to the RU greater than or equal to the 242-tone RU can be omitted, so that overheads of the signaling field can be effectively reduced.

In some implementations, a quantity, indicated by the resource unit allocation subfield, of user fields corresponding to an RU not allocated to the station parking on the first frequency domain segment is less than a quantity of user fields actually corresponding to the RU not allocated to the station parking on the first frequency domain segment. In this way, a quantity of user fields in the signaling field transmitted on the first frequency domain segment can be reduced, so that overheads of the signaling field can be reduced.

In some implementations, the RU that is indicated by the resource unit allocation subfield and that is not allocated to the station parking on the first frequency domain segment is actually at least two RUs not allocated to the station parking on the first frequency domain segment. In this way, the at least two RUs not allocated to the station parking on the first frequency domain segment are indicated as one RU together, and an indication manner of the resource unit allocation subfield is simplified, so that a quantity of user fields corresponding to the at least two RUs is smaller, and overheads of the signaling field can be reduced.

In some implementations, the at least two RUs are RUs less than a 242-tone RU. In this way, compared with a conventional technology in which the resource unit allocation subfield provides an indication based on the actual resource unit allocation case and each small RU needs to correspond to one user field, in the solutions of this application, the at least two small RUs not allocated to the station parking on the first frequency domain segment are indicated as one RU together. In this way, the RU needs to correspond to only one user field, so that an indication of one user field can be omitted, and overheads of the signaling field can be reduced.

According to a second aspect, an implementation of this application further provides a data transmission method, including: A station parking on a first frequency domain segment receives a signaling field of a physical layer protocol data unit PPDU on the first frequency domain segment, where a channel bandwidth for transmitting the PPDU includes at least two frequency domain segments, and the at least two frequency domain segments include the first frequency domain segment, where the signaling field includes a common field and a user specific field, the common field includes a resource unit allocation subfield, and the user specific field includes a user field; the resource unit allocation subfield indicates a resource unit RU in the channel bandwidth for transmitting the PPDU, and indicates a quantity of user fields corresponding to an RU that is in the RU and that is allocated to the station parking on the first frequency domain segment; and the quantity of user fields corresponding to the RU allocated to the station parking on the first frequency domain segment represents a quantity of user fields that are contributed by the RU to one content channel in the user specific field, and the user field is a user field corresponding to the station parking on the first frequency domain segment; and the station obtains, from the user field included in the user specific field in the received signaling field, a user field that carries an identifier of the station, and obtains data transmitted on an RU corresponding to the user field.

In this way, in the signaling field received by the station on the first frequency domain segment, the resource unit allocation subfield indicates the resource unit RU included in the channel bandwidth for transmitting the PPDU, and indicates the quantity of user fields corresponding to the RU that is in the RU and that is allocated to the station parking on the first frequency domain segment, but does not indicate, based on an actual resource unit allocation case, a quantity of users not allocated to the station parking on the first frequency domain segment, so that the user field can be simplified. In the user specific field part, a user field corresponding to an RU that does not park on the first frequency domain segment can be omitted or simplified, so that overheads of the signaling field of the PPDU can be reduced by reducing a quantity of user fields.

In some implementations, the resource unit allocation subfield indicates that a quantity of user fields corresponding to an RU that is in the resource unit RU included in the channel bandwidth for transmitting the PPDU and that is not allocated to the station parking on the first frequency domain segment is 0, and the RU not allocated to the station parking on the first frequency domain segment is an RU greater than or equal to a 242-tone RU. In this way, a user field corresponding to the RU greater than or equal to the 242-tone RU can be omitted, so that overheads of the signaling field can be effectively reduced.

In some implementations, a quantity, indicated by the resource unit allocation subfield, of user fields corresponding to an RU not allocated to the station parking on the first frequency domain segment is less than a quantity of user fields actually corresponding to the RU not allocated to the station parking on the first frequency domain segment. In this way, a quantity of user fields in the signaling field transmitted on the first frequency domain segment can be reduced, so that overheads of the signaling field can be reduced.

In some implementations, the RU that is indicated by the resource unit allocation subfield and that is not allocated to the station parking on the first frequency domain segment is actually at least two RUs not allocated to the station parking on the first frequency domain segment. In this way, the at least two RUs not allocated to the station parking on the first frequency domain segment are indicated as one RU together, so that a quantity of user fields corresponding to the at least two RUs is smaller, and overheads of the signaling field can be reduced.

In some implementations, the at least two RUs are RUs less than a 242-tone RU. In this way, compared with a conventional technology in which the resource unit allocation subfield provides an indication based on the actual resource unit allocation case and each small RU needs to correspond to one user field, in the solutions of this application, the at least two small RUs allocated to the station parking on the first frequency domain segment are indicated as one RU together. In this way, the RU needs to correspond to only one user field, so that an indication of one user field can be omitted, and overheads of the signaling field can be reduced.

According to a third aspect, an implementation of this application further provides a data transmission method, including: generating a signaling field of a physical layer protocol data unit PPDU, where a channel bandwidth for transmitting the PPDU includes at least two frequency domain segments, and the at least two frequency domain segments include a first frequency domain segment; and sending the signaling field on the first frequency domain segment, where the signaling field includes a common field and a user specific field, the common field includes a resource unit allocation subfield, and the user specific field includes a user field; the resource unit allocation subfield indicates a resource unit RU in the channel bandwidth for transmitting the PPDU; an RU indicated by at least one resource unit allocation subfield included in the common field is a plurality of RUs less than a 242-tone RU; and each RU in the plurality of RUs less than the 242-tone RU corresponds to at least one user field, a user field corresponding to at least one first RU carries an identifier of a station parking on the first frequency domain segment, a user field corresponding to at least one second RU does not carry the identifier of the station parking on the first frequency domain segment, and at least a part of subcarriers corresponding to the second RU indicated by the resource unit allocation subfield belong to at least two RUs.

In this way, compared with a manner of indicating the two RUs based on an actual case and indicating that each RU in the at least two RUs corresponds to at least one user field, in the solutions of this application, in the first signaling field transmitted on the first frequency domain segment, the resource unit allocation subfield indicates the at least two RUs as one RU through combination, and the RU corresponds to only one user field. Therefore, a quantity of user fields corresponding to a plurality of contiguous small RUs not allocated to the STA parking on the first frequency domain segment can be effectively reduced, so that overheads of the signaling field can be reduced.

According to a fourth aspect, an implementation of this application further provides a data transmission method, including: A station parking on a first frequency domain segment receives a signaling field of a physical layer protocol data unit PPDU on the first frequency domain segment, where a channel bandwidth for transmitting the PPDU includes at least two frequency domain segments, and the at least two frequency domain segments include the first frequency domain segment, where the signaling field includes a common field and a user specific field, the common field includes a resource unit allocation subfield, and the user specific field includes a user field; the resource unit allocation subfield indicates a resource unit RU in the channel bandwidth for transmitting the PPDU; an RU indicated by at least one resource unit allocation subfield included in the common field is a plurality of RUs less than a 242-tone RU; and each RU in the plurality of RUs less than the 242-tone RU corresponds to at least one user field, a user field corresponding to at least one first RU carries an identifier of the station parking on the first frequency domain segment, a user field corresponding to at least one second RU does not carry the identifier of the station parking on the first frequency domain segment, and at least a part of subcarriers corresponding to the second RU indicated by the resource unit allocation subfield belong to at least two RUs; and the station obtains, from the user field included in the user specific field, a user field that carries the identifier of the station, and obtains data transmitted on an RU corresponding to the user field.

In this way, compared with a manner of indicating the two RUs based on an actual case and indicating that each RU in the at least two RUs corresponds to at least one user field, in the solutions of this application, in the first signaling field received by the station on the first frequency domain segment, the resource unit allocation subfield indicates the at least two RUs as one RU through combination, and the RU corresponds to only one user field. Therefore, a quantity of user fields corresponding to a plurality of contiguous small RUs not allocated to the STA parking on the first frequency domain segment can be effectively reduced, so that overheads of the signaling field can be reduced.

According to a fifth aspect, an implementation of this application further provides a data transmission apparatus, including a processing unit and a transceiver unit, where the processing unit is configured to generate a signaling field of a physical layer protocol data unit PPDU, where a channel bandwidth for transmitting the PPDU includes at least two frequency domain segments, and the at least two frequency domain segments include a first frequency domain segment, where the signaling field is transmitted on the first frequency domain segment, and includes a common field and a user specific field, the common field includes a resource unit allocation subfield, and the user specific field includes a user field; the resource unit allocation subfield indicates a resource unit RU included in the channel bandwidth for transmitting the PPDU, and indicates a quantity of user fields corresponding to an RU that is in the RU and that is allocated to a station parking on the first frequency domain segment; and the quantity of user fields corresponding to the RU allocated to the station parking on the first frequency domain segment represents a quantity of user fields that are contributed by the RU to one content channel in the user specific field, and the user field is a user field corresponding to the station parking on the first frequency domain segment; and the transceiver unit is configured to send the signaling field on the first frequency domain segment. The data transmission apparatus may be a communication apparatus or an access point, or the data transmission apparatus may be deployed in a communication apparatus or deployed in an access point.

In this way, in the signaling field transmitted on the first frequency domain segment, the resource unit allocation subfield indicates the resource unit RU included in the channel bandwidth for transmitting the PPDU, and indicates the quantity of user fields corresponding to the RU that is in the RU and that is allocated to the station parking on the first frequency domain segment, but does not indicate, based on an actual resource unit allocation case, a quantity of users not allocated to the station parking on the first frequency domain segment, so that the user field can be simplified. In the user specific field part, a user field corresponding to an RU that does not park on the first frequency domain segment can be omitted or simplified, so that overheads of the signaling field of the PPDU can be reduced by reducing a quantity of user fields.

In some implementations, the resource unit allocation subfield indicates that a quantity of user fields corresponding to an RU that is in the resource unit RU included in the channel bandwidth for transmitting the PPDU and that is not allocated to the station parking on the first frequency domain segment is 0, and the RU not allocated to the station parking on the first frequency domain segment is an RU greater than or equal to a 242-tone RU. In this way, a user field corresponding to the RU greater than or equal to the 242-tone RU can be omitted, so that overheads of the signaling field can be effectively reduced.

In some implementations, a quantity, indicated by the resource unit allocation subfield, of user fields corresponding to an RU not allocated to the station parking on the first frequency domain segment is less than a quantity of user fields actually corresponding to the RU not allocated to the station parking on the first frequency domain segment. In this way, a quantity of user fields in the signaling field transmitted on the first frequency domain segment can be reduced, so that overheads of the signaling field can be reduced.

In some implementations, the RU that is indicated by the resource unit allocation subfield and that is not allocated to the station parking on the first frequency domain segment is actually at least two RUs not allocated to the station parking on the first frequency domain segment. In this way, the at least two RUs not allocated to the station parking on the first frequency domain segment are indicated as one RU together, and an indication manner of the resource unit allocation subfield is simplified, so that a quantity of user fields corresponding to the at least two RUs is smaller, and overheads of the signaling field can be reduced.

In some implementations, the at least two RUs are RUs less than a 242-tone RU. In this way, compared with a conventional technology in which the resource unit allocation subfield provides an indication based on the actual resource unit allocation case and each small RU needs to correspond to one user field, in the solutions of this application, the at least two small RUs allocated to the station parking on the first frequency domain segment are indicated as one RU together. In this way, the RU needs to correspond to only one user field, so that an indication of one user field can be omitted, and overheads of the signaling field can be reduced.

According to a sixth aspect, an implementation of this application further provides a data transmission apparatus, including a processing unit and a transceiver unit, where the transceiver unit is configured to receive a signaling field of a physical layer protocol data unit PPDU on a first frequency domain segment, where a channel bandwidth for transmitting the PPDU includes at least two frequency domain segments, and the at least two frequency domain segments include the first frequency domain segment, where the signaling field includes a common field and a user specific field, the common field includes a resource unit allocation subfield, and the user specific field includes a user field; the resource unit allocation subfield indicates a resource unit RU in the channel bandwidth for transmitting the PPDU, and indicates a quantity of user fields corresponding to an RU that is in the RU and that is allocated to a station parking on the first frequency domain segment; and the quantity of user fields corresponding to the RU allocated to the station parking on the first frequency domain segment represents a quantity of user fields that are contributed by the RU to one content channel in the user specific field, and the user field is a user field corresponding to the station parking on the first frequency domain segment; and the processing unit is configured to: obtain, from the user field included in the user specific field in the received signaling field, a user field that carries an identifier of the station, and obtain data transmitted on an RU corresponding to the user field. The data transmission apparatus may be a communication apparatus or a station, or the data transmission apparatus may be deployed in a communication apparatus or deployed in a station.

In this way, in the signaling field received by the station on the first frequency domain segment, the resource unit allocation subfield indicates the resource unit RU included in the channel bandwidth for transmitting the PPDU, and indicates the quantity of user fields corresponding to the RU that is in the RU and that is allocated to the station parking on the first frequency domain segment, but does not indicate, based on an actual resource unit allocation case, a quantity of users not allocated to the station parking on the first frequency domain segment, so that the user field can be simplified. In the user specific field part, a user field corresponding to an RU that does not park on the first frequency domain segment can be omitted or simplified, so that overheads of the signaling field of the PPDU can be reduced by reducing a quantity of user fields.

In some implementations, the resource unit allocation subfield indicates that a quantity of user fields corresponding to an RU that is in the resource unit RU included in the channel bandwidth for transmitting the PPDU and that is not allocated to the station parking on the first frequency domain segment is 0, and the RU not allocated to the station parking on the first frequency domain segment is an RU greater than or equal to a 242-tone RU. In this way, a user field corresponding to the RU greater than or equal to the 242-tone RU can be omitted, so that overheads of the signaling field can be effectively reduced.

In some implementations, a quantity, indicated by the resource unit allocation subfield, of user fields corresponding to an RU not allocated to the station parking on the first frequency domain segment is less than a quantity of user fields actually corresponding to the RU not allocated to the station parking on the first frequency domain segment. In this way, a quantity of user fields in the signaling field transmitted on the first frequency domain segment can be reduced, so that overheads of the signaling field can be reduced.

In some implementations, the RU that is indicated by the resource unit allocation subfield and that is not allocated to the station parking on the first frequency domain segment is actually at least two RUs not allocated to the station parking on the first frequency domain segment. In this way, the at least two RUs not allocated to the station parking on the first frequency domain segment are indicated as one RU together, and an indication manner of the resource unit allocation subfield is simplified, so that a quantity of user fields corresponding to the at least two RUs is smaller, and overheads of the signaling field can be reduced.

In some implementations, the at least two RUs are RUs less than a 242-tone RU. In this way, compared with a conventional technology in which the resource unit allocation subfield provides an indication based on the actual resource unit allocation case and each small RU needs to correspond to one user field, in the solutions of this application, the at least two small RUs allocated to the station parking on the first frequency domain segment are indicated as one RU together. In this way, the RU needs to correspond to only one user field, so that an indication of one user field can be omitted, and overheads of the signaling field can be reduced.

According to a seventh aspect, an implementation of this application further provides a data transmission apparatus, including a processing unit and a transceiver unit, where the processing unit is configured to generate a signaling field of a physical layer protocol data unit PPDU, where a channel bandwidth for transmitting the PPDU includes at least two frequency domain segments, and the at least two frequency domain segments include a first frequency domain segment; and the transceiver unit is configured to send the signaling field on the first frequency domain segment, where the signaling field includes a common field and a user specific field, the common field includes a resource unit allocation subfield, and the user specific field includes a user field; the resource unit allocation subfield indicates a resource unit RU in the channel bandwidth for transmitting the PPDU; an RU indicated by at least one resource unit allocation subfield included in the common field is a plurality of RUs less than a 242-tone RU; and each RU in the plurality of RUs less than the 242-tone RU corresponds to at least one user field, a user field corresponding to at least one first RU carries an identifier of a station parking on the first frequency domain segment, a user field corresponding to at least one second RU does not carry the identifier of the station parking on the first frequency domain segment, and at least a part of subcarriers corresponding to the second RU indicated by the resource unit allocation subfield belong to at least two RUs. The data transmission apparatus may be a communication apparatus or an access point, or the data transmission apparatus may be deployed in a communication apparatus or deployed in an access point.

In this way, compared with a manner of indicating the two RUs based on an actual case and indicating that each RU in the at least two RUs corresponds to at least one user field, in the solutions of this application, in the first signaling field transmitted on the first frequency domain segment, the resource unit allocation subfield indicates the at least two RUs as one RU through combination, and the RU corresponds to only one user field. Therefore, a quantity of user fields corresponding to a plurality of contiguous small RUs not allocated to the STA parking on the first frequency domain segment can be effectively reduced, so that overheads of the signaling field can be reduced.

According to an eighth aspect, an implementation of this application further provides a data transmission apparatus, including a processing unit and a transceiver unit, where the processing unit is configured to receive a signaling field of a physical layer protocol data unit PPDU on a first frequency domain segment, where a channel bandwidth for transmitting the PPDU includes at least two frequency domain segments, and the at least two frequency domain segments include the first frequency domain segment, where the signaling field includes a common field and a user specific field, the common field includes a resource unit allocation subfield, and the user specific field includes a user field; the resource unit allocation subfield indicates a resource unit RU in the channel bandwidth for transmitting the PPDU; an RU indicated by at least one resource unit allocation subfield included in the common field is a plurality of RUs less than a 242-tone RU; and each RU in the plurality of RUs less than the 242-tone RU corresponds to at least one user field, a user field corresponding to at least one first RU carries an identifier of a station parking on the first frequency domain segment, a user field corresponding to at least one second RU does not carry the identifier of the station parking on the first frequency domain segment, and at least a part of subcarriers corresponding to the second RU indicated by the resource unit allocation subfield belong to at least two RUs; and the transceiver unit is configured to: obtain, from the user field included in the user specific field, a user field that carries the identifier of the station, and obtain data transmitted on an RU corresponding to the user field. The data transmission apparatus may be a communication apparatus or a station, or the data transmission apparatus may be deployed in a communication apparatus or deployed in a station.

In this way, in the signaling field received by the station on the first frequency domain segment, the resource unit allocation subfield indicates the resource unit RU included in the channel bandwidth for transmitting the PPDU, and indicates the quantity of user fields corresponding to the RU that is in the RU and that is allocated to the station parking on the first frequency domain segment, but does not indicate, based on an actual resource unit allocation case, a quantity of users not allocated to the station parking on the first frequency domain segment, so that the user field can be simplified. In the user specific field part, a user field corresponding to an RU that does not park on the first frequency domain segment can be omitted or simplified, so that overheads of the signaling field of the PPDU can be reduced by reducing a quantity of user fields.

In some implementations, the resource unit allocation subfield indicates that a quantity of user fields corresponding to an RU that is in the resource unit RU included in the channel bandwidth for transmitting the PPDU and that is not allocated to the station parking on the first frequency domain segment is 0, and the RU not allocated to the station parking on the first frequency domain segment is an RU greater than or equal to a 242-tone RU. In this way, a user field corresponding to the RU greater than or equal to the 242-tone RU can be omitted, so that overheads of the signaling field can be effectively reduced.

In some implementations, a quantity, indicated by the resource unit allocation subfield, of user fields corresponding to an RU not allocated to the station parking on the first frequency domain segment is less than a quantity of user fields actually corresponding to the RU not allocated to the station parking on the first frequency domain segment. In this way, a quantity of user fields in the signaling field transmitted on the first frequency domain segment can be reduced, so that overheads of the signaling field can be reduced.

In some implementations, the RU that is indicated by the resource unit allocation subfield and that is not allocated to the station parking on the first frequency domain segment is actually at least two RUs not allocated to the station parking on the first frequency domain segment. In this way, the at least two RUs not allocated to the station parking on the first frequency domain segment are indicated as one RU together, and an indication manner of the resource unit allocation subfield is simplified, so that a quantity of user fields corresponding to the at least two RUs is smaller, and overheads of the signaling field can be reduced.

In some implementations, the at least two RUs are RUs less than a 242-tone RU. In this way, compared with a conventional technology in which the resource unit allocation subfield provides an indication based on the actual resource unit allocation case and each small RU needs to correspond to one user field, in the solutions of this application, the at least two small RUs allocated to the station parking on the first frequency domain segment are indicated as one RU together. In this way, the RU needs to correspond to only one user field, so that an indication of one user field can be omitted, and overheads of the signaling field can be reduced.

According to a ninth aspect, an implementation of this application further provides a communication apparatus, where the communication apparatus may include a processor and a transceiver, and optionally further includes a memory. When the processor executes a computer program or instructions in the memory, the method according to any one of the implementations of the first aspect is performed, or the method according to any one of the implementations of the second aspect is performed, or the method according to the implementation of the third aspect is performed, or the method according to the implementation of the fourth aspect is performed.

According to a tenth aspect, an implementation of this application further provides a computer-readable storage medium, where the computer-readable storage medium stores computer instructions, and the computer instruction instructs a communication device to perform the method according to any one of the implementations of the first aspect, or the computer instruction instructs a communication device to perform the method according to any one of the implementations of the second aspect, or the computer instruction instructs a communication device to perform the method according to the third aspect, or the computer instruction instructs a communication device to perform the method according to the fourth aspect.

According to an eleventh aspect, an implementation of this application further provides a computer program product, where the computer program product includes a computer program, and when the computer program is run on a computer, the computer is enabled to perform the method according to any one of the implementations of the first aspect, or the computer is enabled to perform the method according to any one of the implementations of the second aspect, or the computer is enabled to perform the method according to the third aspect, or the computer is enabled to perform the method according to the fourth aspect.

According to a twelfth aspect, this application further provides a processor, configured to perform any method according to the first aspect to the fourth aspect. In a process of performing these methods, a process of sending the foregoing information and a process of receiving the foregoing information in the foregoing methods may be understood as a process of outputting the foregoing information by the processor and a process of receiving the foregoing input information by the processor. Specifically, when outputting the information, the processor outputs the information to a transceiver, so that the transceiver transmits the information. Still further, after the information is output by the processor, other processing may further need to be performed on the information before the information arrives at the transceiver. Similarly, when the processor receives the input information, the transceiver receives the information and inputs the information into the processor. Still further, after the transceiver receives the information, other processing may need to be performed on the information before the information is input into the processor.

In this case, for operations such as transmission, sending, and receiving related to the processor, if there is no particular statement, or if the operations do not contradict an actual function or internal logic of the operations in related descriptions, the operations may be more generally understood as operations such as output, receiving, and input of the processor, instead of operations such as transmission, sending, and receiving directly performed by a radio frequency circuit and an antenna.

In a specific implementation process, the processor may be a processor specially configured to perform these methods, or a processor, for example, a general-purpose processor, that executes computer instructions in a memory to perform these methods. The memory may be a non-transitory memory such as a read-only memory (ROM). The memory and the processor may be integrated on a same chip, or may be separately disposed on different chips. A type of the memory and a manner of disposing the memory and the processor are not limited in the embodiments of the present invention.

According to a thirteenth aspect, this application provides a chip system, where the chip system includes a processor and an interface, and is configured to support a communication transmission device in implementing a function in the method according to any one of the first aspect to the fourth aspect, for example, determining or processing at least one of data and information in the method. In a possible design, the chip system further includes a memory, and the memory is configured to store information and data that are necessary for the foregoing communication apparatus. The chip system may include a chip, or may include a chip and another discrete component.

According to a fourteenth aspect, this application provides a functional entity, where the functional entity is configured to implement the method according to any one of the first aspect to the fourth aspect.

BRIEF DESCRIPTION OF THE DRAWINGS

FIG. 8B is a schematic diagram of a structure of a content channel according to an embodiment of this application;

FIG. 8D is a schematic diagram of a structure of a content channel according to another embodiment of this application;

DETAILED DESCRIPTION OF ILLUSTRATIVE EMBODIMENTS

The following further describes specific embodiments of this application in detail with reference to accompanying drawings.

Figure 1A:
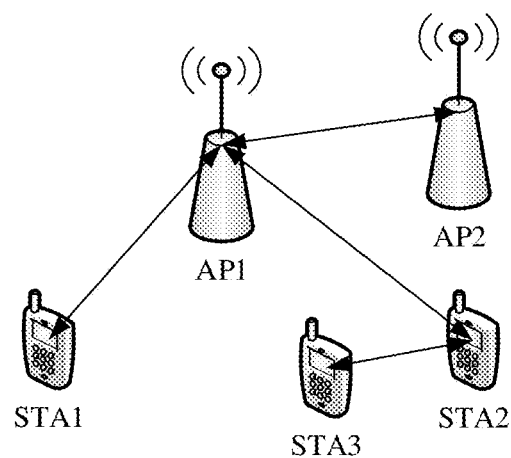
FIG. 1A is a schematic diagram of a network structure according to an embodiment of this application.

FIG. 1A is used as an example to describe a network structure to which a data transmission method in this application is applicable. FIG. 1A is a schematic diagram of a network structure according to an embodiment of this application. The network structure may include one or more access point (AP) stations and one or more non-access point stations (non-access point station, non-AP STA). For ease of description, an access point station is referred to as an access point (AP), and a non-access point station is referred to as a station (STA) in this specification. The AP is, for example, an AP1 and an AP2 in FIG. 1A, and the STA is, for example, a STA1, a STA2, and a STA3 in FIG. 1A.

The access point may be an access point for a terminal device (such as a mobile phone) to access a wired (or wireless) network, and is mainly deployed in a home, a building, and a park. A typical coverage radius is tens of meters to a hundred meters. Certainly, the access point may also be deployed outdoors. The access point is equivalent to a bridge that connects the wired network and the wireless network. A main function of the access point is to connect various wireless network clients together and then connect the wireless network to an Ethernet. Specifically, the access point may be a terminal device (such as a mobile phone) or a network device (such as a router) with a wireless fidelity (Wi-Fi) chip. The access point may be a device that supports the 802.11be standard. Alternatively, the access point may be a device that supports a plurality of wireless local area network (WLAN) standards of the 802.11 family such as 802.11be, 802.11ax, 802.11ac, 802.11n, 802.11g, 802.11b, and 802.11a. The access point in this application may be a high efficient (HE) AP or an extremely high throughput (EHT) AP, or may be an access point applicable to a future Wi-Fi standard.

The access point may include a processor and a transceiver. The processor is configured to control and manage an action of the access point, and the transceiver is configured to receive or send information.

The station may be a wireless communication chip, a wireless sensor, a wireless communication terminal, or the like, and may also be referred to as a user. For example, the station may be a mobile phone supporting a Wi-Fi communication function, a tablet computer supporting a Wi-Fi communication function, a set-top box supporting a Wi-Fi communication function, a smart television supporting a Wi-Fi communication function, an intelligent wearable device supporting a Wi-Fi communication function, a vehicle-mounted communication device supporting a Wi-Fi communication function, or a computer supporting a Wi-Fi communication function. Optionally, the station may support the 802.11be standard. The station may further support a plurality of wireless local area network (WLAN) standards of the 802.11 family such as 802.11be, 802.11ax, 802.11ac, 802.11n, 802.11g, 802.11b, and 802.11a.

The station may include a processor and a transceiver. The processor is configured to control and manage an action of the access point, and the transceiver is configured to receive or send information.

The access point in this application may be a high efficient (HE) STA or an extremely high throughput (EHT) STA, or may be a STA applicable to a future Wi-Fi standard.

For example, the access point and the station may be devices applied to the internet of vehicles, internet of things nodes or sensors on the internet of things (IoT), smart cameras, smart remote controls, and smart water meters in a smart home, and sensors in a smart city.

The access point and the station in the embodiments of this application may also be collectively referred to as a communication apparatus. The communication apparatus may include a hardware structure and a software module, and the foregoing functions are implemented in a form of a hardware structure, a software module, or a combination of the hardware structure and the software module. A function in the foregoing functions may be implemented in a form of a hardware structure, a software module, or a combination of the hardware structure and the software module.

Figure 1B:
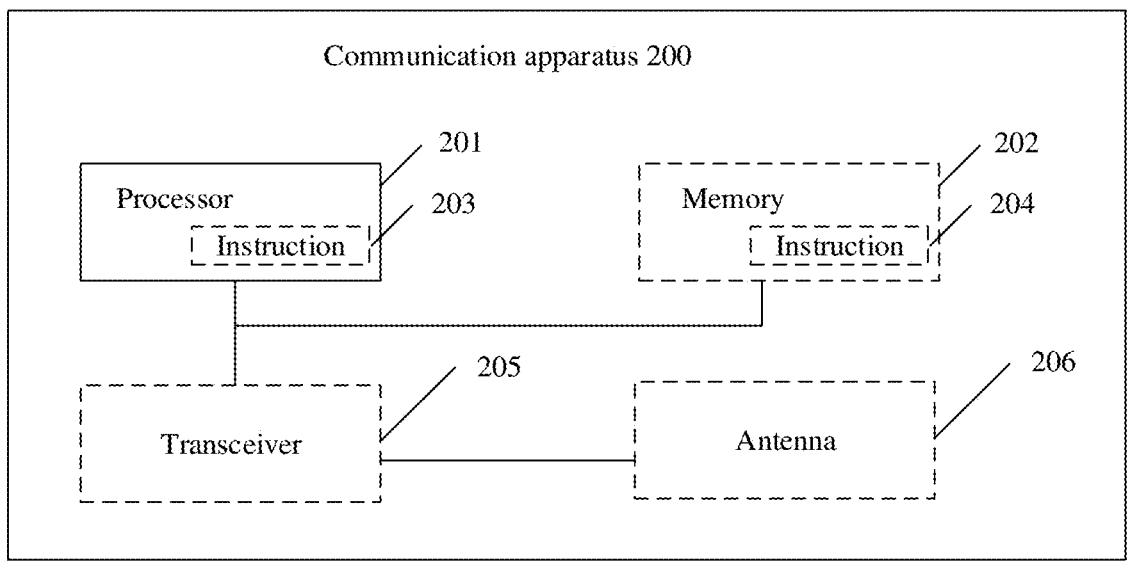
FIG. 1B is a schematic diagram of a structure of a communication apparatus according to an embodiment of this application.

FIG. 1B is a schematic diagram of a structure of a communication apparatus according to an embodiment of this application. As shown in FIG. 1B, the communication apparatus 200 may include a processor 201 and a transceiver 205, and optionally further includes a memory 202.

The transceiver 205 may be referred to as a transceiver unit, a transceiver machine, a transceiver circuit, or the like, and is configured to implement a transceiver function. The transceiver 205 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function.

The memory 202 may store a computer program, software code, or instructions 204, where the computer program, the software code, or the instructions 204 may further be referred to as firmware. The processor 201 may control a MAC layer and a PHY layer by running a computer program, software code, or instructions 203 in the processor 201, or by invoking the computer program, the software code, or the instructions 204 stored in the memory 202, to implement a data transmission method provided in the following embodiments of this application. The processor 201 may be a central processing unit (CPU), and the memory 202 may be, for example, a read-only memory (ROM), or a random access memory (RAM).

The processor 201 and the transceiver 205 described in this application may be implemented in an integrated circuit (IC), an analog IC, a radio frequency integrated circuit RFIC, a mixed-signal IC, an application-specific integrated circuit (ASIC), a printed circuit board (PCB), an electronic device, or the like.

The communication apparatus 200 may further include an antenna 206. The modules included in the communication apparatus 200 are merely examples for description, and are not limited in this application.

As described above, the communication apparatus 200 described in the foregoing embodiment may be an access point or a station. However, the scope of the communication apparatus described in this application is not limited thereto, and the structure of the communication apparatus may not be limited in FIG. 1B. The communication apparatus may be an independent device or a part of a large device. For example, the communication apparatus may be implemented in the following form:

(1) an independent integrated circuit IC, a chip, a chip system, or a subsystem; (2) a set including one or more ICs, where optionally, the set of ICs may also include a storage component for storing data and instructions; (3) a module that can be embedded in other devices; (4) a receiver, an intelligent terminal, a wireless device, a handheld device, a mobile unit, a vehicle-mounted device, a cloud device, an artificial intelligence device, or the like; or (5) others.

Figure 1C:
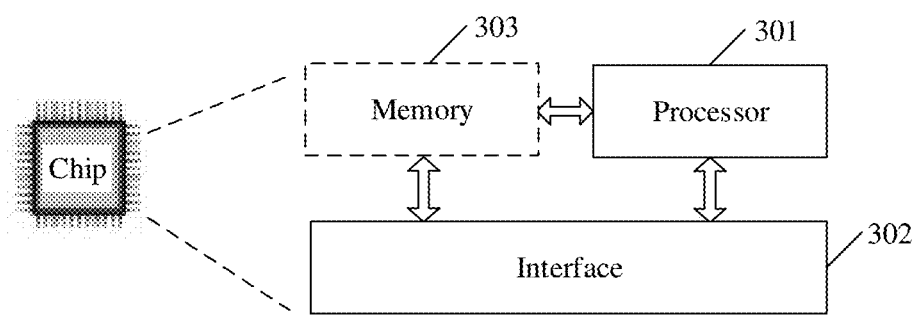
FIG. 1C is a schematic diagram of a structure of a chip according to an embodiment of this application.

For the communication apparatus implemented in the form of the chip or the chip system, refer to a schematic diagram of a structure of a chip shown in FIG. 1C. The chip shown in FIG. 1C includes a processor 301 and an interface 302. There may be one or more processors 301, and there may be a plurality of interfaces 302. Optionally, the chip or the chip system may include a memory 303.

The embodiments of this application do not limit the protection scope and applicability of the claims. A person skilled in the art may adaptively change functions and deployments of elements in this application, or omit, replace, or add various processes or components as appropriate without departing from the scope of the embodiments of this application.

In terms of a bandwidth configuration, a bandwidth configuration currently supported in 802.11ax includes 20 MHZ, 40 MHZ, 80 MHZ, 160 MHz, and 80 MHz+80 MHz. A difference between 160 MHz and 80 MHz+80 MHz lies in that the former is a contiguous frequency band, and the latter, namely, the two 80 MHz, may be separated from each other. In 802.11be, a bandwidth configuration of 320 MHz is supported.

In terms of frequency band resource allocation, a frequency band resource is allocated to a user on a basis of a resource unit (RU) instead of a channel. A size of the RU may be a 26-tone RU, a 52-tone RU, and a 106-tone RU. These RUs are generally referred to as small RUs, where tone represents a subcarrier. For example, the 26-tone RU represents an RU including 26 subcarriers, and the 26-tone RU may be allocated to one user for use. In addition, sizes of the RUs may alternatively be 242-tone, 484-tone, 996-tone, or the like, and these RUs are generally referred to as large RUs. Generally, an RU with a size greater than or equal to 106-tone can be allocated to one or more users. In 802.11be, a plurality of RUs can be allocated to one user, and a user in this application may be understood as a STA.

Figure 2A:
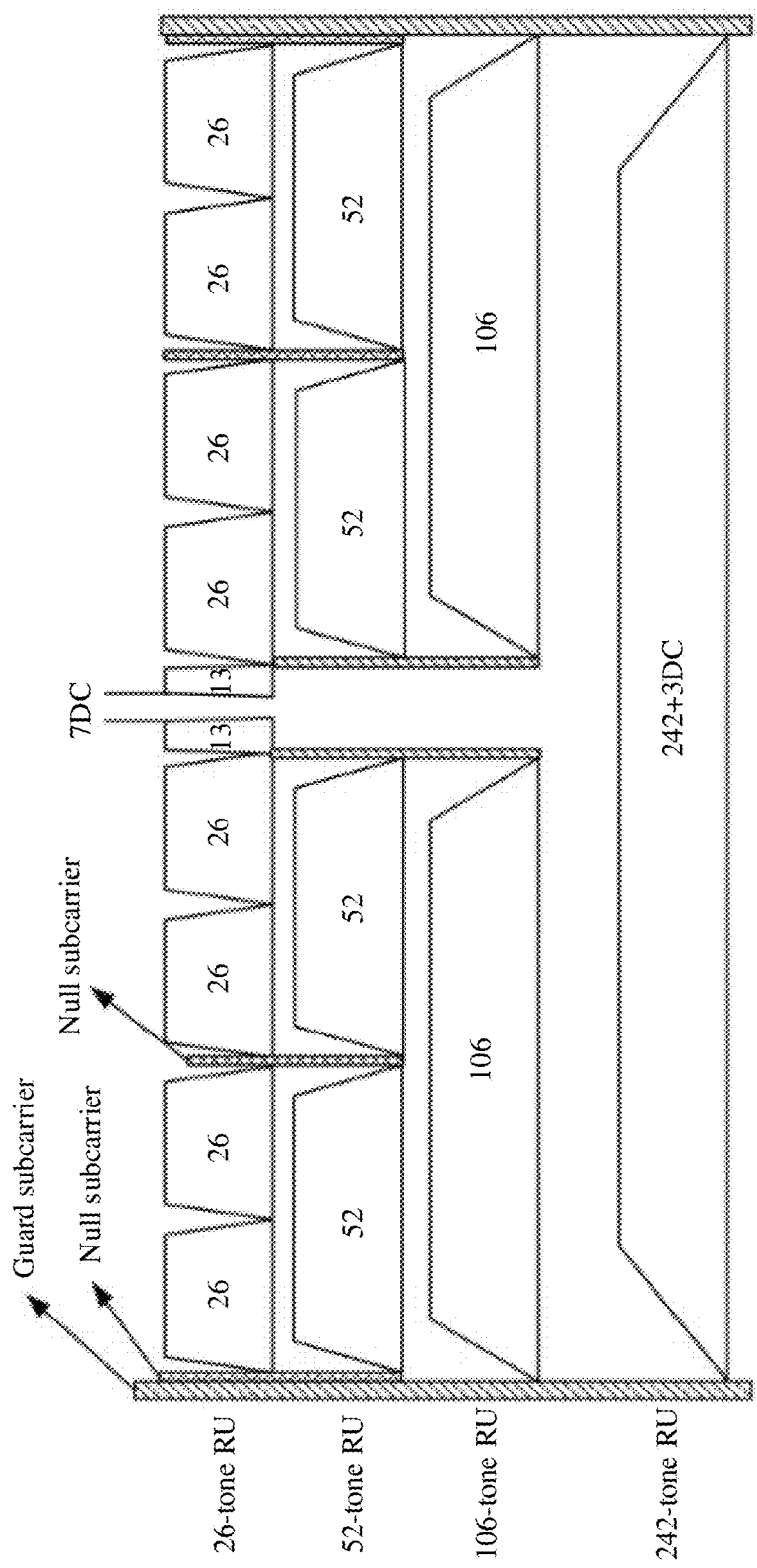
FIG. 2A is a schematic diagram of a resource unit allocation manner.

When a channel bandwidth for transmitting a PPDU is 20 MHZ, FIG. 2A is a schematic diagram of a possible resource unit allocation manner existing when a channel bandwidth for transmitting a PPDU is 20 MHz. The entire 20 MHz bandwidth may include resource elements (242-tone RUs) that each include 242 subcarriers, or may include various combinations of resource elements (26-tone RUs) each including 26 subcarriers, resource elements (52-tone RUs) each including 52 subcarriers, and resource elements (106-tone RUs) each including 106 subcarriers. In addition to the RU used to transmit data, some guard tones, null tones, or direct current (DC) tones are further included.

Figure 2B:
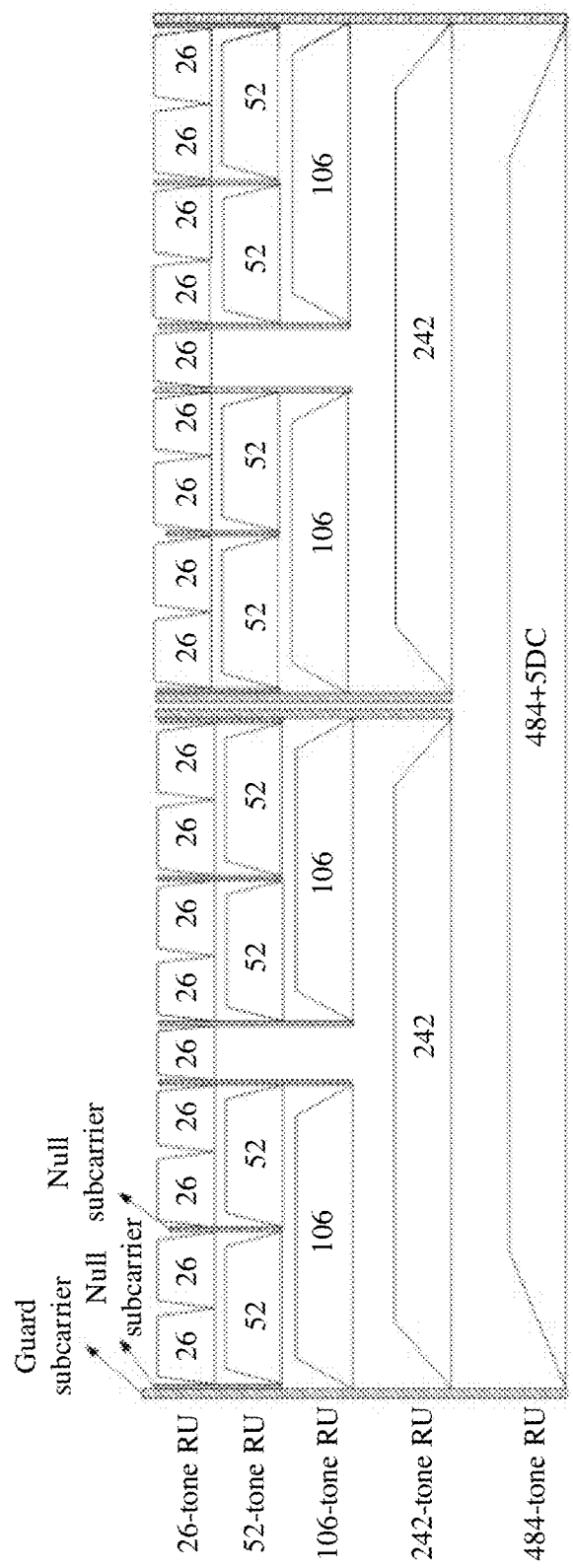
FIG. 2B is a schematic diagram of another resource unit allocation manner.

When a channel bandwidth for transmitting a PPDU is 40 MHZ, FIG. 2B shows various resource unit allocation manners existing when a channel bandwidth for transmitting a PPDU is 40 MHz. The entire channel bandwidth is approximately equivalent to replication of a 20 MHz tone plan. The entire 40 MHz bandwidth may include resource elements (484-tone RUs) that each include 484 subcarriers, or may include various combinations of 26-tone RUs, 52-tone RUs, 106-tone RUs, and 242-tone RUs.

When a channel bandwidth for transmitting a PPDU is 80 MHz, the entire channel bandwidth is approximately equivalent to replication of a 20 MHz tone plan. The entire 80 MHz bandwidth may include resource elements (996-tone RUs) that each include 996 subcarriers, or may include various combinations of 484-tone RUs, 242-tone RUs, 106-tone RUs, 52-tone RUs, and 26-tone RUs. In addition, an intermediate 26-tone RU (Center 26-Tone RU) including two 13-tone subunits exists in the middle of the entire 80 MHz channel bandwidth.

Similarly, when a channel bandwidth for transmitting a PPDU is 160 MHz, the entire channel bandwidth may be considered as replication of an 80 MHz tone plans. The entire channel bandwidth may include an entire 2×996-tone RU (a resource unit including 1992 subcarriers), or may include various combinations of 26-tone RUs, 52-tone RUs, 106-tone RUS, 242-tone RUs, 484-tone RUs, and 996-tone RUs. In addition, a center 26-tone RU including two 13-tone subunits exists in the middle of the entire 160 MHz channel bandwidth.

Figure 3A:
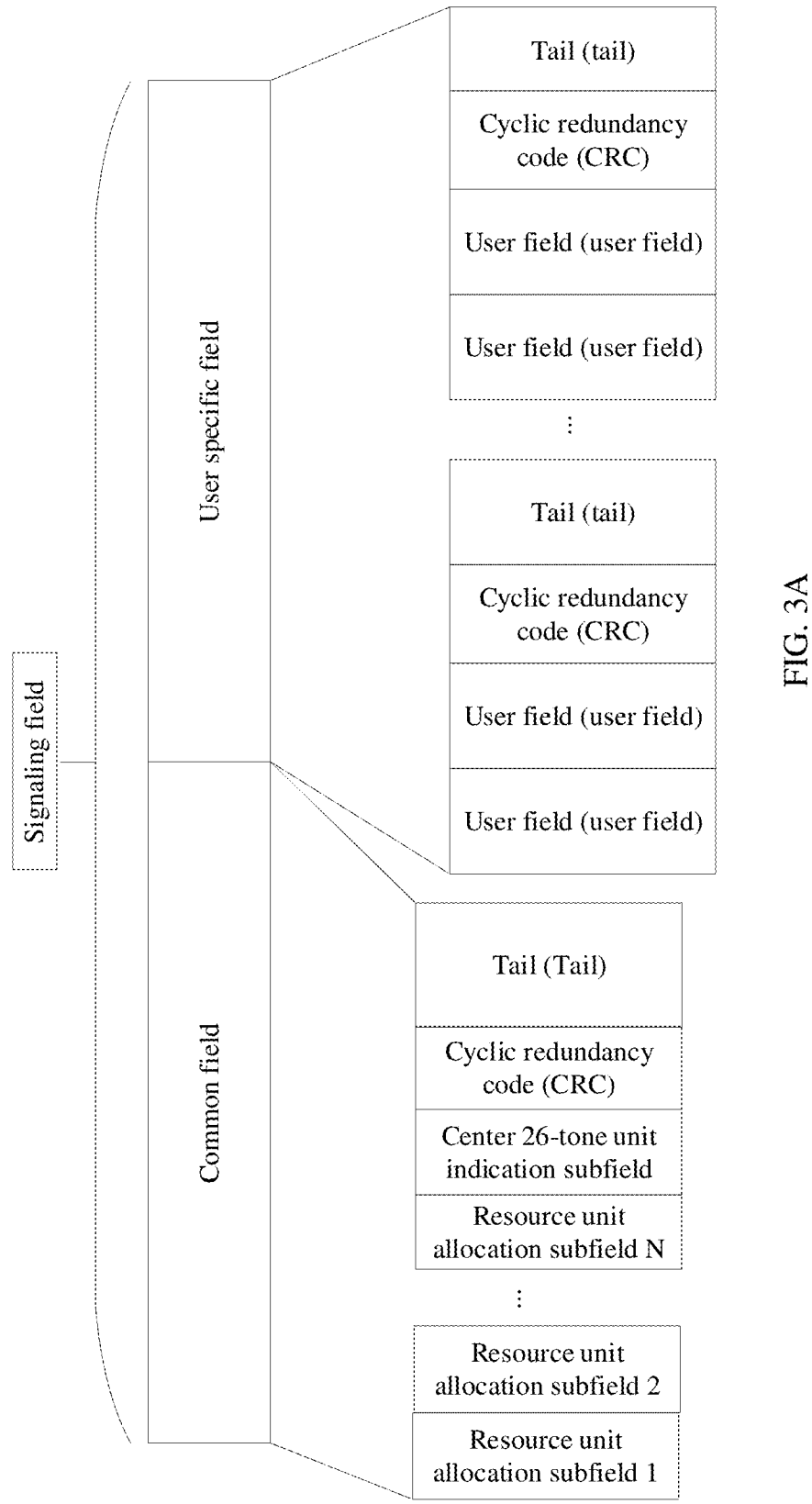
FIG. 3A is a schematic diagram of a possible structure of a signaling field.

In 802.11ax, the AP notifies the user of RU allocation by using a signaling field (signal field, SIG). FIG. 3A is a schematic diagram of a structure of a signaling field. As shown in FIG. 3A, an HE-SIG includes a common field and a user specific field.

The common field includes 1 to N resource unit allocation subfields (RU allocation subfields), a cyclic redundancy code (CRC) used for checking, and a tail (Tail) subfield used for cyclic decoding. One resource unit allocation subfield corresponds to resource unit allocation corresponding to one 20 MHz. One resource unit allocation subfield indicates a size and a location of one or more resource units corresponding to 20 MHz.

One resource unit allocation subfield is one index, and one index indicates a size and a location of one or more resource units corresponding to 20 MHz.

As shown in Table 1, according to 802.11ax, the resource unit allocation subfield may be one index in the first column in Table 1, for example, 00000000, 00000001, and 00000010. A row in which each index is located represents a size and a location of a resource unit corresponding to 20 MHz.

TABLE 1

| Resource unit allocation subfield (B7, B6, B5, B4, B3, B2, B1, B0) | #1 | #2 | #3 | #4 | #5 | #6 | #7 | #8 | #9 | Entry quantity |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 |  | 1 |
| 00000010 | 26 | 26 | 26 | 26 | 26 | 52 |  | 26 | 26 | 1 |
| 00000011 | 26 | 26 | 26 | 26 | 26 | 52 |  | 52 |  | 1 |
| 00000100 | 26 | 26 | 52 |  | 26 | 26 | 26 | 26 | 26 | 1 |
| 00000101 | 26 | 26 | 52 |  | 26 | 26 | 26 | 52 |  | 1 |
| 00000110 | 26 | 26 | 52 |  | 26 | 52 |  | 26 | 26 | 1 |
| 00000111 | 26 | 26 | 52 |  | 26 | 52 |  | 52 |  | 1 |
| 00001000 | 52 |  | 26 | 26 | 26 | 26 | 26 | 26 | 26 | 1 |
| 00001001 | 52 |  | 26 | 26 | 26 | 26 | 26 | 52 |  | 1 |
| 00001010 | 52 |  | 26 | 26 | 26 | 52 |  | 26 | 26 | 1 |
| 00001011 | 52 |  | 26 | 26 | 26 | 52 |  | 52 |  | 1 |
| 00001100 | 52 |  | 52 |  | 26 | 26 | 26 | 26 | 26 | 1 |
| 00001101 | 52 |  | 52 |  | 26 | 26 | 26 | 52 |  | 1 |
| 00001110 | 52 |  | 52 |  | 26 | 52 |  | 26 | 26 | 1 |
| 00001111 | 52 |  | 52 |  | 26 | 52 |  | 52 |  | 1 |
| $00010y_2y_1y_0$ | 52 |  | 52 |  | — |  | 106 |  |  | 8 |
| $00011y_2y_1y_0$ |  | 106 |  |  | — | 52 |  | 52 |  | 8 |
| $00100y_2y_1y_0$ | 26 | 26 | 26 | 26 | 26 |  | 106 |  |  | 8 |
| $00101y_2y_1y_0$ | 26 | 26 |  | 52 | 26 |  | 106 |  |  | 8 |
| $00110y_2y_1y_0$ | 52 |  | 26 | 26 | 26 |  | 106 |  |  | 8 |
| $00111y_2y_1y_0$ | 52 |  | 52 |  | 26 |  | 106 |  |  | 8 |
| $01000y_2y_1y_0$ |  | 106 |  |  | 26 | 26 | 26 | 26 | 26 | 8 |
| $01001y_2y_1y_0$ |  | 106 |  |  | 26 | 26 | 26 | 52 |  | 8 |
| $01010y_2y_1y_0$ |  | 106 |  |  | 26 | 52 |  | 26 | 26 | 8 |

TABLE 1-continued

| Resource unit allocation subfield (B7, B6, B5, B4, B3, B2, B1, B0) | #1 | #2 | #3 | #4 | #5 | #6 | #7 | #8 | #9 | Entry quantity |
|---|---|---|---|---|---|---|---|---|---|---|
| 01011$y_2y_1y_0$ |  | 106 |  | 26 |  | 52 |  | 52 |  | 8 |
| 0110$y_1y_0z_1z_0$ |  | 106 |  | — |  | 106 |  |  |  | 16 |
| 01110000 | 52 |  | 52 |  | — |  | 52 |  | 52 | 1 |
| 01110001 | 242-tone RU null (zero users) |  |  |  |  |  |  |  |  | 1 |
| 01110010 | 48-tone RU; contributes zero user fields to a user specific field in a same HE-SIG-B content channel as this resource unit allocation subfield (contributes zero user fields to the user specific field in the same HE-SIG-B content channel as this RU allocation subfield) |  |  |  |  |  |  |  |  | 1 |
| 01110011 | 996-tone RU; contributes zero user fields to a user specific field in a same HE-SIG-B content channel as this resource unit allocation subfield (contributes zero user fields to the user specific field in the same HE-SIG-B content channel as this RU allocation subfield) |  |  |  |  |  |  |  |  | 1 |
| 011101$x_1x_0$ | Reserved |  |  |  |  |  |  |  |  | 4 |
| 01111$y_2y_1y_0$ | Reserved |  |  |  |  |  |  |  |  | 8 |
| 10$y_2y_1y_0z_2z_1z_0$ |  | 106 |  | 26 |  | 106 |  |  |  | 64 |
| 11000$y_2y_1y_0$ |  |  |  | 242 |  |  |  |  |  | 8 |
| 11001$y_2y_1y_0$ |  |  |  | 484 |  |  |  |  |  | 8 |
| 11010$y_2y_1y_0$ |  |  |  | 996 |  |  |  |  |  | 8 |
| 11011$y_2y_1y_0$ | Reserved |  |  |  |  |  |  |  |  | 8 |
| 111$x_4x_3x_2x_1x_0$ | Reserved |  |  |  |  |  |  |  |  | 32 |

The user-specific field of the signaling field (HE-SIG) includes 1 to M user fields (User Field) according to a resource unit allocation sequence. Two of the M user fields are usually in a group, and every two user fields are followed by a CRC field and a tail field. If a quantity of user fields is an odd number, the last user field is separately in a group, and the last user field is followed by a CRC field and a tail field. One user field carries identifier information of a station, to indicate that an RU corresponding to the user field is allocated to a STA.

When an arrangement and a combination of resource units indicated by one resource unit allocation subfield include a resource unit including greater than or equal to 106 subcarriers, the index is further used to indicate a quantity of MU MIMO users supported by the resource unit including greater than or equal to 106 subcarriers. In the standard 802.11ax, the quantity of MU MIMO users is less than or equal to 8. For example, for the index 01000$y_2y_1y_0$, when $y_2y_1y_0$ is 010, it indicates that 106-tone is allocated to three users.

An arrangement sequence of the user fields in the user specific field is consistent with a sequence of resource units indicated by a corresponding resource unit allocation subfield. A STA may identify, by reading a user field, whether a resource unit corresponding to the user field belongs to the STA. In this case, the STA may determine, based on a location of the user field and a corresponding resource unit allocation subfield, a resource unit allocated to the STA.

Figure 3B:
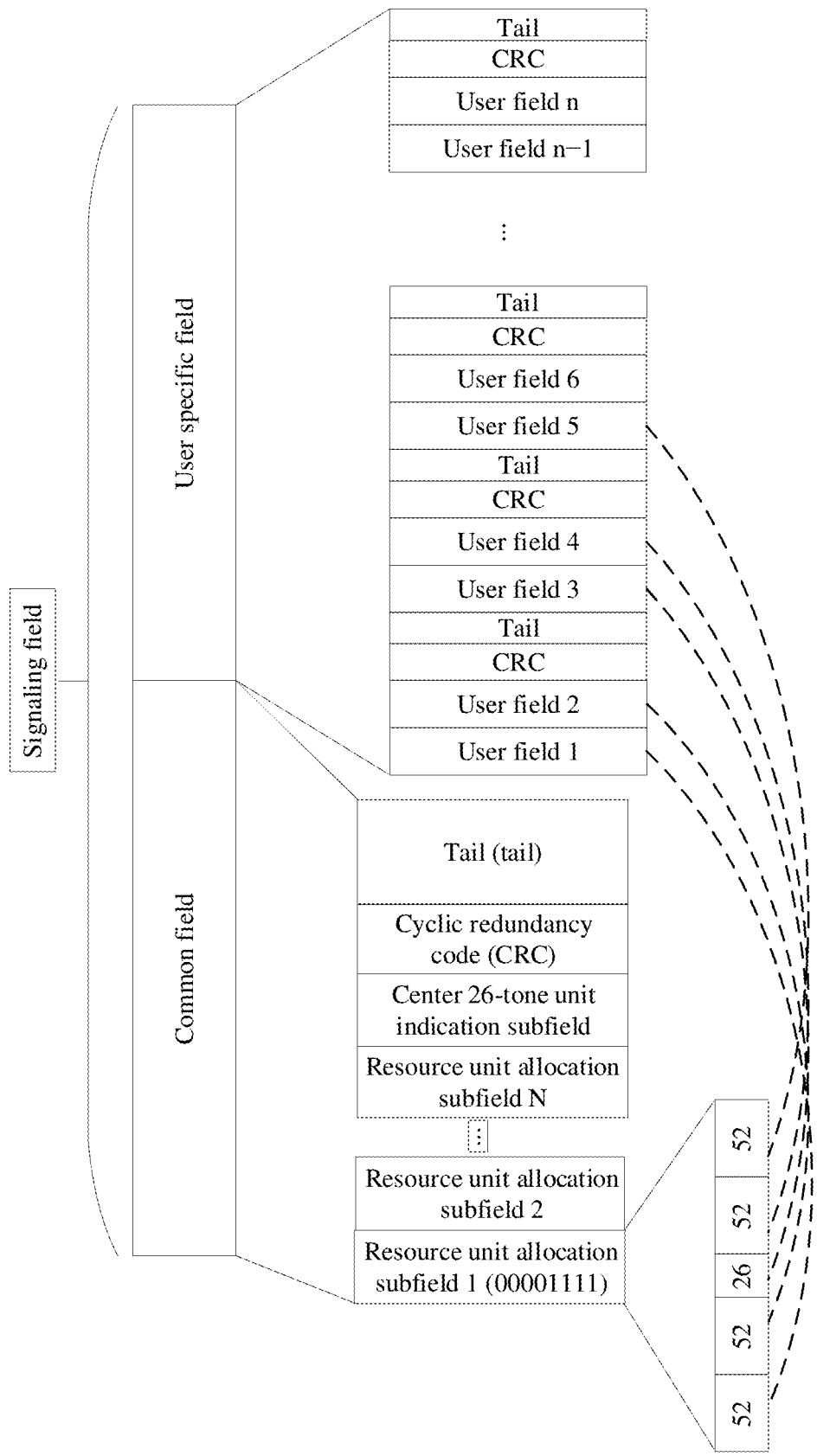
FIG. 3B is a schematic diagram of another possible structure of a signaling field.

For example, FIG. 3B is a schematic diagram of another possible structure of a signaling field. A resource unit allocation subfield 1 is 00001111. Based on a row in which 00001111 is located in Table 1, it may be determined that resource units indicated by the resource unit allocation subfield 1 are a 52-tone RU, a 52-tone RU, a 26-tone RU, a 52-tone RU, and a 52-tone RU. A user specific field part includes n user fields. Five user fields, namely, a user field 1, a user field 2, a user field 3, a user field 4, and a user field 5, respectively correspond to the 52-tone RU, the 52-tone RU, the 26-tone RU, the 52-tone RU, and the 52-tone RU. In this way, the 52-tone RU, the 52-tone RU, the 26-tone RU, the 52-tone RU, and the 52-tone RU that are indicated by the resource unit allocation subfield 1 are respectively allocated to a STA1 corresponding to the user field 1, a STA2 corresponding to the user field 2, a STA3 corresponding to the user field 3, a STA4 corresponding to the user field 4, and a STA5 corresponding to the user field 5.

It may be learned that in 802.11ax, a resource unit corresponding to each user field is determined based on a correspondence between the sequence of the resource units indicated by the resource unit allocation subfield and the arrangement sequence of the user fields in the user specific field. In this case, the HE-SIG-B sent to each station includes all user fields corresponding to each resource unit allocation subfield. In this way, it can be ensured that the STA can determine, based on a location of a user field and a corresponding resource unit allocation subfield, a resource unit allocated to the STA.

However, with development of WLAN technologies, to enable the PPDU to support more STAs, increasingly more user fields in the signaling field of the PPDU need to be transmitted. Consequently, signaling overheads are also increasingly large.

Figure 4A:
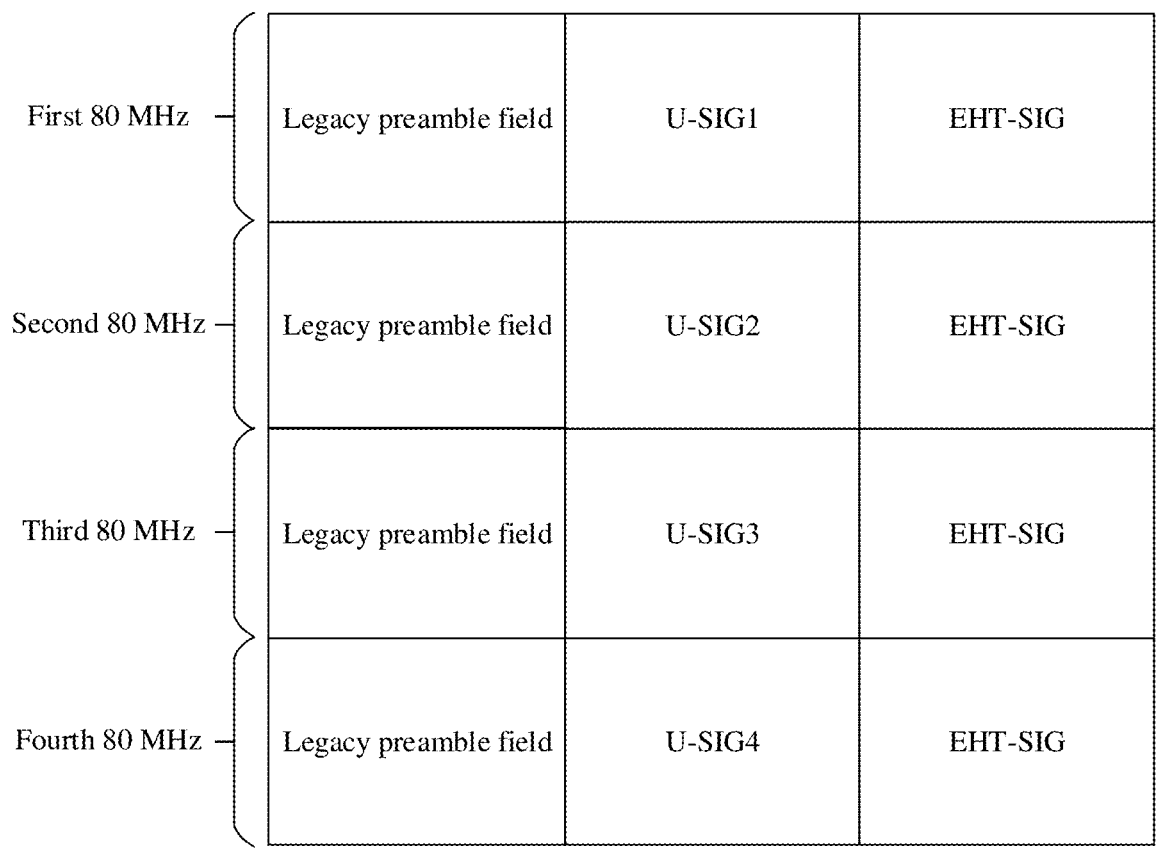
FIG. 4A is a schematic diagram of a structure of a PPDU according to this application.

FIG. 4A is a schematic diagram of a structure of a PPDU according to this application. To reduce overheads, in a specific embodiment, a structure of a frequency domain segment shown in FIG. 4A is provided. A channel bandwidth for transmitting a PPDU is divided into a plurality of frequency domain segments, and several stations park on each frequency domain segment. An AP sends the PPDU to STAs parking on the plurality of frequency domain segments. Specifically, the parking refers to a correspondence determined or known by a system, and is semi-static. In other words, a correspondence between a frequency domain segment and one or more stations parking on the frequency domain segment is configured, and remains unchanged within a specified time. In a more specific example, each frequency domain segment is 80 MHz. Certainly, the frequency domain segment may have another bandwidth granularity such as 40 MHz and 160 MHz. A specific process of configuring a parking relationship is not described in each embodiment, and therefore details are not described again.

It should be understood that, "a station parks (parking) on a frequency domain segment" in this application may also mean that the station camps on a frequency domain segment, or the station is located on or belongs to a frequency domain segment.

Figure 4B:
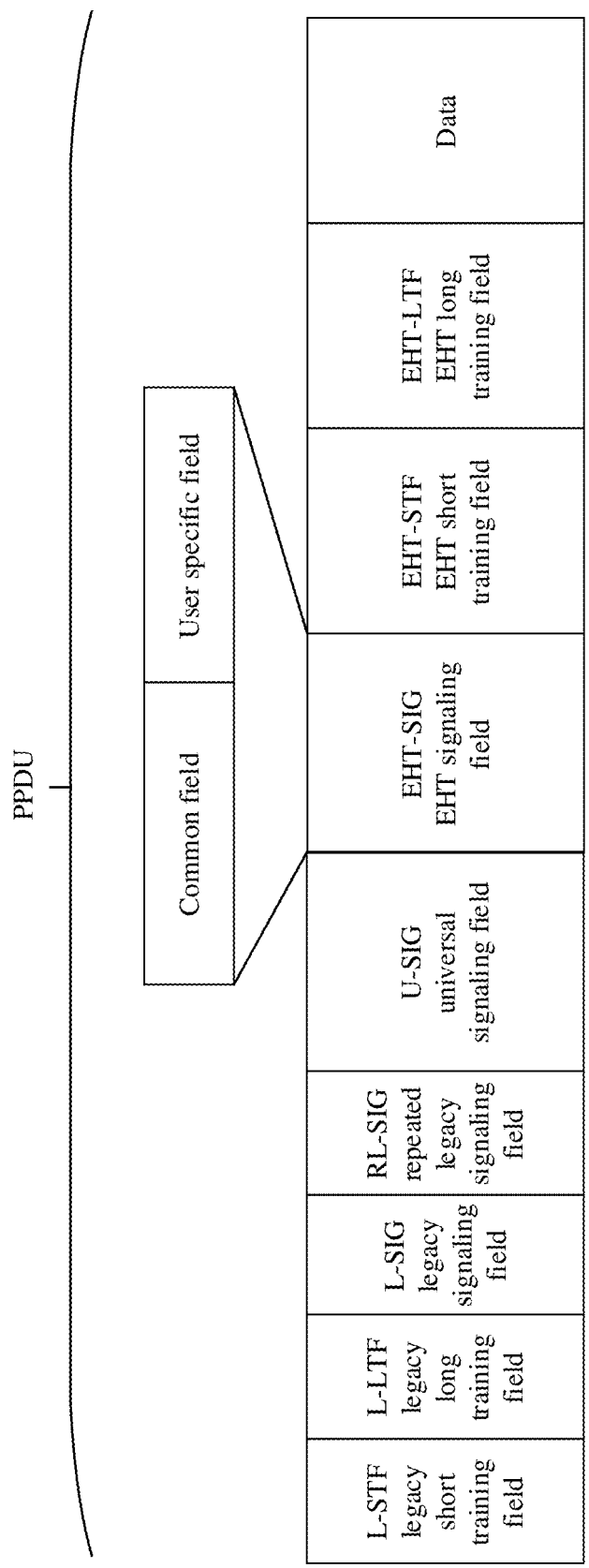
FIG. 4B is a schematic diagram of another structure of a PPDU according to this application.

In the embodiments of this application, the frequency domain segment may be further referred to as a frequency domain fragment or the like. FIG. 4B is a schematic diagram of a structure of a PPDU. The PPDU includes a legacy short training field (L-STF), a legacy long training field (L-LTF), a legacy signaling field (L-SIG), a repeated legacy signaling field (RL-SIG), a universal signaling field (U-SIG), an extremely high-throughput signaling field or ultra-high-throughput signaling field (EHT-SIG), an EHT short training field (EHT-STF), an EHT long training field (EHT-LTF), and data (data). The L-STF, the L-LTF, the L-SIG, the RL-SIG, the U-SIG, the EHT-SIG, the EHT-STF, and the EHT-LTF are a part of structures in a physical layer header (or referred to as a preamble part) of the PPDU.

The L-STF, the L-LTF, and the L-SIG may be understood as legacy preamble fields, and are used to ensure coexistence of a new device and a legacy device. The RL-SIG is used to enhance reliability of a legacy signaling field.

The U-SIG and the EHT-SIG are signaling fields. The U-SIG is used to carry some common information, for example, information indicating a PPDU version, information indicating an uplink/downlink, information indicating a frequency domain bandwidth of the PPDU, and puncturing indication information. The EHT-SIG includes information indicating resource allocation, information indicating data demodulation, and the like.

It should be noted that, in this embodiment of this application, a field in a PPDU in an 802.11be scenario is used as an example for description. Fields in the PPDU mentioned in the embodiments of this application are not limited to fields related to 802.11be, and the fields in the PPDU mentioned in the embodiments of this application may alternatively be fields related to a standard version later than 802.11be.

Based on the frequency domain segment structure, the fields in the preamble part of the PPDU are separately borne on frequency domain segments, that is, the preamble part of the PPDU includes one or more pieces of frequency domain segment content, for example, first frequency domain segment content includes a first legacy preamble field, a first U-SIG, and a first EHT-SIG, and second frequency domain segment content includes a second legacy preamble field, a second U-SIG, and a second EHT-SIG.

In this way, a U-SIG transmitted on each frequency domain segment may include only puncturing indication information of the frequency domain segment of the U-SIG, for example, a puncturing indication field that may be set to 1 bit. In this way, overheads of transmitting the U-SIG on each frequency domain segment can be reduced. However, because most of the U-SIG field is a universal field that needs to be received by each STA, overheads can be reduced only by using a few fields (for example, a puncturing indication) related to each STA. In this case, an effect of reducing overheads is not obvious.

Based on the foregoing structure, some embodiments are provided for reducing overheads of the signaling field.

Figure 5:
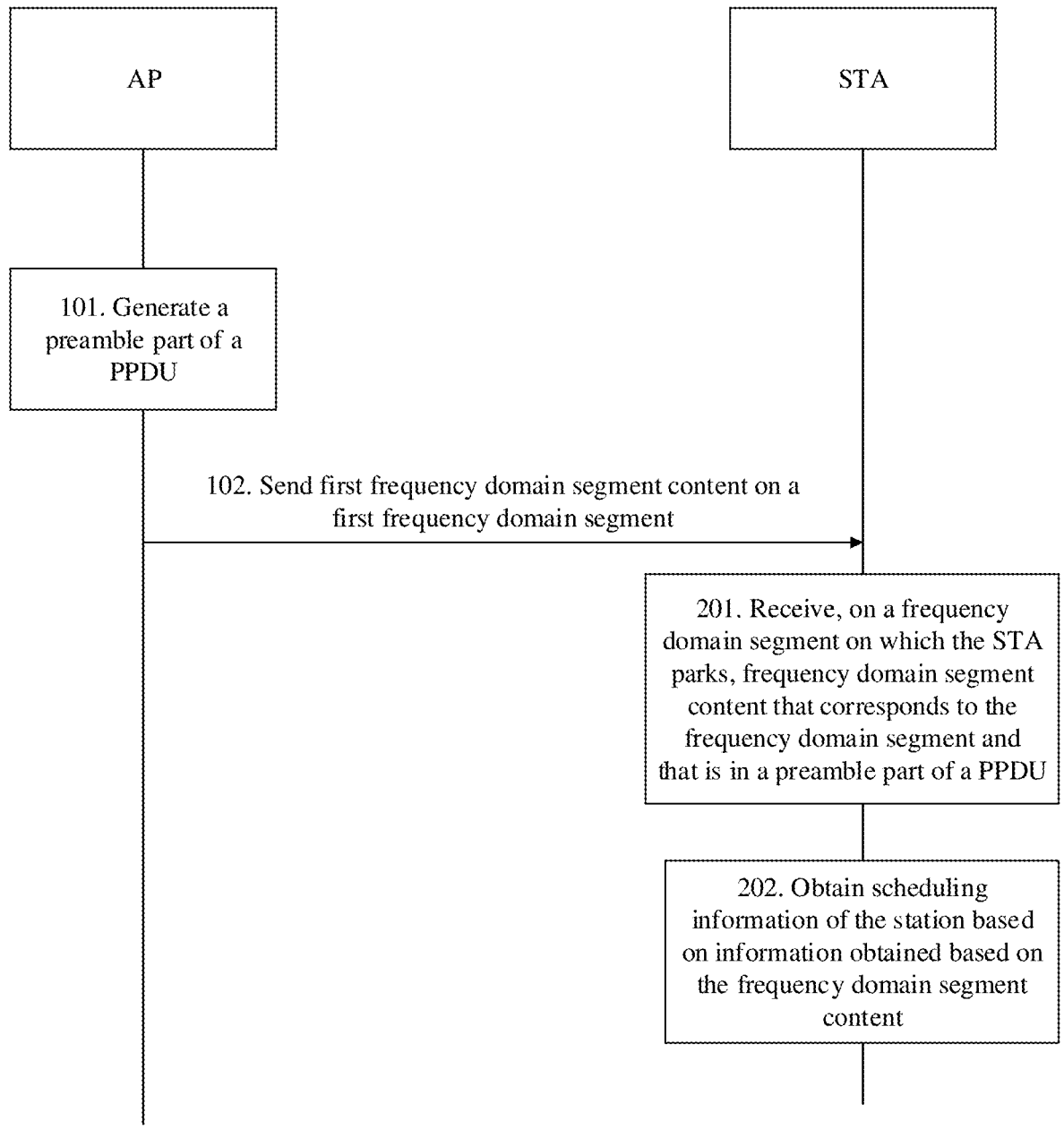
FIG. 5 is a schematic flowchart of a method for sending a preamble part of a PPDU according to an embodiment of this application.

FIG. 5 is a schematic flowchart of a method for sending a preamble part of a PPDU according to an embodiment of this application. An embodiment of this application provides a method for sending a preamble part of a PPDU. As shown in FIG. 5, the method for sending a preamble part of a PPDU includes the following steps.

101. An AP generates a preamble part of a PPDU, where the preamble part of the PPDU includes one or more pieces of frequency domain segment content, and the frequency domain segment content includes at least complete scheduling information of a station parking on a corresponding frequency domain segment. "Complete" herein means that, if a station parking on a frequency domain segment belongs to a current time of scheduling, scheduling information of the station is borne on a corresponding frequency domain segment, and includes resource allocation information and related information of the station (for example, a resource allocation field of the parking station and all user fields of a parking station that is scheduled, where a specific structure is described in detail in another embodiment).

It should be noted that, a resource unit allocated to a station parking on a frequency domain segment does not need to be located on the frequency domain segment on which the station parks, but may be located at any location in an entire channel bandwidth based on a resource requirement and a service requirement, that is, a resource unit allocation subfield that is used to indicate resource allocation and that is of the parking station is transmitted on the frequency domain segment, but a data field of the station may not be transmitted on the frequency domain segment. Certainly, in a simplified embodiment, only the parking station may be allocated to the frequency domain segment on which the station parks. Alternatively, the parking station may be allocated to a partial frequency band range of the channel bandwidth.

It may be understood that, when the AP transmits a PPDU to a station parking on a frequency domain segment, a signaling field of the PPDU is transmitted on the frequency domain segment on which the station parks, and a resource unit indicated by a resource unit allocation subfield in the signaling field of the PPDU may belong to the frequency domain segment on which the station parks, or may not belong to the frequency domain segment on which the station parks. In other words, the frequency domain segment on which the station parks in this application may be different from a frequency band range in which the station transmits data.

The PPDU includes a legacy preamble field, a signaling field, and data, and the signaling field may include, for example, a U-SIG and an EHT-SIG. The legacy preamble field may be consistent with the legacy preamble field in FIG. 4A or FIG. 4B. The U-SIG is used to carry common information that needs to be received by the station parking on the frequency domain segment. For example, the U-SIG may include information indicating a PPDU version, information indicating an uplink/downlink, information indicating a frequency domain bandwidth of the PPDU, and puncturing indication information. The EHT-SIG is used to carry at least complete scheduling information of the station parking on the frequency domain segment.

102. The AP sends corresponding frequency domain segment content on a corresponding frequency domain segment, that is, sends first frequency domain segment content on a first frequency domain segment, and sends second frequency domain segment content on a second frequency domain segment.

Correspondingly, a method for receiving a preamble part of a PPDU by a station is provided:

201. A station receives, on a frequency domain segment on which the station parks, frequency domain segment content that corresponds to the frequency domain segment and that is in a preamble part of a PPDU, where the frequency domain segment content includes complete scheduling information (for example, a resource allocation field of the parking station and all user fields of a parking station that is scheduled) of a scheduled station in the station parking on the frequency domain segment.

202. The station obtains scheduling information of the station based on the foregoing information.

In the foregoing manner, a station parking on a frequency domain segment only needs to obtain a signaling field part in a preamble part corresponding to the frequency domain segment, and does not need to obtain signaling field parts corresponding to an entire channel bandwidth.

In another embodiment, a station parking on a frequency domain segment may perform transmission only in a frequency band range of a channel bandwidth. On each frequency domain segment, only a signaling field related to a frequency band range corresponding to the frequency domain segment is transmitted, and there is no need to transmit, on each frequency domain segment, signaling fields corresponding to an entire channel bandwidth. Specifically, each frequency domain segment may correspond to a preset frequency band range that may be understood as a frequency band range of an RU allocated to a STA parking on the frequency domain segment, or may be understood as a frequency band range in which a STA parking on the frequency domain segment transmits data. In this way, one frequency domain segment can be used to transmit only a signaling field related to a partial frequency band range, to reduce overheads of transmitting a signaling field on one frequency domain segment.

Specifically, the signaling field on the frequency domain segment includes a resource unit allocation subfield corresponding to the frequency band range, and includes at least a user field of a station that parks on the frequency domain segment and that is allocated to an RU indicated by the resource unit allocation subfield.

Figure 6A:
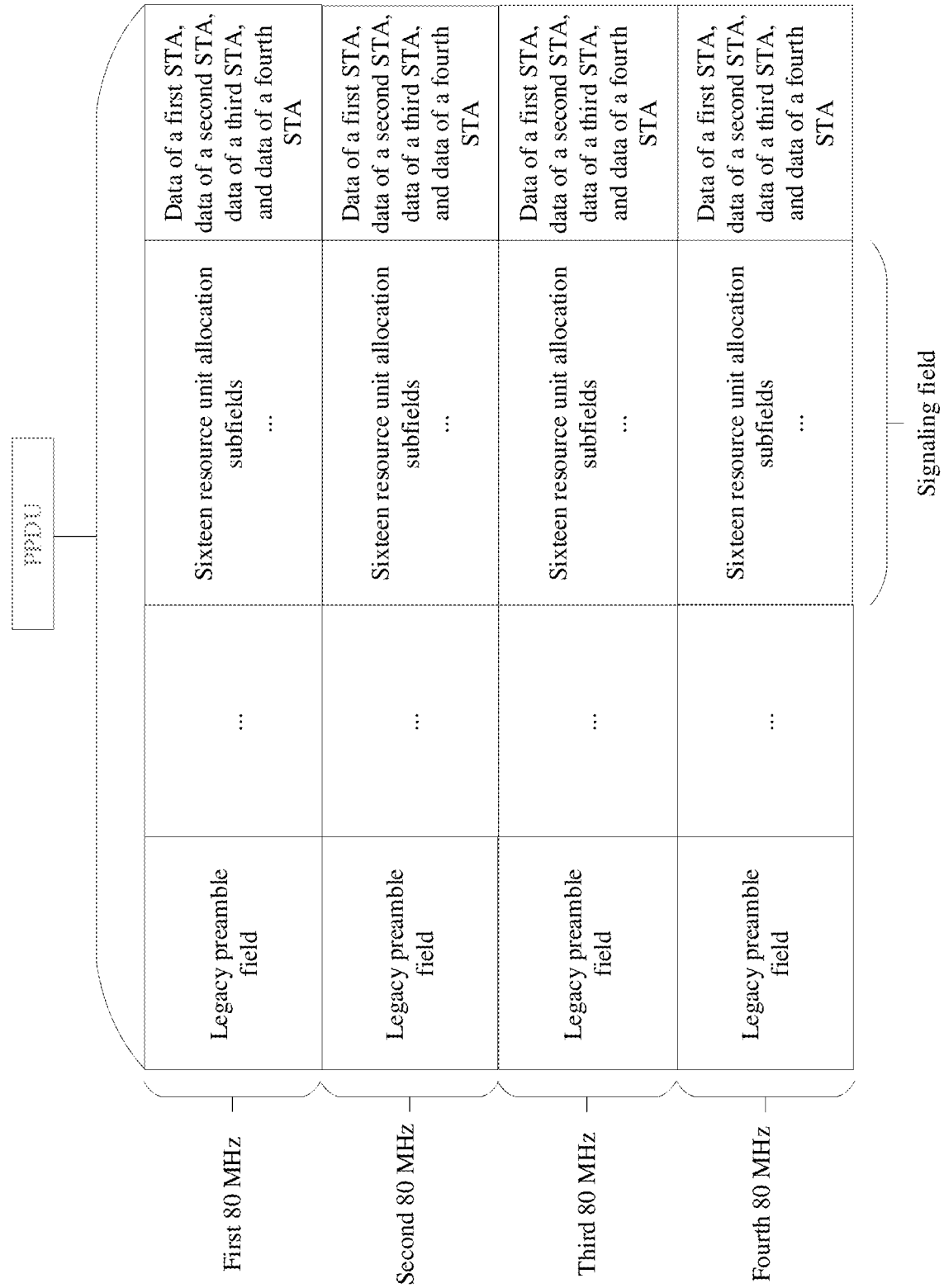
FIG. 6A is a schematic diagram of a structure of a PPDU according to an embodiment of this application.
Figure 6B:
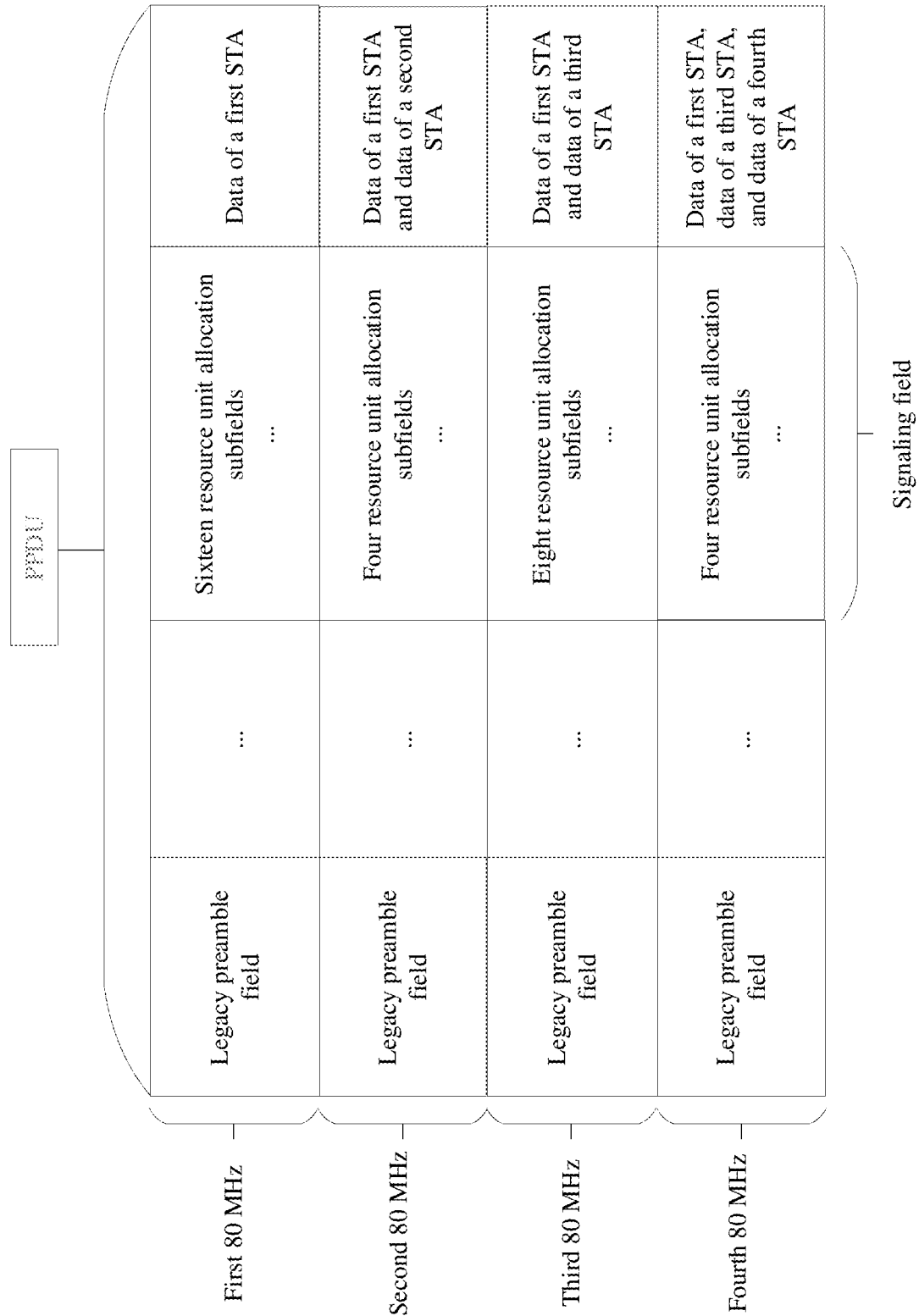
FIG. 6B is a schematic diagram of another structure of a PPDU according to an embodiment of this application.
Figure 6C:
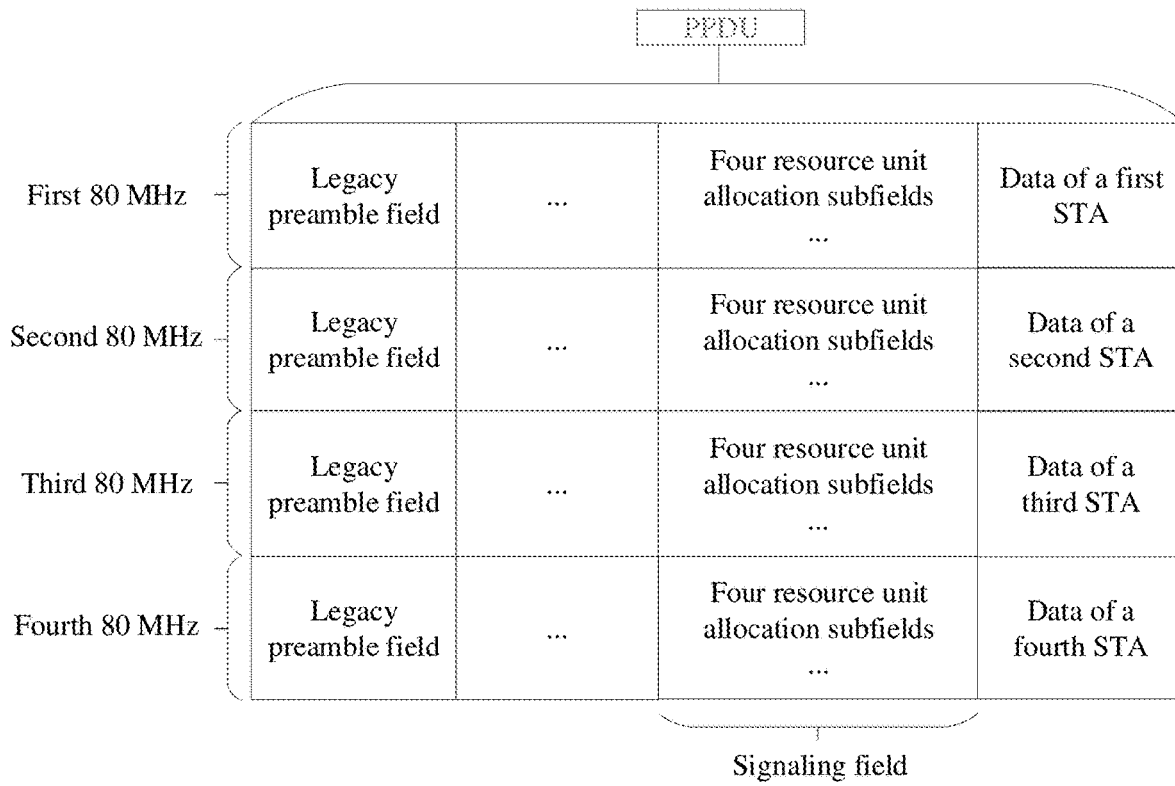
FIG. 6C is a schematic diagram of still another structure of a PPDU according to an embodiment of this application.

Referring to FIG. 6A to FIG. 6C, the following describes, by using a specific example, a solution in which signaling fields in a complete channel bandwidth is transmitted on one frequency domain segment, and a solution in which a partial signaling field in a frequency band range corresponding to the frequency domain segment is transmitted on the frequency domain segment.

For example, the signaling field may include a field indicating a channel bandwidth for transmitting a PPDU. An AP indicates, to a STA by using the field indicating the bandwidth in the signaling field, a total channel bandwidth is 320 MHz, where the 320 MHz is divided into four frequency domain segments. A first frequency domain segment is the first 80 MHz, a second frequency domain segment is the second 80 MHZ, a third frequency domain segment is the third 80 MHZ, and a fourth frequency domain segment is the fourth 80 MHz. For ease of description, a STA parking on the first frequency domain segment is referred to as a first STA, a STA parking on the second frequency domain segment is referred to as a second STA, a STA parking on the third frequency domain segment is referred to as a third STA, and a STA parking on the fourth frequency domain segment is referred to as a fourth STA.

In a first possible case, a station parking on each frequency domain segment may be allocated to an RU at any location in the entire channel bandwidth. In other words, a frequency band range corresponding to each frequency domain segment is the complete 320 MHz channel bandwidth for transmitting the PPDU. Each frequency domain segment is used to transmit signaling fields corresponding to the complete channel bandwidth. FIG. 6A is a schematic diagram of a structure of a PPDU according to an embodiment of this application. As shown in FIG. 6A, a signaling field transmitted on each frequency domain segment, for example, an EHT-SIG, includes resource unit allocation subfields indicating the complete 320 MHz channel bandwidth.

For ease of description, in this embodiment of this application, each resource unit allocation subfield indicates, at a granularity of 20 MHz, RU allocation corresponding to one 20 MHz. However, that each resource unit allocation subfield provides an indication at a granularity of 20 MHz is not limited in this application.

For example, if each resource unit allocation subfield indicates, at a granularity of 20 MHz, RU allocation corresponding to one 20 MHz, in the example in FIG. 6A, the signaling field transmitted on each frequency domain segment includes sixteen resource unit allocation subfields and user fields corresponding to RUs indicated by the sixteen resource unit allocation subfields.

In a second possible case, a station parking on at least one frequency domain segment is allocated to a partial frequency band range of the channel bandwidth. In other words, a frequency band range corresponding to the at least one frequency domain segment is less than the complete 320 MHz channel bandwidth for transmitting the PPDU.

For example, FIG. 6B is a schematic diagram of another structure of a PPDU according to an embodiment of this application. As shown in FIG. 6B, a signaling field transmitted on each frequency domain segment includes a signaling field used to indicate a frequency band range corresponding to the frequency domain segment. In a corresponding example, the signaling field may include only a resource unit allocation subfield indicating RU allocation in the frequency band range corresponding to the frequency domain segment and a user field corresponding to the resource unit allocation subfield, and may not include resource allocation information in another frequency band range, to reduce overheads.

It should be noted that the frequency band range corresponding to each frequency domain segment is not "80 MHz" corresponding to each frequency domain segment that is used to transmit the signaling field and that is mentioned in the foregoing example, and may be understood by using the following specific example.

Specifically, for example, a frequency band range corresponding to the first frequency domain segment is the 320 MHz. A frequency band range in which the first STA receives data is the 320 MHz. In this case, a signaling field transmitted by the AP on the first frequency domain segment (the first 80 MHz) includes sixteen resource unit allocation subfields that respectively indicate RU allocation per 20 MHz in the 320 MHz.

In ascending order of frequencies, a frequency band range corresponding to the second frequency domain segment is the second 80 MHz in the 320 MHz. A frequency band range in which the second STA receives data is the 80 MHz. In this case, a signaling field transmitted on the second frequency domain segment is a signaling field corresponding to the 80 MHz. The signaling field transmitted on the second frequency domain segment includes only four resource unit allocation subfields that respectively indicate RU allocation per 20 MHz in the 80 MHz.

A frequency band range corresponding to the third frequency domain segment is 160 MHz with a highest frequency in the 320 MHz. A frequency band range in which the third STA receives data is the 160 MHz. In this case, a signaling field transmitted on the third frequency domain segment is a signaling field corresponding to the 160 MHz. The signaling field transmitted on the third frequency domain segment includes only eight resource unit allocation subfields that respectively indicate RU allocation per 20 MHz in the 160 MHz.

A frequency band range corresponding to the fourth frequency domain segment is 80 MHz with a highest frequency in the 320 MHz. A frequency band range in which the fourth STA receives data is the 80 MHz. A signaling field transmitted on the fourth frequency domain segment is a signaling field corresponding to the 80 MHz. The signaling field transmitted on the fourth frequency domain segment includes only four resource unit allocation subfields that respectively indicate RU allocation per 20 MHz in the 80 MHz.

For another example, a station parking on each frequency domain segment is allocated to only the frequency domain segment on which the station parks. In other words, a frequency band range corresponding to each frequency domain segment is the same as that of the frequency domain segment on which the station parks. FIG. 6C is a schematic diagram of still another structure of a PPDU according to an embodiment of this application. A frequency band range corresponding to the first frequency domain segment is the first 80 MHz, a frequency band range corresponding to the second frequency domain segment is the second 80 MHz, a frequency band range corresponding to the third frequency domain segment is the third 80 MHz, and a frequency band range corresponding to the fourth frequency domain segment is the fourth 80 MHz. In this case, each frequency domain segment includes only four resource unit allocation subfields.

It may be learned that, compared with the example that is in the first possible case and in which the signaling field transmitted on each frequency domain segment needs to include sixteen resource unit allocation subfields indicating the complete channel bandwidth, in the example in the foregoing second possible case, the signaling field transmitted on the frequency domain segment does not need to include sixteen resource unit allocation subfields indicating the complete channel bandwidth. It may be understood that the user field corresponds to the resource unit allocation subfield. If a quantity of resource unit allocation subfields in the signaling field is reduced, a quantity of user fields is correspondingly reduced.

In this way, each frequency domain segment is used to transmit only a signaling field in a frequency band range corresponding to the frequency domain segment. In other words, the signaling field transmitted on each frequency domain segment includes only scheduling information for scheduling a STA parking on the frequency domain segment. In this way, overheads of the signaling field can be reduced.

Optionally, the signaling field may include a field indicating the frequency band range corresponding to each frequency domain segment. In this way, a corresponding frequency band range can be flexibly configured for each segment, so that RU allocation is more flexible.

In some optional embodiments, each frequency domain segment corresponds to a preset frequency band range. A user field in a signaling field transmitted on each frequency domain segment corresponds to at least one RU in the preset frequency band range corresponding to the frequency domain segment. For example, a preset frequency band range corresponding to the first frequency domain segment is 160 MHz. In this case, any user field in a signaling field transmitted on the first frequency domain segment at least corresponds to at least one RU in the 160 MHz frequency band range. In this way, a frequency band range corresponding to each frequency domain segment is preset. In a signaling field of the PPDU, the frequency band range corresponding to each frequency domain segment may not need to be indicated, so that overheads of the signaling field can be further reduced.

The preset frequency band range corresponding to each frequency domain segment is a frequency band range in which an RU allocated to a STA parking on the frequency domain segment is located. A STA on each frequency domain segment receives data on an RU in the preset frequency band range corresponding to the frequency domain segment. For a definition and an explanation of the preset frequency band range corresponding to each frequency domain segment, refer to the explanation of the frequency band range corresponding to each frequency domain segment in the foregoing embodiment. Details are not described herein again.

The following provides several examples of the preset frequency band range corresponding to each frequency domain segment.

A 320 MHz channel bandwidth is divided into four frequency domain segments, and a bandwidth of each frequency domain segment is 80 MHz. A first frequency domain segment is the first 80 MHz, a second frequency domain segment is the second 80 MHz, a third frequency domain segment is the third 80 MHz, and a fourth frequency domain segment is the fourth 80 MHz.

In an example, a preset frequency band range corresponding to the first frequency domain segment is the 320 MHz. A preset frequency band range corresponding to a frequency domain segment other than the first frequency domain segment is consistent with a frequency band range of the frequency domain segment, that is, a preset frequency band range corresponding to the second frequency domain segment is the second 80 MHz, a preset frequency band range corresponding to the third frequency domain segment is the third 80 MHz, and a preset frequency band range corresponding to the fourth frequency domain segment is the fourth 80 MHz.

In another example, a preset frequency band range corresponding to the first frequency domain segment is the 320 MHz. A preset frequency band range corresponding to the second frequency domain segment is consistent with a frequency band range of the frequency domain segment, that is, the preset frequency band range corresponding to the second frequency domain segment is the second 80 MHz. A preset frequency band range corresponding to the third frequency domain segment is 160 MHz, namely, 160 MHz with a highest frequency in the 320 MHz channel bandwidth for transmitting a PPDU. A preset frequency band range corresponding to the fourth frequency domain segment is consistent with a frequency band range of the frequency domain segment, that is, the preset frequency band range corresponding to the fourth frequency domain segment is 80 MHz with a highest frequency in the 320 MHz.

In still another example, a preset frequency band range corresponding to the first frequency domain segment is the 320 MHz. A preset frequency band range corresponding to the second frequency domain segment is 240 MHz, that is, the preset frequency band range corresponding to the second frequency domain segment is 240 MHz with a lowest frequency in the 320 MHz. A preset frequency band range corresponding to the third frequency domain segment is 160 MHz, that is, the preset frequency band range corresponding to the third frequency domain segment is 160 MHz with a highest frequency in the 320 MHz. A preset frequency band range corresponding to the fourth frequency domain segment is consistent with a frequency band range of the frequency domain segment, that is, the preset frequency band range corresponding to the fourth frequency domain segment is 80 MHz with a highest frequency in the 320 MHz.

In still another embodiment, to further reduce overheads in a frequency domain segment scenario, a manner used to set a resource unit allocation subfield and a user field in a signaling field of a PPDU is provided. Compared with the methods corresponding to the foregoing steps 101 and 102 and steps 201 and 202, in this manner, each field in each piece of frequency domain segment content may be simplified to indicate only complete scheduling information of a station parking on a corresponding frequency domain segment, to further reduce signaling overheads. It should be understood that the solutions of this embodiment may be separately implemented, or may be implemented in combination with the solutions of the foregoing embodiments.

For example, a common field and a user specific field in a signaling field in one piece of frequency domain segment content may be separately simplified:
1. Simplify a Resource Unit Allocation Subfield in the Common Field.

Each resource unit allocation subfield in the common field focuses only on a resource block allocation case of a scheduled station in a station parking on a frequency domain segment on which the signaling field is transmitted. The foregoing focusing means that because a station may be allocated to any resource block of a channel bandwidth, each resource unit allocation subfield needs to cover or indicate a resource block division result of the entire channel bandwidth. However, accurate information may be provided only for a resource unit that is allocated to a parking station, and only simplified (or referred to as fuzzed) information is provided for another unrelated resource unit.
2. Simplify a User Field in the User Specific Field Part.

The user specific field may include a user field of the scheduled station in the station parking on the frequency domain segment on which the signaling field is transmitted, and a user field of a station that does not park on the frequency domain segment on which the signaling field is transmitted may be totally omitted, or a part thereof may be omitted.

Correspondingly, in this embodiment, the station receives the signaling field in the preamble part only on the frequency domain segment on which the station parks.

For stations parking on different frequency domain segments, the resource unit allocation subfield and the user specific field part in the signaling field of the PPDU are set based on a case of a station parking on a frequency domain segment, to resolve a problem of reducing indication overheads of the signaling field part.

In a specific example, when the AP sends a PPDU to a station parking on a frequency domain segment, at least one of a quantity of RUs and a quantity of user fields that are indicated by a resource unit allocation subfield included in a signaling field of the PPDU is simplified and indicated in a manner of "cheating" or "deception" or "untruth". In other words, in a resource unit indicated by a resource unit allocation subfield in a signaling field of a PPDU sent by the AP to a station parking on a frequency domain segment, a quantity of resource units not allocated to the station parking on the frequency domain segment may not be a real quantity of resource units, and a quantity of user fields corresponding to the resource units may not be real, but a quantity of resource units allocated to the station parking on the frequency domain segment and a quantity of user fields corresponding to the resource units are real. This does not affect obtaining, by the station parking on the frequency domain segment, a resource unit that is really allocated to the station.

In a first simplification indication manner, when a PPDU is transmitted to a station parking on a frequency domain segment, a signaling field of the PPDU is transmitted on the frequency domain segment. For a resource unit not allocated to the station parking on the frequency domain segment, a resource unit allocation subfield indicates that a quantity of user fields corresponding to the resource unit is 0. Correspondingly, a corresponding user field is not set in a user specific field in the signaling field, that is, the quantity of user fields corresponding to the resource unit is 0. This omits the quantity of user fields in the user specific field, to reduce indication overheads. The user field is simplified, so that a user specific field part in a signaling field transmitted on a frequency domain segment includes only a user field of a STA parking on the frequency domain slicing.

For example, if an RU corresponding to a channel bandwidth for transmitting the PPDU includes an RU that is an RU not allocated to a STA parking on a frequency domain segment on which a signaling field is transmitted, a resource unit allocation subfield in the signaling field transmitted on the frequency domain segment indicates that a quantity of user fields corresponding to the resource unit is 0. Correspondingly, a user field corresponding to the large RU is not set in a user specific field, and the resource unit allocation subfield indicates that the quantity of user fields corresponding to the large RU is 0. In this simplification indication manner in which the user field is not set in the signaling field based on an actual case, the user field corresponding to the large RU not allocated to the STA parking on the frequency domain segment on which the signaling field is transmitted may be omitted.

In a second simplification indication manner, when a PPDU is transmitted to a station parking on a frequency domain segment, a signaling field of the PPDU is transmitted on the frequency domain segment. For a plurality of resource units not allocated to the station parking on the frequency domain segment, the resource units are considered as a resource unit as large as possible to be indicated by using a resource unit allocation subfield. In this way, a quantity of RUs indicated by the resource unit allocation subfield is less than an actual quantity of RUs not allocated to the station parking on the frequency domain segment. In addition, a quantity, indicated by the resource unit allocation subfield, of user fields corresponding to the RUs not allocated to the station parking on the frequency domain segment is as small as possible.

In addition, when the user field corresponding to the RU is set in a user specific field, a quantity of user fields may be less than an actual quantity of user fields corresponding to the resource unit as much as possible, to reduce the quantity of user fields in the user specific field, and reduce indication overheads. In this simplification indication manner, the resource unit allocation subfield is simplified, and at least a part of user fields that are not of the station parking on the frequency domain segment are omitted.

For example, an RU corresponding to one 20 MHz includes at least one RU allocated to a STA parking on a frequency domain segment on which a signaling field is transmitted and at least two second RUs not allocated to the STA parking on the frequency domain segment on which the signaling field is transmitted. In this case, in the signaling field transmitted on the frequency domain segment, the at least two second RUs may be considered as one larger RU to be indicated by using a corresponding resource unit allocation subfield. In this case, in a user specific field part, only a user field corresponding to the larger RU needs to be set, and a quantity of user fields is set to a value as small as possible. In a conventional technology, the at least two second RUs correspond to at least two user fields. In this case, the quantity of user fields can be reduced as much as possible in this simplification indication manner. In addition, when the resource unit allocation subfield indicates the larger RU, a quantity of user fields corresponding to the larger RU may be a minimum value as much as possible, for example, 1.

Based on the foregoing simplification indication manner, an embodiment of this application provides a data transmission method. The data transmission method is used to transmit a PPDU, and overheads of a signaling field of the PPDU are reduced in the foregoing simplification indication manner.

Figure 7A:
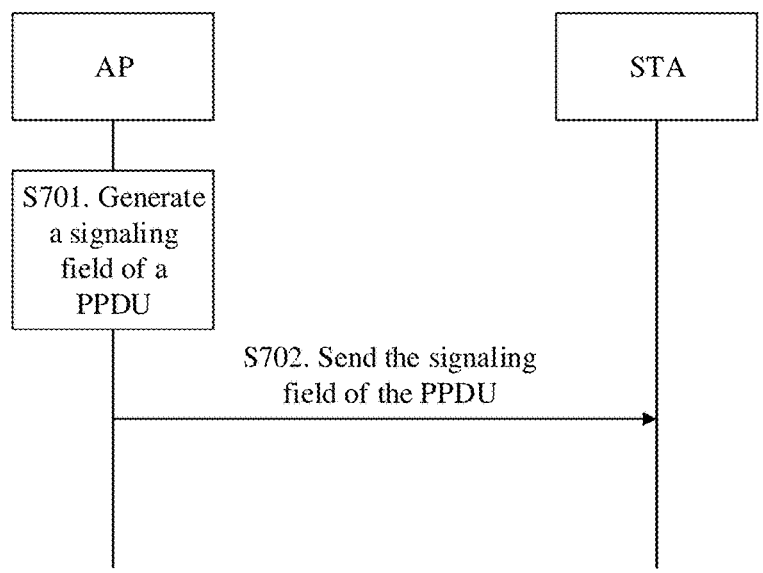
FIG. 7A is a schematic flowchart of a data transmission method according to an embodiment of this application.

FIG. 7A is a schematic flowchart of a data transmission method according to an embodiment of this application. This embodiment of this application is described by using an embodiment in which an AP sends a PPDU to a STA. The data transmission method in this application is also applicable to a scenario in which an AP sends a PPDU to an AP and a scenario in which a STA sends a PPDU to a STA. In different scenarios, transmitted PPDUs and names of signaling fields thereof are different, but functions and roles thereof are similar. Details are not described in this embodiment of this application.

In a scenario of this embodiment, a channel bandwidth for transmitting the PPDU to the STA by the AP includes at least two frequency domain segments. The at least two frequency domain segments include a first frequency domain segment. Several STAs park on each frequency domain segment. For example, a quantity of stations parking on one frequency domain segment may be any quantity greater than or equal to 0. A signaling field of the PPDU includes but is not limited to a common field and a user specific field. The common field includes a resource unit allocation subfield. The user specific field includes a user field.

The data transmission method in this embodiment of this application may include the following steps.

S701. The AP generates the signaling field of the PPDU.

Step S701 may be implemented by a processor of the AP, that is, the processor of the AP generates the signaling field of the PPDU.

In the data transmission method in this application, when the AP transmits the PPDU to the STA, an indication manner of the signaling field transmitted on the first frequency domain segment is at least one of the foregoing simplification indication manners.

In 802.11be, the signaling field may be an EHT-SIG, or may be a U-SIG and an EHT-SIG. The signaling field in this embodiment of this application is not limited to a SIG field in 802.11be, and the signaling field in this embodiment of this application may be a SIG field related to a standard version later than 802.11be.

In this embodiment of this application, the resource unit allocation subfield may provide an indication by using an entry in a resource unit allocation subfield (RU allocation subfield, RA subfield) table. For example, the resource unit allocation subfield may provide an indication by using an entry in Table 1, or may provide an indication by using an entry in Table 2 or Table 3, or may provide an indication by using an entry in Table 2 or Table 3 in combination with Table 4 or Table 5.

S702. The AP sends the signaling field of the PPDU.

Step S702 may be implemented by a transceiver of the AP, that is, the transceiver of the AP sends the signaling field of the PPDU.

Correspondingly, a STA parking on the first frequency domain segment receives the PPDU sent by the AP, obtains, from the user field included in the user specific field, a user field that carries an identifier of the STA, and obtains data transmitted on an RU corresponding to the user field. Specifically, a transceiver of the STA receives the PPDU sent by the AP. A processor of the STA obtains, from the user field included in the user specific field, the user field that carries the identifier of the STA, obtains the RU corresponding to the user field, and receives data on the RU.

Based on the foregoing data transmission method, the following separately describes the resource unit allocation subfield and the user field in the signaling field when two simplification indication manners are used.

In some possible implementations, the resource unit allocation subfield in the signaling field provides an indication in the foregoing first simplification indication manner.

In this embodiment, a quantity, of user fields, indicated by a resource unit allocation subfield that corresponds to a large RU and that is in the signaling field represents a quantity of user fields that are contributed by the RU to one content channel in the user specific field, and the user field is a user field corresponding to the STA parking on the first frequency domain segment. The user field includes an identifier of a corresponding STA.

A signaling field transmitted on each frequency domain segment may be transmitted by using two or more content channels (CC). Each CC is used to transmit a partial signaling field.

For example, the channel bandwidth for transmitting the PPDU is 320 MHz. The signaling field that is of the PPDU and that is transmitted on the first frequency domain segment is transmitted by using a CC1 and a CC2. The signaling field transmitted on the first frequency domain segment includes sixteen resource unit allocation subfields. In this case, the sixteen resource unit allocation subfields may be numbered based on a sequence. A resource unit allocation subfield with an odd number may be transmitted on the CC1, and a resource unit allocation subfield with an even number may be transmitted on the CC2. Each CC is further used to transmit a user field corresponding to a resource unit allocation subfield on the CC. For example, a user field corresponding to the resource unit allocation subfield with the odd number is transmitted on the CC1, and a user field corresponding to the resource unit allocation subfield with the even number is transmitted on the CC2. The resource unit allocation subfield indicates an RU included in the channel bandwidth for transmitting the PPDU, and indicates that a quantity of user fields that are contributed by the RU to the user specific field on a corresponding content channel.

In an implementation, the resource unit allocation subfield indicates that a quantity of user fields corresponding to an RU that is in the resource unit RU included in the channel bandwidth for transmitting the PPDU and that is not allocated to the STA parking on the first frequency domain segment is 0.

If the resource unit allocation subfield indicates that a quantity of user fields corresponding to an RU in the resource unit RU included in the channel bandwidth for transmitting the PPDU is 0, it indicates that the RU is not allocated to the STA parking on the first frequency domain segment.

In this embodiment, the signaling field transmitted on the first frequency domain segment indicates one or more RUs, and indicates that a quantity of user fields corresponding to a large RU that is allocated to the STA that does not park on the first frequency domain segment is 0. In this way, in the user specific field part in the signaling field, a corresponding user field is set for the large RU of the STA parking on the first frequency domain segment, the user field carries the identifier of the station, and a corresponding user field is not set for the large RU of the STA that does not park on the first frequency domain segment. In this way, a quantity of user fields in the signaling field can be reduced, so that overheads of the signaling field can be reduced.

Figure 7B:
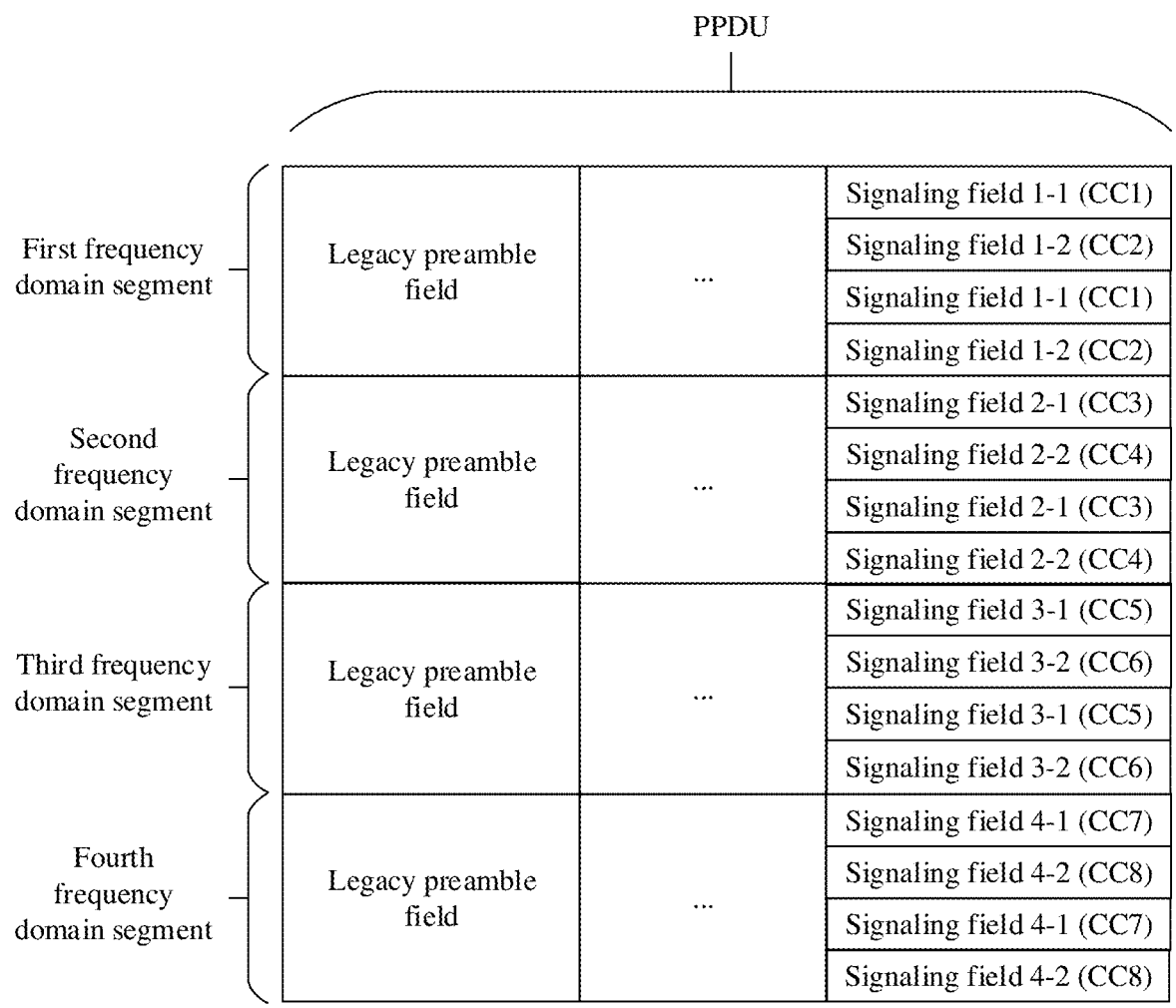
FIG. 7B is a schematic diagram of yet another structure of a PPDU according to an embodiment of this application.

FIG. 7B is a schematic diagram of a structure of a PPDU transmitted on each frequency domain segment of a PPDU. In this embodiment of this application, signaling fields that is of PPDUs and that is transmitted on all frequency domain segments are different. In addition, a resource unit allocation subfield in the signaling field that is of the PPDU and that is transmitted on each frequency domain segment is divided into two parts that are separately transmitted on two CCs, and a user field in the signaling field that is of the PPDU and that is transmitted on each frequency domain segment is also divided into two parts that are separately transmitted on two CCs.

Specifically, resource unit allocation cases indicated by a resource unit allocation subfield in a signaling field transmitted on one frequency domain segment are different. The resource unit allocation subfield in the signaling field on the frequency domain segment indicates, based on an actual case, an RU allocated to a STA parking on the frequency domain segment and a corresponding user field, and does not necessarily indicate, based on an actual case, an RU allocated to a STA that does not park on the frequency domain segment and a corresponding user field.

User fields in a signaling field transmitted on one frequency domain segment are also different. In a plurality of resource units RUs indicated by a resource unit allocation subfield in a signaling field on one frequency domain segment, a corresponding user field is set for a corresponding RU allocated to a STA parking on the frequency domain segment, and the user field includes an identifier of the STA parking on the frequency domain segment. For a corresponding RU not allocated to the STA parking on the frequency domain segment, no user field is set for the RU, or a quantity of user fields is 0.

For example, a plurality of RUs indicated by the resource unit allocation subfield in the signaling field transmitted on the first frequency domain segment include a first RU and a second RU, the first RU is an RU allocated to a STA parking on the first frequency domain segment, and the second RU is a large RU not allocated to the STA parking on the first frequency domain segment.

The user specific field part in the signaling field transmitted on the first frequency domain segment includes a user field corresponding to the first RU, and the user field carries an identifier of the STA parking on the first frequency domain segment. The user specific field part does not include a user field corresponding to the second RU.

In addition, the second RU may be actually one or more RUs not allocated to the STA parking on the first frequency domain segment. The RU not allocated to the STA parking on the first frequency domain segment may be one or more RUs allocated to a STA parking on a frequency domain segment other than the first frequency domain segment, or may be an RU not allocated to any STA.

A scenario in which the channel bandwidth for transmitting the PPDU is 320 MHz and the channel bandwidth for transmitting the PPDU is divided into four frequency domain segments is used as an example below for description.

In ascending order of frequencies, a first frequency domain segment is the first 80 MHz, a second frequency domain segment is the second 80 MHz, a third frequency domain segment is the third 80 MHz, and a fourth frequency domain segment is the fourth 80 MHz. In this embodiment, a first signaling field transmitted on the first frequency domain segment corresponding to the first 80 MHz and a second signaling field transmitted on the second frequency domain segment corresponding to the second 80 MHz are specifically used as an example for description. A signaling field transmitted on the third frequency domain segment corresponding to the third 80 MHz and a signaling field transmitted on the fourth frequency domain segment corresponding to the four 80 MHz are not listed one by one in this embodiment of this application.

Figure 8A:
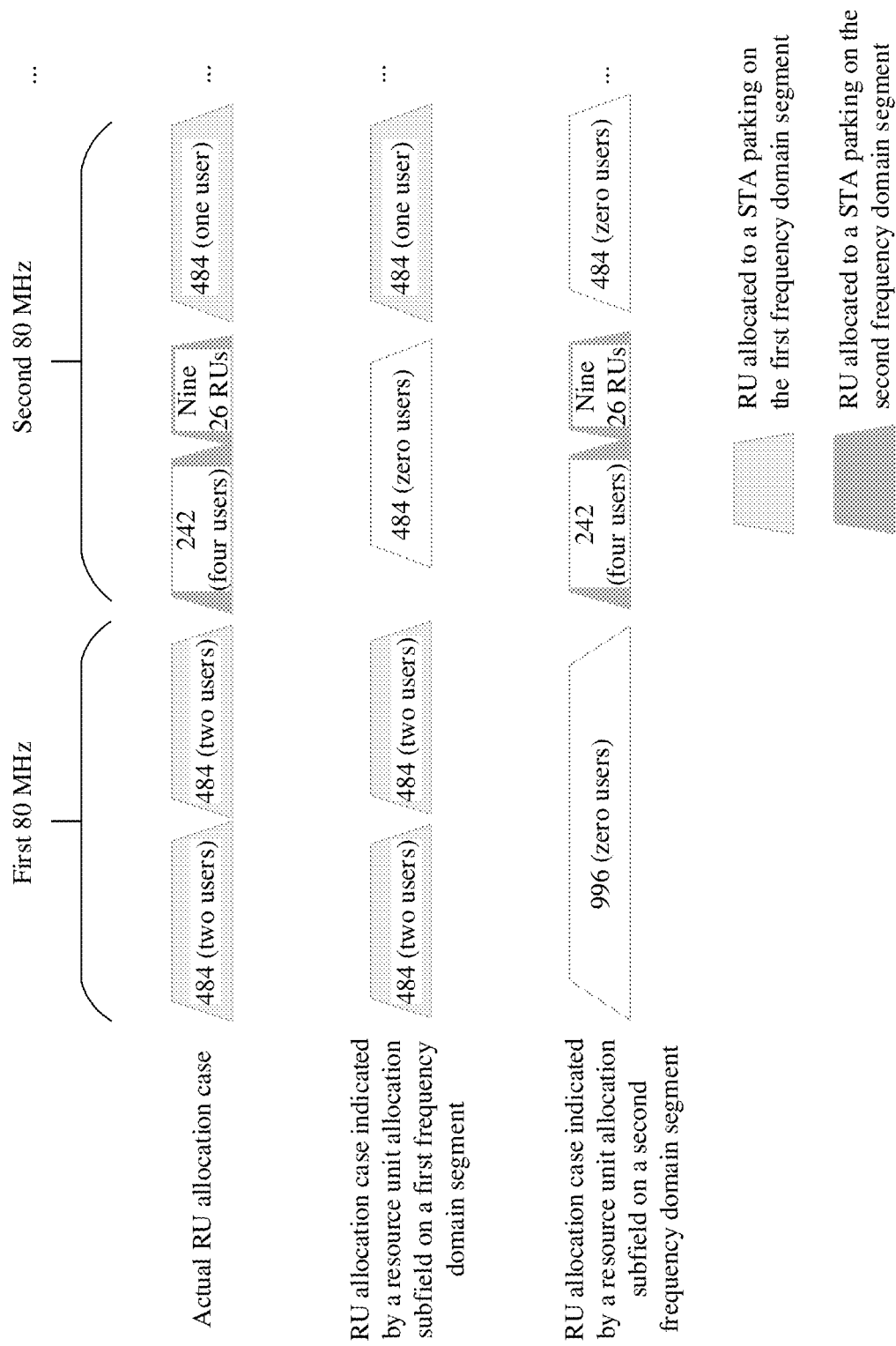
FIG. 8A is a schematic diagram of a resource unit allocation scenario according to an embodiment of this application.

FIG. 8A is a schematic diagram of a resource unit allocation scenario according to an embodiment of this application. In an example, an actual resource unit allocation case corresponding to the 320 MHz channel bandwidth is as follows: 40 MHz with a lowest frequency in the first 80 MHz corresponds to one 484-tone RU, and the 484-tone RU is allocated to two STAs parking on the first frequency domain segment. 40 MHz with a highest frequency in the first 80 MHz corresponds to one 484-tone RU, and the 484-tone RU is allocated to two STAs parking on the first frequency domain segment. 20 MHz with a lowest frequency in the second 80 MHz corresponds to one 242-tone RU, and the 242-tone RU is allocated to four STAs parking on the second frequency domain segment. Then, 20 MHz with a second-lowest frequency corresponds to nine 26-tone RUs, and the nine 26-tone RUs are respectively allocated to nine STAs parking on the second frequency domain segment. 40 MHz with a highest frequency in the second 80 MHz corresponds to a 484-tone RU, and the 484-tone RU is allocated to one STA parking on the first frequency domain segment. RU allocation cases corresponding to the third 80 MHz and the fourth 80 MHz are not shown.

FIG. 8B is a schematic diagram of a structure of a content channel according to an embodiment of this application. The first signaling field transmitted on the first frequency domain segment is sent by using two CCs, and the two CCs are respectively a CC1 and a CC2. The signaling field transmitted on the first frequency domain segment includes a resource unit allocation subfield 1 to a resource unit allocation subfield 16. In ascending order of frequencies, the resource unit allocation subfield 1 to the resource unit allocation subfield 16 each correspond to one 20 MHz in the 320 MHZ.

A resource unit allocation subfield whose sequence number is an odd number is transmitted on the CC1, and a resource unit allocation subfield whose sequence number is an even number is transmitted on the CC2. In this way, a length of a common field transmitted on each CC can be effectively shortened.

Figure 8C:
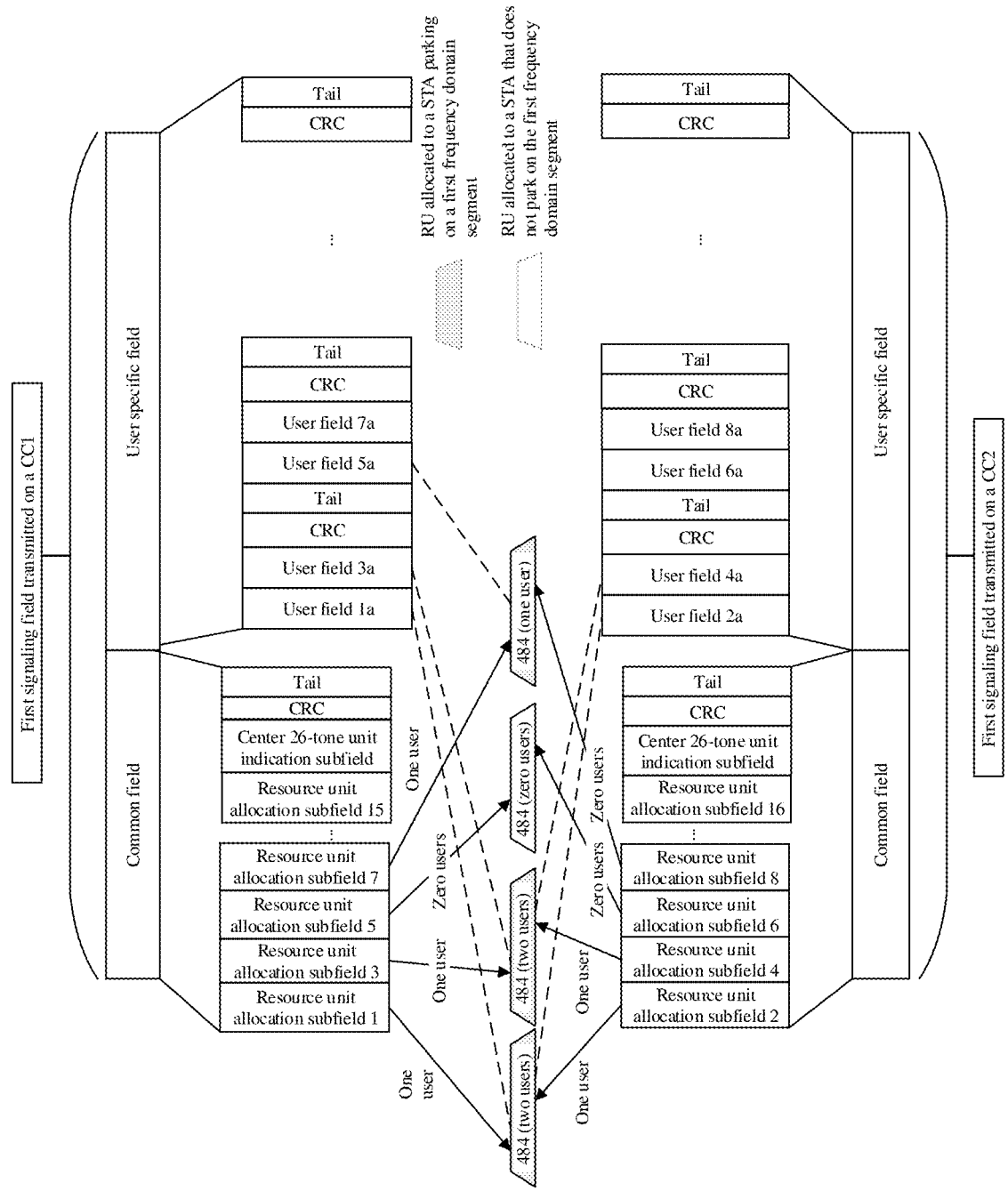
FIG. 8C is a schematic diagram of a structure of a signaling field according to an embodiment of this application.

FIG. 8C is a schematic diagram of a structure of a signaling field according to an embodiment of this application. Referring to FIG. 8B and FIG. 8C, the resource unit allocation subfield 1 indicates a 484-tone RU, and indicates that a quantity of user fields that correspond to the 484-tone RU and that are included in the CC1 is 1. The resource unit allocation subfield 2 indicates the 484-tone RU, and indicates that a quantity of user fields that correspond to the 484-tone RU and that are included in the CC2 is 1. The resource unit allocation subfield 3 indicates a 484-tone RU, and indicates that a quantity of user fields that correspond to the 484-tone RU and that are included in the CC1 is 1. The resource unit allocation subfield 4 indicates the 484-tone RU, and indicates that a quantity of user fields that correspond to the 484-tone RU and that are included in the CC2 is 1. The resource unit allocation subfield 5 indicates a 484-tone RU, and indicates that a quantity of user fields that correspond to the 484-tone RU and that are included in the CC1 is 0. The resource unit allocation subfield 6 indicates the 484-tone RU, and indicates that a quantity of user fields that correspond to the 484-tone RU and that are included in the CC2 is 1. The resource unit allocation subfield 7 indicates a 484-tone RU, and indicates that a quantity of user fields that correspond to the 484-tone RU and that are included in the CC1 is 1. The resource unit allocation subfield 8 indicates the 484-tone RU, and indicates that a quantity of user fields that correspond to the 484-tone RU and that are included in the CC1 is 0.

A STA parking on a frequency domain segment may determine, based on a sequence of RUs corresponding to resource unit allocation subfields on all CCs on the frequency domain segment and a sequence of user fields on the CCs, an RU corresponding to each user field.

For example, a STA1 parking on the first frequency domain segment may determine, based on a sequence of RUs indicated by resource unit allocation subfields on the CC1 and the CC2 and a sequence of user fields, that a user field corresponding to the 484-tone RU corresponding to the 40 MHz with the lowest frequency in the first 80 MHz is 1a, and the user field 1a carries identifier information of the STA1. In this case, the STA1 determines that the 484-tone RU is an RU allocated to the STA1. Similarly, a STA2 parking on the first frequency domain segment determines, based on a user field 2a and identifier information of the STA2 carried in the user field a2, that the 484-tone RU is an RU allocated to the STA2. A STA3 parking on the first frequency domain segment may determine, based on identifier information of the STA3 carried in a user field 3a, that the 484-tone RU corresponding to the 40 MHz with the highest frequency in the first 80 MHz is an RU allocated to the STA3. A STA4 parking on the first frequency domain segment may determine, based on identifier information of the STA4 carried in a user field 4a, that the 484-tone RU corresponding to the 40 MHz with the highest frequency in the first 80 MHz is an RU allocated to the STA4. A STA5 parking on the first frequency domain segment may determine, based on identifier information of the STA5 carried in a user field 5a, that the 484-tone RU corresponding to the 40 MHz with the highest frequency in the second 80 MHz is an RU allocated to the STA5.

It may be learned that, the resource unit allocation subfield in the first signaling field transmitted on the first frequency domain segment indicates that 40 MHz with a lowest frequency in the second 80 MHz corresponds to a 484-tone RU, and indicates that a quantity of user fields corresponding to the 484-tone RU is 0. However, an RU corresponding to the 40 MHz is actually one 242-tone RU and nine 26-tone RUs that are RUs not allocated to the STA parking on the first frequency domain segment. In this case, the STA parking on the first frequency domain segment does not need to focus on a specific STA to which the 242-tone RU and the nine 26-tone RUs are allocated. In the first signaling field, the resource unit allocation subfield may not indicate the 242-tone RU and the nine 26-tone RUs based on an actual case, and the user field does not need to be set in the user specific field part based on an actual case.

In this way, compared with a conventional technology in which one user field corresponding to the 242-tone RU (assuming that the 242-tone is allocated to only one STA) and nine user fields corresponding to the nine 26-tone RUs need to be set in the user specific field, in this embodiment, user fields corresponding to the 242-tone RU and the nine 26-tone RUs are not set in the user specific field part in the first signaling field, so that at least ten user fields can be reduced, and overheads of the signaling field can be reduced.

In addition, in the resource unit allocation subfield in the first signaling field, the 242-tone RU and the nine 26-tone RUs are indicated as one 484-tone RU. In the second signaling field transmitted on the second frequency domain segment, two 484-tone RUs corresponding to the 80 MHz with the lowest frequency in the channel bandwidth for transmitting the PPDU are indicated as one 996-tone RU through combination. In this way, an indication of the resource unit allocation subfield can be simpler and clearer.

In addition, as shown in FIG. 8C, in ascending order of frequencies, the 484-tone RU corresponding to the 40 MHz with the lowest frequency in the first 80 MHz is allocated to two users parking on the first frequency domain segment. The resource unit allocation subfield 1 and the resource unit allocation subfield 2 indicate the 484-tone RU. The resource unit allocation subfield 1 indicates that a quantity of user fields corresponding to the 484-tone RU is 1 on the CC1. In this case, the user specific field part on the CC1 includes the user field 1a corresponding to the 484-tone RU. The resource unit allocation subfield 3 indicates that a quantity of user fields corresponding to the 484-tone RU is 1 on the CC2. In this case, the user specific field part on the CC1 includes the user field 3a corresponding to the 484-tone RU. In this way, a plurality of user fields corresponding to the 484-tone RU are separately allocated to the CC1 and the CC2 for transmission as evenly as possible, so that a quantity of user fields transmitted on each CC can be more balanced.

Referring to FIG. 8D, for a PPDU transmitted by the AP to a STA parking on the second frequency domain segment, a second signaling field of the PPDU is transmitted by using the second frequency domain segment. Specifically, the second signaling field is transmitted on two CCs, and the two CCs are respectively a CC3 and a CC4. The signaling field transmitted on the second frequency domain segment includes a resource unit allocation subfield 17 to a resource unit allocation subfield 32. In ascending order of frequencies, the resource unit allocation subfield 17 to the resource unit allocation subfield 32 each correspond to one 20 MHz in the 320 MHz.

A resource unit allocation subfield whose sequence number is an odd number is transmitted on the CC3, and a resource unit allocation subfield whose sequence number is an even number is transmitted on the CC4. In this way, a length of a common field transmitted on each CC can be effectively shortened.

Figure 8E:
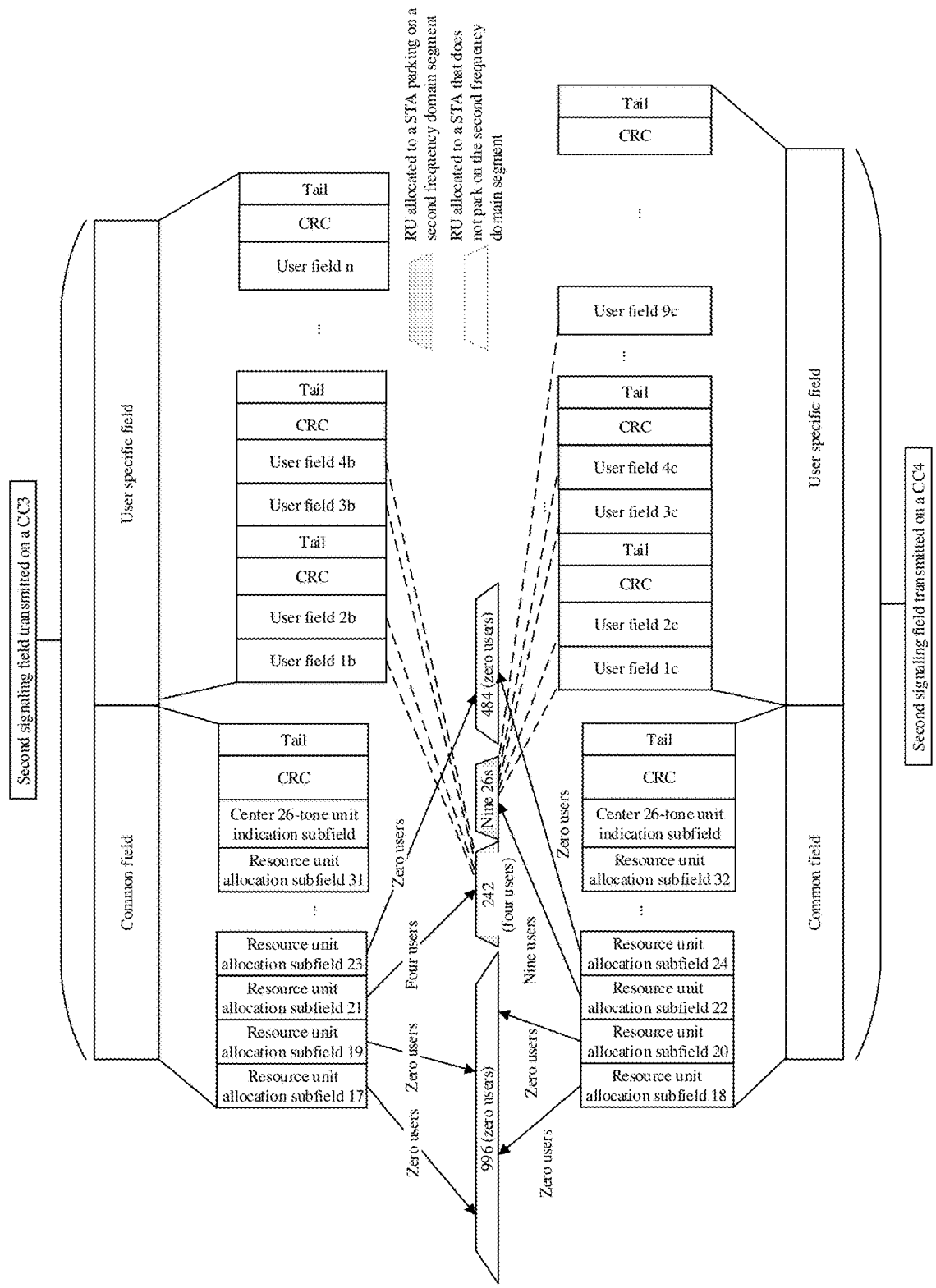
FIG. 8E is a schematic diagram of a structure of a signaling field according to another embodiment of this application.

FIG. 8D is a schematic diagram of a structure of a content channel according to another embodiment of this application. FIG. 8E is a schematic diagram of a structure of a signaling field according to another embodiment of this application. The resource unit allocation subfield 17 indicates a 996-tone RU, and indicates that a quantity of user fields that correspond to the 996-tone RU and that are included in the CC3 is 0. The resource unit allocation subfield 18 indicates the 996-tone RU, and indicates that a quantity of user fields that correspond to the 996-tone RU and that are included in the CC4 is 0. The resource unit allocation subfield 19 indicates the 996-tone RU, and indicates that a quantity of user fields that correspond to the 996-tone RU and that are included in the CC3 is 0. The resource unit allocation subfield 20 indicates the 996-tone RU, and indicates that a quantity of user fields that correspond to the 996-tone RU and that are included in the CC4 is 0. The resource unit allocation subfield 21 indicates a 242-tone RU, and indicates that a quantity of user fields that correspond to the 242-tone RU and that are included in the CC3 is 4. The resource unit allocation subfield 22 indicates nine 26-tone RUs, and indicates that a quantity of user fields that correspond to the nine 26-tone RUs and that are included in the CC4 is 9. The resource unit allocation subfield 23 indicates a 484-tone RU, and indicates that a quantity of user fields that correspond to the 484-tone RU and that are included in the CC3 is 0. The resource unit allocation subfield 24 indicates the 484-tone RU, and indicates that a quantity of user fields that correspond to the 484-tone RU and that are included in the CC4 is 0.

A STA parking on a frequency domain segment may determine, based on a sequence of RUs corresponding to resource unit allocation subfields on all CCs on the frequency domain segment and a sequence of user fields on the CCs, an RU corresponding to each user field.

For example, a STA6 parking on the second frequency domain segment may determine, based on identifier information of the STA6 in a user field 1b, that the 242-tone RU corresponding to the 20 MHz with the lowest frequency in the second 80 MHz is an RU allocated to the STA6. A STA7 parking on the second frequency domain segment may determine, based on identifier information of the STA7 in a user field 2b, that the 242-tone RU corresponding to the 20 MHz with the lowest frequency in the second 80 MHz is an RU allocated to the STA7. A STA8 parking on the second frequency domain segment may determine, based on identifier information of the STA8 in a user field 3b, that the 242-tone RU corresponding to the 20 MHz with the lowest frequency in the second 80 MHz is an RU allocated to the STA8. A STA9 parking on the second frequency domain segment may determine, based on identifier information of the STA9 in a user field 4b, that the 242-tone RU corresponding to the 20 MHz with the lowest frequency in the second 80 MHz is an RU allocated to the STA9. Another STA parking on the second frequency domain segment may also determine, in the foregoing manner, that an RU corresponding to a user field that includes identifier information of the STA is an RU allocated to the STA.

It may be learned that, the resource unit allocation subfield in the second signaling field indicates that an RU corresponding to 80 MHz with a lowest frequency in the channel bandwidth for transmitting the PPDU is a 996-tone RU, and indicates that a quantity of user fields corresponding to the 996-tone RU is 0 in the user field. In practice, the RU corresponding to the 80 MHz with the lowest frequency in the channel bandwidth for transmitting the PPDU is actually two 484-tone RUs that are RUs not allocated to the STA parking on the second frequency domain segment. The STA parking on the second frequency domain segment does not need to focus on a specific STA to which the two 484-tone RUs are allocated. In the second signaling field, the resource unit allocation subfield may not actually indicate the two 484-tone RUs based on an actual case, or may not actually indicate, based on an actual case, user fields corresponding to the two 484-tone RUs.

In this way, compared with the conventional technology in which an indication is provided based on an actual RU allocation case and the user fields corresponding to the two 484-tone RUs need to be set in the user specific field, in this embodiment, the user fields corresponding to the two 484-tone RUs are not set in the user specific field part in the second signaling field, so that the user fields corresponding to the two 484-tone RUs can be reduced, and overheads of the signaling field can be reduced.

In another implementation, the resource unit allocation subfield in the second signaling field indicates that an RU corresponding to 80 MHz with a lowest frequency in the channel bandwidth for transmitting the PPDU is a 996-tone RU, and indicates that a quantity of user fields corresponding to the 996-tone RU is 1. In this case, the quantity of user fields corresponding to the 996-tone RU in the user field specific part is 1. In this way, the four user fields corresponding to the two 484-tone RUs may be reduced at least to one user field.

In this way, the two 484-tone RUs may be indicated as one 996-tone RU, so that a quantity of RUs indicated by the resource unit allocation subfield is reduced, and a quantity of user fields corresponding to the 996-tone RU is less than a quantity of user fields corresponding to the two 484-tone RUs. In addition, in the user specific field, a quantity of user fields corresponding to the RU is also set to a minimum value as much as possible, for example, 1 or 0. In this way, a quantity of user fields can be greatly reduced to a largest degree, so that indication overheads are reduced.

Figure 9:
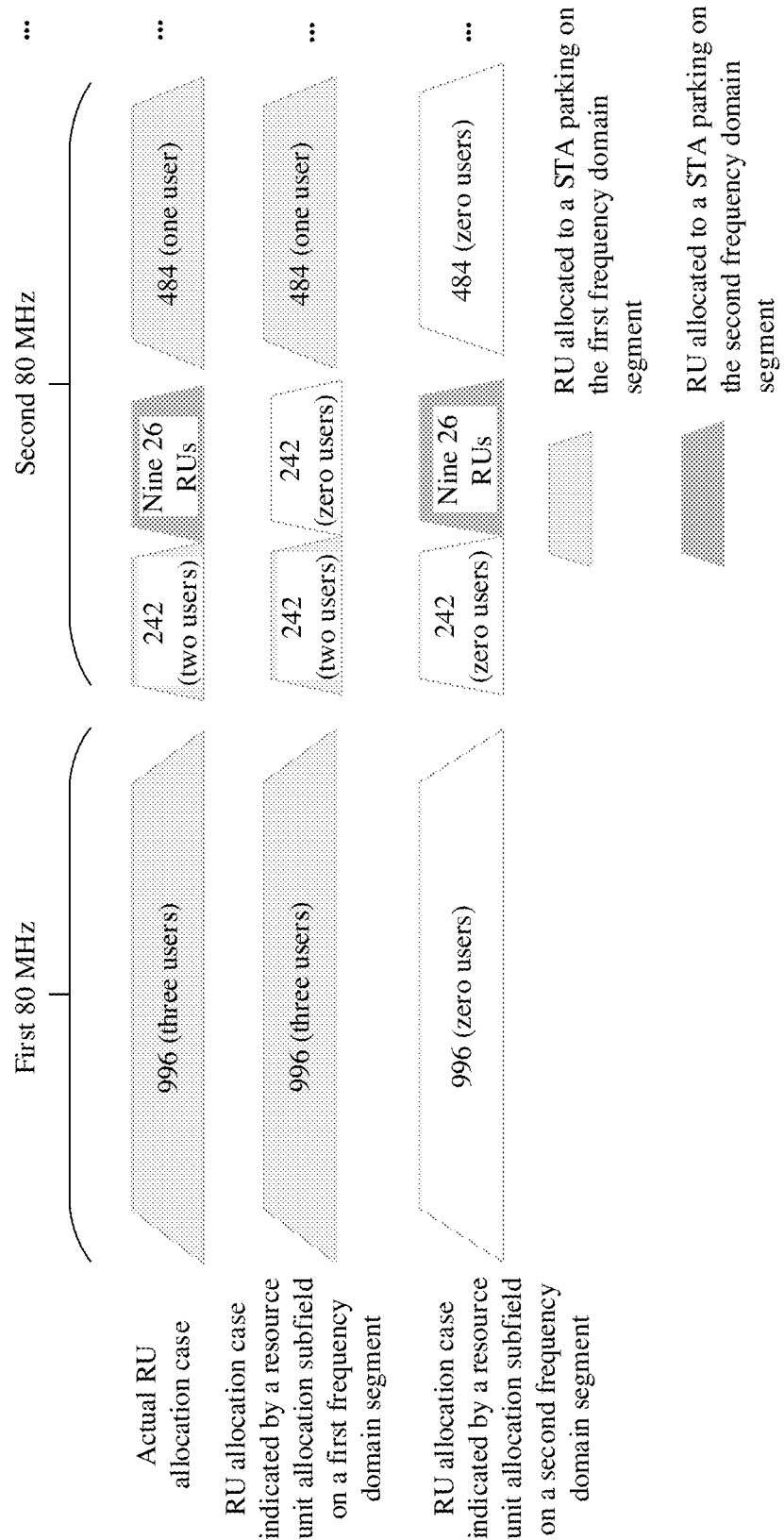
FIG. 9 is a schematic diagram of a resource unit allocation scenario according to another embodiment of this application.

FIG. 9 is a schematic diagram of a resource unit allocation scenario according to an embodiment of this application. As shown in FIG. 9, in another example, an actual resource unit allocation case of the 320 MHz is allocated is as follows: In ascending order of frequencies, the first 80 MHz corresponds to one 996-tone RU, and the 996-tone RU is allocated to three STAs parking on the first frequency domain segment. 20 MHz with a lowest frequency in the second 80 MHz corresponds to one 242-tone RU that is allocated to one STA parking on the first frequency domain segment. 20 MHz with a second-lowest frequency in the second 80 MHz corresponds to nine 26-tone RUs that are allocated to nine STAs parking on the second frequency domain segment. 40 MHz with a highest frequency in the second 80 MHz corresponds to a 484-tone RU that is allocated to one STA parking on the first frequency domain segment. For brevity, the third 80 MHz and the fourth 80 MHz are not shown in FIG. 9.

A resource unit allocation indication subfield in the first signaling field that is included in the PPDU and that is transmitted on the first frequency domain segment provides an indication as follows: In ascending order of frequencies, the first 80 MHz corresponds to one 996-tone RU, and a quantity of user fields corresponding to the 996-tone RU is 3 in the user specific field part; the 20 MHz with the lowest frequency in the second 80 MHz corresponds to one 242-tone RU, and a quantity of user fields corresponding to the 242-tone RU is 1 in the user specific field part; the 20 MHz with the second-lowest frequency in the second 80 MHz corresponds to one 242-tone RU, and a quantity of user fields corresponding to the 242-tone RU is 0 in the user specific field part; and the 40 MHz with the highest frequency in the second 80 MHz corresponds to a 484-tone RU, and a quantity of user fields corresponding to the 484-tone RU is 1 in the user specific field part.

It may be learned that, in ascending order of frequencies, an RU corresponding to the second 20 MHz in the second 80 MHz is actually nine 26-tone RUs that are RUs not allocated to the STA parking on the first frequency domain segment. In this case, the STA parking on the first frequency domain segment does not need to focus on a specific STA to which the nine 26-tone RUs are allocated. The resource unit allocation subfield transmitted on the first frequency domain segment may not indicate the 242-tone RU and the nine 26-tone RUs based on an actual case. For example, the resource unit allocation subfield transmitted on the first frequency domain segment indicates that the 20 MHz corresponds to one 242-tone RU, and indicates that a quantity of user fields corresponding to the 242-tone RU is 0. The one 242-tone RU may be understood as the second RU.

In this way, compared with the conventional technology in which nine user fields corresponding to the nine 26-tone RUs need to be set in the user specific field, in this embodiment, the user fields corresponding to the nine 26-tone RUs are not set in the user specific field part in the first signaling field, so that at least nine user fields can be reduced, and overheads of the signaling field can be reduced.

A resource unit allocation subfield in the second signaling field that is included in the PPDU and that is transmitted on the second frequency domain segment provides an indication as follows: In ascending order of frequencies, the first 80 MHz corresponds to one 996-tone RU, and a quantity of user fields corresponding to the 996-tone RU is 0 in the user specific field part; the 20 MHz with the lowest frequency in the second 80 MHz corresponds to one 242-tone RU, and a quantity of user fields corresponding to the 242-tone RU is 0 in the user specific field part; the 20 MHz with the second-lowest frequency in the second 80 MHz corresponds to nine 26-tone RUs, and a quantity of user fields corresponding to the nine 26-tone RUs is 9 in the user specific field part; and the 40 MHz with the highest frequency in the second 80 MHz corresponds to a 484-tone RU, and a quantity of user fields corresponding to the 484-tone RU is 0 in the user specific field part.

It may be learned that, in ascending order of frequencies, the 996-tone RU corresponding to the first 80 MHz, the 242-tone RU corresponding to the 20 MHz frequency with the lowest in the second 80 MHZ, and the 484-tone RU corresponding to the 40 MHz with the highest frequency in the second 80 MHz are RUs not allocated to the STA parking on the second frequency domain segment.

In this way, compared with the conventional technology in which a user field corresponding to the 996-tone RU, a user field corresponding to the 242-tone RU, and a user field corresponding to the 484-tone RU need to be set in the user specific field, in this embodiment, the user field corresponding to the 996-tone RU, the user field corresponding to the 242-tone RU, and the user field corresponding to the 484-tone RU are not set in the user specific field part in the second signaling field, so that the user fields can be effectively reduced, and overheads of the signaling field are reduced.

It may be learned from the foregoing example that, if an RU corresponding to the channel bandwidth for transmitting the PPDU includes a plurality of RUs that are RUs not allocated to a STA parking on a frequency domain segment on which a signaling field is transmitted, a resource unit allocation subfield in the signaling field may indicate the plurality of RUs as one larger RU. In this way, the resource unit allocation subfield may indicate, through simplification, the plurality of RUs not allocated to the STA parking on the frequency domain segment on which the signaling field is transmitted. It should be understood that the following needs to be met in this simplification indication manner: A corresponding index in an RA subfield table (for example, Table 1, Table 2, or Table 3) can indicate the plurality of RUs as one RU together.

For example, in the foregoing example of FIG. 8A, the 242-tone RU and the nine 26-tone RUs are RUs allocated to the STA parking on the second frequency domain segment. An index 01110010 in Table 1 can indicate a 484-tone RU, and indicate that a quantity of user fields corresponding to the 484-tone RU is 0. In this case, the resource unit allocation subfield in the first signaling field may indicate, by using a corresponding index (for example, 01110010), the 242-tone RU and the nine contiguous 26-tone RUs as one 484-tone RU together, and indicate that a quantity of user fields corresponding to the 484-tone RU is 0.

In another implementation, the resource unit allocation subfield transmitted on the first frequency domain segment indicates that the 20 MHz corresponds to one 242-tone RU, and indicates that a quantity of user fields corresponding to the 242-tone RU is 1, and a station identifier carried in the user field does not belong to any station parking on the first frequency domain segment. In this way, compared with the conventional technology in which nine user fields corresponding to the nine 26-tone RUs need to be set in the user specific field, in this embodiment, a user field corresponding to the 242-tone RU is set in the user specific field part in the first signaling field, so that at least eight user fields can be reduced, and overheads of the signaling field can be reduced.

In still another implementation, the resource unit allocation subfield transmitted on the first frequency domain segment indicates that the 20 MHz corresponds to a combination of a plurality of 52-tone RUs and 26-tone RUs such as five RUs: the 52-tone RU, the 52-tone RU, the 26-tone RU, the 52-tone RU, and the 52-tone RU that correspond to 00001111 in Table 1, and indicates that a quantity of user fields corresponding to each RU is 1, and a station identifier carried in the user field does not belong to any station parking on the first frequency domain segment. In this way, compared with the conventional technology in which nine user fields corresponding to the nine 26-tone RUs need to be set in the user specific field, in this embodiment, five user fields corresponding to the five RUs are set in the user specific field part in the first signaling field, so that at least four user fields can be reduced, and overheads of the signaling field can be reduced.

Further, the foregoing plurality of RUs not allocated to the STA parking on the frequency domain segment on which the signaling field is transmitted may be RUs less than a 242-tone RU. Alternatively, the foregoing plurality of RUs may be small RUs. Alternatively, at least a part of subcarriers corresponding to a large RU not allocated to the STA parking on the first frequency domain segment belong to at least two small RUs. In this embodiment of this application, if an RU corresponding to at least 20 MHz in the channel bandwidth for transmitting the PPDU is a plurality of small RUs that are RUs not allocated to a STA parking on a frequency domain segment on which a signaling field is transmitted, a resource unit allocation subfield in the signaling field that is 0f the PPDU and that is transmitted on the frequency domain segment may indicate the plurality of contiguous small RUs as one large RU together, and indicate that a quantity of user fields corresponding to the large RU is 0. It should be understood that the following also needs to be met in this simplification indication manner: A corresponding index in an RA subfield table (for example, Table 1, Table 2, or Table 3) can indicate the plurality of RUs as one RU together.

Figure 10:
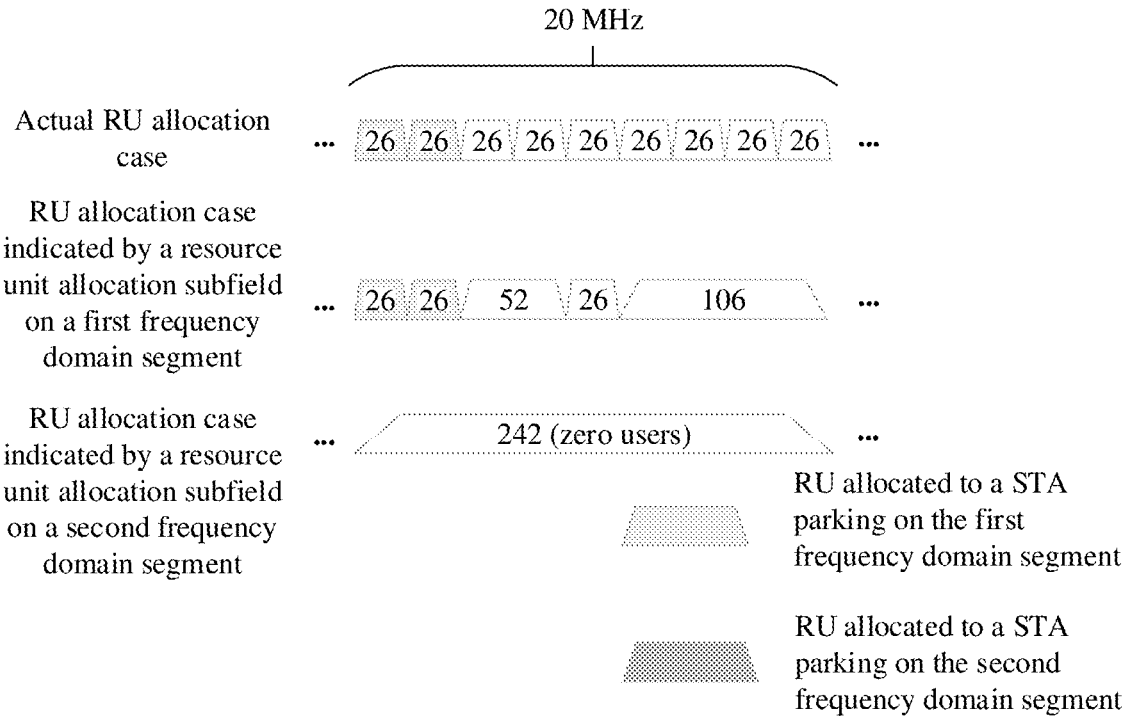
FIG. 10 is a schematic diagram of a resource unit allocation scenario according to still another embodiment of this application.

For example, FIG. 10 is a schematic diagram of a resource unit allocation scenario according to an embodiment of this application. RUs corresponding to 20 MHz in the channel bandwidth for transmitting the PPDU are nine 26-tone RUs. Two 26-tone RUs corresponding to a lowest frequency are RUs allocated to the STA parking on the first frequency domain segment, and the other seven 26-tone RUs are RUs not allocated the STA parking on the first frequency domain segment or the second frequency domain segment. It may be understood that the RUs corresponding to the 20 MHz are RUs not allocated to the STA parking on the second frequency domain segment.

A resource unit allocation subfield that corresponds to the 20 MHz and that is in the signaling field that is included in the PPDU and that is transmitted on the first frequency domain segment indicates that in ascending order of frequencies, RUs corresponding to the 20 MHz successively include two 26-tone RUs, one 52-tone RU, one 26-tone RU, and one 106-tone RU, and each RU corresponds to one user field.

An index 01110001 in Table 1 can indicate a 242-tone RU, and can indicate that a quantity of user fields corresponding to the 242-tone RU is 0. In this case, a resource unit allocation subfield in the signaling field transmitted on the second frequency domain segment may indicate, by using a corresponding index (for example, 01110001), that an RU corresponding to the 20 MHz is one 242-tone RU, and indicate that a quantity of user fields corresponding to the 242-tone RU is 0.

For another example, the nine 26-tone RUs in FIG. 8A are RUs not allocated to the STA parking on the first frequency domain segment. In this case, the resource unit allocation subfield in the first signaling field may indicate, by using an index 01110001, the nine 26-tone RUs as one 242-tone RU together, and indicate that a quantity of user fields corresponding to the 242-tone RU is 0.

In this way, if the conventional technology is used, the resource unit allocation subfield in the signaling field indicates the plurality of small RUs based on an actual case, and the user specific field part in the signaling field needs to include a user field corresponding to each RU in the plurality of small RUs. However, if the solutions of this application are used, the resource unit allocation subfield in the signaling field indicates, as one large RU through combination, the plurality of small RUs of the STA that does not park on the first frequency domain segment, and indicates that a quantity of user fields corresponding to the large RU is 0. In this way, the user specific field part in the signaling field does not include user fields corresponding to the plurality of small RUs, so that the user fields can be effectively reduced, and overheads of the signaling field are reduced.

In some other possible implementations, the resource unit allocation subfield in the signaling field indicates the RU in the foregoing second simplification indication manner.

In this embodiment, the signaling field at least includes a resource unit allocation subfield, and an RU indicated by the resource unit allocation subfield is a plurality of small RUs. Each RU in the plurality of small RUs corresponds to at least one user field. The plurality of small RUs at least include a third RU, and a user field corresponding to the third RU carries an identifier of the STA parking on the first frequency domain segment. A user field corresponding to at least one fourth RU does not carry the identifier of the STA parking on the first frequency domain segment. The fourth RU is actually at least two small RUs not allocated to the STA parking on the first frequency domain segment. Alternatively, at least a part of subcarriers corresponding to the fourth RU belong to at least two RUs.

It may be understood that, if an RU corresponding to one 20 MHz included in the channel bandwidth for transmitting the PPDU is a plurality of small RUs, and the plurality of small RUs includes at least one RU that is an RU allocated to the STA parking on a frequency domain segment on which a signaling field is transmitted, and includes at least two RUs that are RUs not allocated to the STA parking on the frequency domain segment on which the signaling field is transmitted, a resource unit allocation subfield that corresponds to the 20 MHz and that is in the signaling field that is 0f the PPDU and that is transmitted on the frequency domain segment may indicate the at least two RUs as one RU, and indicate that the RU corresponds to one user field. Alternatively, a resource unit allocation subfield corresponding to the 20 MHz may indicate the plurality of RUs as one larger RU, and indicate that the RU corresponds to a same user field. It should be understood that a corresponding index can be found for the larger RU in an RA subfield table.

In this case, a quantity of user fields corresponding to the RU is 1 in a user specific field part. In other words, the at least two RUs correspond to only one user field in total. It may be learned that, compared with a manner in which an indication is provided based on an actual case, in the foregoing content setting manner of the signaling field, at least one user field in the signaling field can be reduced, so that overheads of the signaling field can be reduced.

Figure 11:
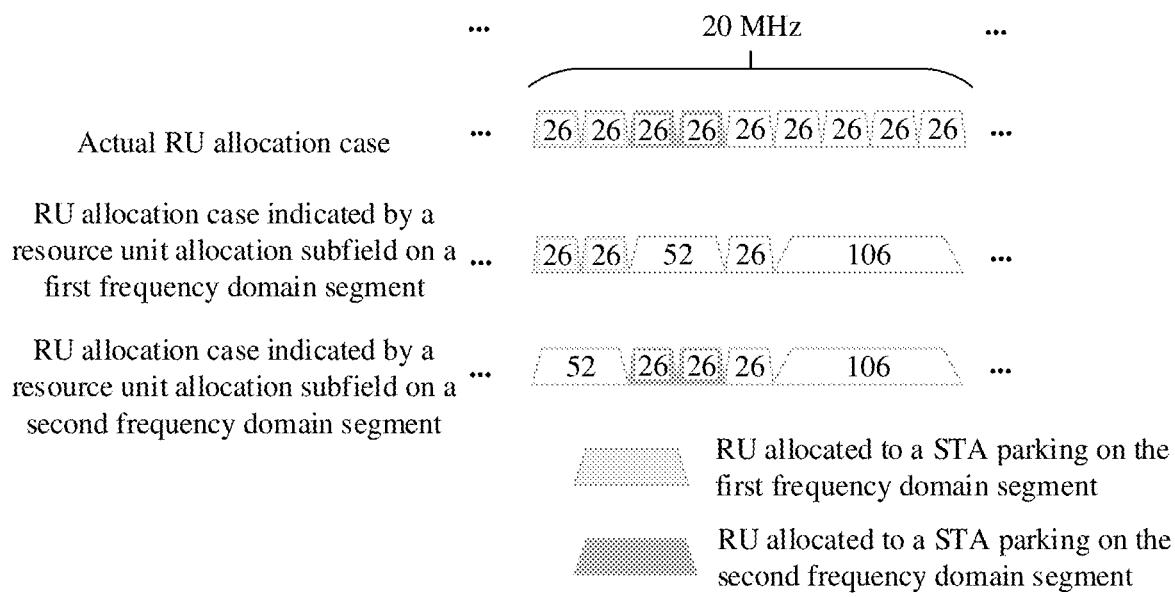
FIG. 11 is a schematic diagram of a resource unit allocation scenario according to yet another embodiment of this application.

For example, FIG. 11 is a schematic diagram of a resource unit allocation scenario according to an embodiment of this application. RUs corresponding to one 20 MHz in the channel bandwidth for transmitting the PPDU are nine 26-tone RUs. In ascending order of frequencies, the first 26-tone RU and the second 26-tone RU are RUs allocated to the STA parking on the first frequency domain segment, and the third 26-tone RU and the fourth 26-tone RU are RUs allocated to the STA parking on the second frequency domain segment.

In the signaling field that is 0f the PPDU and that is transmitted on the first frequency domain segment, a resource unit allocation subfield corresponding to the 20 MHz may indicate a total of five RUs: two 26-tone RUs, one 52-tone RU, one 26-tone RU, and one 106-tone RU.

In the signaling field that is 0f the PPDU and that is transmitted on the second frequency domain segment, a resource unit allocation subfield corresponding to the 20 MHz may indicate a total of five RUs: one 52-tone RU, two 26-tone RUs, one 26-tone RU, and one 106-tone RU.

When an RU indicated by the resource unit allocation subfield in the signaling field is a plurality of small RUs, the user specific field in the signaling field includes one user field corresponding to each small RU. In this case, if the resource unit allocation subfield provides an indication based on an actual RU allocation case, the resource unit allocation subfields that correspond to the 20 MHz and that are on the first frequency domain segment and the second frequency domain segment indicate nine 26-tone RUs. In this case, the user specific field includes nine user fields that are in a one-to-one correspondence with the nine 26-tone RUs indicated by the resource unit allocation subfield. However, if the resource unit allocation subfield provides an indication in the foregoing manner, the resource unit allocation subfield indicates five RUs, and the user specific field part also includes only five user fields corresponding to the RUs indicated by the resource unit allocation subfield.

It may be learned that, in the solutions of this application, the at least two small RUs not allocated to the STA parking on the frequency domain segment on which the signaling field is transmitted are indicated through combination. Therefore, a quantity of user fields corresponding to a plurality of contiguous small RUs not allocated to the STA parking on the frequency domain segment on which the signaling field is transmitted can be reduced in the user specific field part in the signaling field, so that overheads of the signaling field can be reduced.

It should be understood that the second simplification indication manner is not merely used to indicate a small RU, and may also be used to indicate a large RU, or may be used to indicate a large RU and a small RU. In this way, if an RU corresponding to the channel bandwidth for transmitting the PPDU includes at least two RUs that are RUs not allocated to the STA parking on the frequency domain segment on which the signaling field is transmitted, in the signaling field transmitted on the frequency domain segment, the resource unit allocation subfield may indicate the at least two RUs as one larger RU, and indicate that a quantity of user fields corresponding to the larger RU is 1. The at least two RUs may be large RUs, or may be small RUs, or may include at least one small RU and at least one large RU.

The three cases are separately described below by using an example.

For descriptions of an example in which the at least two RUs are large RUs, refer to the foregoing example in FIG. 8A. In the 320 MHz channel bandwidth for transmitting the PPDU, two RUs in the first 80 MHz with a highest frequency are 484-tone RUs (large RU) allocated to the STA parking on the first frequency domain segment, and each 484-tone RU is allocated to two STAs parking on the first frequency domain segment. In this case, in the signaling field transmitted on the second frequency domain segment, the resource unit allocation subfield may indicate the two 484-tone RUs as one 996-tone RU through combination, and indicate that a quantity of user fields corresponding to the 996-tone RU is 1. In this way, compared with the conventional technology in which an indication is provided based on an actual allocation case and four user fields corresponding to the two 484-tone RUs need to be set in the user specific field part, in the solutions of this embodiment, only one user field corresponding to the 996-tone RU needs to be set, so that a quantity of user fields can be reduced, and overheads of signaling fields can be reduced.

Descriptions of an example in which the at least two RUs include at least one small RU and at least one large RU may be based on the foregoing example in FIG. 8A. In the 320 MHz channel bandwidth for transmitting the PPDU, in ascending order of frequencies, 40 MHz with a lowest frequency in the second 80 MHz corresponds to one 242-tone RU (large RU) and nine 26-tone RUs (small RU). The 242-tone RU is allocated to four STAs parking on the second frequency domain segment, and the nine 26-tone RUs are allocated to nine STAs parking on the second frequency domain segment. In this case, in the signaling field transmitted on the first frequency domain segment, the resource unit allocation subfield may indicate the 242-tone RU and the nine 26-tone RUs as one 484-tone RU through combination, and indicate that a quantity of user fields corresponding to the 484-tone RU is 1. In this way, compared with the conventional technology in which an indication is provided based on an actual allocation case and thirteen user fields corresponding to the 242-tone RU and the nine 26-tone RUs need to be set in the user specific field part, in the solutions of this embodiment, only one user field corresponding to the 484-tone RU needs to be set, so that a quantity of user fields can be reduced, and overheads of signaling fields can be reduced.

For descriptions of an example in which the at least two RUs are small RUs, refer to the foregoing example corresponding to FIG. 11. Details are not described herein again.

In the foregoing second simplification indication manner, in the signaling field, the resource unit allocation subfield in the common field part indicates the at least two RUs as one larger RU, and indicates that a quantity of user fields corresponding to the larger RU is 1. In the user specific field part, the user field corresponding to the larger RU may be a special user field, and the special user field is used to indicate that a corresponding RU is not allocated to the station parking on the frequency domain segment on which the signaling field is transmitted. The special user field may be, for example, but is not limited to "2046".

In some optional embodiments, a user field includes a segment indication subfield, and the segment indication subfield is used to indicate a STA corresponding to the user field and a frequency domain segment on which the STA parks to receive the PPDU next time. In other words, the user field includes an identifier of the STA and the segment indication subfield. Optionally, a quantity of bits of the segment indication subfield may be 2. It should be understood that this optional embodiment may be implemented in combination with any one of the foregoing embodiments, or may be separately implemented.

The frequency domain segment on which the STA parks to receive the PPDU next time may be the same as or different from a frequency domain segment on which the STA parks to receive the PPDU this time. For example, if the STA parks on the first frequency domain segment to receive the PPDU this time, the segment indication subfield in the user field corresponding to the STA may indicate the STA to receive the PPDU on the first frequency domain segment next time, or may indicate the STA to receive the PPDU on a frequency domain segment other than the first frequency domain segment next time.

In this way, the signaling field part can indicate the STA to switch a frequency domain segment on which the STA parks, to ensure reliability of indicating the STA to switch the frequency domain segment on which the STA parks.

The following specifically describes a method for indicating an RU by a resource unit allocation subfield in this embodiment of this application.

It should be noted that, in this embodiment of this application, in the method for indicating an RU by a resource unit allocation subfield described next with reference to Table 2 to Table 5, a method for indicating a plurality of RUs through combination or an indication method for allocating a plurality of RUs to one STA may be independently performed.

Referring to Table 2, Table 2 may be understood as an RA subfield table. The resource unit allocation subfield includes two fields that are used to indicate resource unit allocation and combination and that are referred to as a resource unit indication part and a combination indication part herein. The combination indication part is also referred to as an additional field of the resource unit allocation subfield. The resource unit indication is used to indicate a resource unit corresponding to the resource unit allocation subfield, and the combination indication is used to indicate a combination relationship between the resource unit and another resource unit. Table 2 includes an entry indicating to allocate an RU greater than or equal to a 106-tone RU to zero to sixteen STAs.

Specifically, referring to Table 2, the resource unit indication part in the resource unit allocation subfield may be an 8-bit binary string (B7 B6 B5 B4 B3 B2 B1 B0) corresponding to an entry sequence number in the first column in Table 2. For example, a resource unit indication corresponding to an entry 0 is 00000000, a resource unit indication corresponding to an entry 1 is 00000001, and a resource unit indication corresponding to an entry 2 is 00000010. A resource unit indication corresponding to a remaining entry may be analogized, and examples are not provided herein one by one. A resource unit indication of each entry and a corresponding combination indication may be understood as one index.

TABLE 2

| Resource unit allocation subfield RU allocation subfield (B7 B6 B5 B4 B3 B2 B1 B0) (resource unit indication part) | allocation Additional Resource unit subfield RU allocation subfield (B1 B0) (combination indication part) | #1 | #2 | #3 | #4 | #5 | #6 | #7 | #8 | #9 | Quantity of entries |
|---|---|---|---|---|---|---|---|---|---|---|---|
| Entry 0 | 00 | 26 | 26 | 26 | 26 | 26 | 26 | 26 | 26 | 26 | 1 |
|  | 01-11 |  |  |  |  | Reserved |  |  |  |  | 3 |
| Entry 1 | 00 | 26 | 26 | 26 | 26 | 26 | 26 | 26 | 52 |  | 1 |
|  | 01-11 |  |  |  |  | Reserved |  |  |  |  | 3 |
| Entry 2 | 00 | 26 | 26 | 26 | 26 | 26 | 52 |  | 26 | 26 | 1 |
|  | 10 | 26 | 26 | 26 | 26 | 26 | 52 + 26 multi-RU |  |  | 26 | 1 |
|  | 01, 11 |  |  |  |  | Reserved |  |  |  |  | 2 |
| Entry 3 | 00 | 26 | 26 | 26 | 26 | 26 | 52 |  | 52 |  | 1 |
|  | 01-11 |  |  |  |  | Reserved |  |  |  |  | 3 |
| Entry 4 | 00 | 26 | 26 | 52 |  | 26 | 26 | 26 | 26 | 26 | 1 |
|  | 01 | 26 | 26 + 52 multi-RU |  |  | 26 | 26 | 26 | 26 | 26 | 1 |
|  | 10, 11 |  |  |  |  | Reserved |  |  |  |  | 2 |
| Entry 5 | 00 | 26 | 26 | 52 |  | 26 | 26 | 26 | 52 |  | 1 |
|  | 01 | 26 | 26 + 52 multi-RU |  |  | 26 | 26 | 26 | 52 |  | 1 |
|  | 10, 11 |  |  |  |  | Reserved |  |  |  |  | 2 |
| Entry 6 | 00 | 26 | 26 | 52 |  | 26 | 52 |  | 26 | 26 | 1 |
|  | 01 | 26 | 26 + 52 multi-RU |  |  | 26 | 52 |  | 26 | 26 | 1 |
|  | 10 | 26 | 26 | 52 |  | 26 | 52 + 26 multi-RU |  |  | 26 | 1 |
|  | 11 | 26 | 26 + 52 multi-RU |  |  | 26 | 52 + 26 multi-RU |  |  | 26 | 1 |
| Entry 7 | 00 | 26 | 26 | 52 |  | 26 | 52 |  | 52 |  | 1 |
|  | 01 | 26 | 26 + 52 multi-RU |  |  | 26 | 52 |  | 52 |  | 1 |
|  | 10, 11 |  |  |  |  | Reserved |  |  |  |  | 2 |
| Entry 8 | 00 | 52 |  | 26 | 26 | 26 | 26 | 26 | 26 | 26 | 1 |
|  | 01-11 |  |  |  |  | Reserved |  |  |  |  | 3 |
| Entry 9 | 00 | 52 |  | 26 | 26 | 26 | 26 | 26 | 52 |  | 1 |
|  | 01-11 |  |  |  |  | Reserved |  |  |  |  | 3 |
| Entry 10 | 00 | 52 |  | 26 | 26 | 26 | 52 |  | 26 | 26 | 1 |
|  | 10 | 52 |  | 26 | 26 | 26 | 52 + 26 multi-RU |  |  | 26 | 1 |
|  | 01, 11 |  |  |  |  | Reserved |  |  |  |  | 2 |
| Entry 11 | 00 | 52 |  | 26 | 26 | 26 | 52 |  | 52 |  | 1 |
|  | 01-11 |  |  |  |  | Reserved |  |  |  |  | 3 |
| Entry 12 | 00 | 52 |  | 52 |  | 26 | 26 | 26 | 26 | 26 | 1 |
|  | 01-11 |  |  |  |  | Reserved |  |  |  |  | 3 |
| Entry 13 | 00 | 52 |  | 52 |  | 26 | 26 | 26 | 52 |  | 1 |
|  | 01-11 |  |  |  |  | Reserved |  |  |  |  | 3 |
| Entry 14 | 00 | 52 |  | 52 |  | 26 | 52 |  | 26 | 26 | 1 |
|  | 10 | 52 |  | 52 |  | 26 | 52 + 26 multi-RU |  |  | 26 | 1 |
|  | 01, 11 |  |  |  |  | Reserved |  |  |  |  | 2 |
| Entry 15 | 00 | 52 |  | 52 |  | 26 | 52 |  | 52 |  | 1 |
|  | 01-11 |  |  |  |  | Reserved |  |  |  |  | 3 |
| Entries 16 to 23 (00010y2y1y0) |  | 52 |  | 52 |  | — |  | 106 |  |  | 8 |
|  | 01-11 |  |  |  |  | Reserved |  |  |  |  | 24 |
| Entries 24 to 31 (00011y2y1y0) | 00 |  | 106 |  |  | — |  | 52 |  | 52 | 8 |
|  | 01-11 |  |  |  |  | Reserved |  |  |  |  | 24 |
| Entries 32 to 39 (00100y2y1y0) | 00 | 26 | 26 | 26 | 26 | 26 |  | 106 |  |  | 8 |
|  | 10 | 26 | 26 | 26 | 26 |  | 26 + 106 multi-RU |  |  |  | 8 |
|  | 01, 11 |  |  |  |  | Reserved |  |  |  |  | 16 |
| Entries 40 to 47 (00101y2y1y0) | 00 | 26 | 26 | 52 |  | 26 |  | 106 |  |  | 8 |
|  | 01 | 26 | 26 + 52 multi-RU |  |  | 26 | 106 |  |  |  | 8 |
|  | 10 | 26 | 26 | 52 |  |  | 26 + 106 multi-RU |  |  |  | 8 |
|  | 11 | 26 | 26 + 52 multi-RU |  |  |  | 26 + 106 multi-RU |  |  |  | 8 |

TABLE 2-continued

| Resource unit allocation subfield RU allocation subfield (B7 B6 B5 B4 B3 B2 B1 B0) (resource unit indication part) | allocation Additional Resource unit subfield RU allocation subfield (B1 B0) (combination indication part) | #1 | #2 | #3 | #4 | #5 | #6 | #7 | #8 | #9 | Quantity of entries |
|---|---|---|---|---|---|---|---|---|---|---|---|
| Entries 48 to 55 | 00 | | 52 | 26 | 26 | 26 | | 106 | | | 8 |
| (00110y2y1y0) | 10 | | 52 | 26 | 26 | | 26 + 106 multi-RU | | | | 8 |
| | 01, 11 | | | | | Reserved | | | | | 16 |
| Entries 56 to 63 | 00 | | 52 | | 52 | 26 | | 106 | | | 8 |
| (00111y2y1y0) | 10 | | 52 | | 52 | | 26 + 106 multi-RU | | | | 8 |
| | 01, 11 | | | | | Reserved | | | | | 16 |
| Entries 64 to 71 | 00 | | | 106 | | 26 | 26 | 26 | 26 | 26 | 8 |
| (01000y2y1y0) | 01 | | | 106 + 26 multi-RU | | 26 | 26 | 26 | 26 | | 8 |
| | 10, 11 | | | | | Reserved | | | | | 16 |
| Entries 72 to 79 | 00 | | | 106 | | 26 | | 26 | 26 | 52 | 8 |
| (01001y2y1y0) | 01 | | | 106 + 26 multi-RU | | 26 | | 26 | 52 | | 8 |
| | 10, 11 | | | | | Reserved | | | | | 16 |
| Entries 80 to 87 | 00 | | | 106 | | 26 | 52 | | 26 | 26 | 8 |
| (01010y2y1y0) | 01 | | | 106 + 26 multi-RU | | | 52 | | 26 | 26 | 8 |
| | 10 | | | 106 | | 26 | 26 + 52 multi-RU | | 26 | | 8 |
| | 11 | | | 106 + 26 multi-RU | | | 26 + 52 multi-RU | | 26 | | 8 |
| Entries 88 to 95 | 00 | | | 106 | | 26 | 52 | | 52 | | 8 |
| (01011y2y1y0) | 01 | | | 106 + 26 multi-RU | | | 52 | | 52 | | 8 |
| | 10, 11 | | | | | Reserved | | | | | 16 |
| Entries 96 to 111 | 00 | | | 106 | | — | | 106 | | | 16 |
| (0110y1y0z1z0) | 01-11 | | | | | Reserved | | | | | 48 |
| Entry 112 | 00 | | 52 | 52 | — | | 52 | | 52 | | 1 |
| | 01-11 | | | | | Reserved | | | | | 3 |
| Entry 113 | 00 | 242-tone RU empty with zero users (with zero users) | | | | | | | | | 1 |
| | 01 | 242 + 484 multi-RU within 80 MHz (contiguous); contributes zero user fields to the user specific field in the same EHT-SIG content channel as this resource unit allocation subfield (242 + 484 within 80 MHz; contributes zero user fields to the user specific field in the same EHT-SIG content channel as this RU allocation subfield) | | | | | | | | | 1 |
| | 10, 11 | Reserved (reserved) | | | | | | | | | 2 |
| Entry 114 | 00 | 484-tone RU; contributes zero user fields to the user specific field in the same EHT-SIG content channel as this resource unit allocation subfield (contributes zero user fields to the user specific field in the same EHT-SIG content channel as this RU allocation subfield) | | | | | | | | | 1 |
| | 01 | 484 + 242 multi-RU within 80 MHz (contiguous); contributes zero user fields to the user specific field in the same EHT-SIG content channel as this resource unit allocation subfield (484 + 242 within 80 MHz (contiguous); contributes zero user fields to the user specific field in the same EHT-SIG content channel as this RU allocation subfield) | | | | | | | | | 1 |
| | 10 | 484 + 242 multi-RU within 80 MHz (non-contiguous); contributes zero user fields to the user specific field in the same EHT-SIG content channel as this resource unit allocation subfield (484 + 242 within 80 MHz (non-contiguous); contributes zero user fields to the user specific field in the same EHT-SIG content channel as this RU allocation subfield) | | | | | | | | | 1 |
| | 11 | 484 + 996 multi-RU within 160 MHz (contiguous); contributes zero user fields to the user specific field in the same EHT-SIG content channel as this resource unit allocation subfield (484 + 996 within 160 MHz; contributes zero user fields to the user specific field in the same EHT-SIG content channel as this RU allocation subfield) | | | | | | | | | 1 |
| Entry 115 | 00 | 996-tone RU; contributes zero user fields to the user1 specific field in the same EHT-SIG content channel as this resource unit allocation subfield (contributes zero user fields to the user specific field in the same EHT-SIG content channel as this RU allocation subfield) | | | | | | | | | |

TABLE 2-continued

| Resource unit allocation subfield RU allocation subfield (B7 B6 B5 B4 B3 B2 B1 B0) (resource unit indication part) | allocation Additional Resource unit subfield RU allocation subfield (B1 B0) (combination indication part) | #1 | #2 | #3 | #4 | #5 | #6 | #7 | #8 | #9 | Quantity of entries |
|---|---|---|---|---|---|---|---|---|---|---|---|
| | 01 | | 996 + 484 multi-RU within 160 MHz (contiguous); contributes zero user fields to the user specific field in the same EHT-SIG content channel as this resource unit allocation subfield (996-tone RU + 484-tone RU within 160 MHz (contiguous); contributes zero user fields to the user specific field in the same EHT-SIG content channel as this RU allocation subfield) | | | | | | | | 1 |
| | 10 | | 996 + 484 multi-RU within 160 MHz (non-contiguous); contributes zero user fields to the user specific field in the same EHT-SIG content channel as this resource unit allocation subfield (996 + 484 within 160 MHz (non-contiguous); contributes zero user fields to the user specific field in the same EHT-SIG content channel as this RU allocation subfield) | | | | | | | | 1 |
| | 11 | | 996 + 2*996 multi-RU within 320 MHz (contiguous); contributes zero user fields to the user specific field in the same EHT-SIG content channel as this resource unit allocation subfield (996 + 2*996 within 320 MHz; contributes zero user fields to the user specific field in the same EHT-SIG content channel as this RU allocation subfield) | | | | | | | | 1 |
| Entry 116 | 00 | | 2*996-tone RU; contributes zero user fields to the user specific field in the same EHT-SIG content channel as this resource unit allocation subfield (contributes zero user fields to the user specific field in the same EHT-SIG content channel as this RU allocation subfield) | | | | | | | | 1 |
| | 01 | | 2*996 + 996-tone multi-RU within 320 MHz (contiguous); contributes zero user fields to the user specific field in the same EHT-SIG content channel as this resource unit allocation subfield (2*996 + 996 within 320 MHz (contiguous); contributes zero user fields to the user specific field in the same EHT-SIG content channel as this RU allocation subfield) | | | | | | | | 1 |
| | 10 | | 2*996 + 996-tone multi-RU within 320 MHz (non-contiguous); contributes zero user fields to the user specific field in the same EHT-SIG content channel as this resource unit allocation subfield (2*996 + 996 within 320 MHz (non-contiguous); contributes zero user fields to the user specific field in the same EHT-SIG content channel as this RU allocation subfield) | | | | | | | | 1 |
| | 11 | | Reserved (reserved) | | | | | | | | 1 |
| Entries 117 to 127 | 00-11 | | Reserved (reserved) | | | | | | | | 44 |
| Entries 128 to 191 (10y2y1y0z2z1z0) | 00 | 106 | 26 | | 106 | | | | | | 64 |
| | 01 | 106 + 26 multi-RU | | | 106 | | | | | | 64 |
| | 10 | 106 | | | 26+106 multi-RU | | | | | | 64 |
| | 11 | Reserved (reserved) | | | | | | | | | 64 |
| Entries 192 to 207 (1100y3y2y1y0) | 00 | | 242-tone RU | | | | | | | | 16 |
| | 01 | | 242 + 484 multi-RU within 80 MHz (contiguous) (242 + 484 within 80 MHz) | | | | | | | | 16 |
| | 10, 11 | | Reserved (reserved) | | | | | | | | 32 |
| Entries 208 to 223 (1101y3y2y1y0) | 00 | | 484-tone RU | | | | | | | | 16 |
| | 01 | | 484 + 242 multi-RU within 80 MHz (contiguous) (484 + 242 within 80 MHz (contiguous)) | | | | | | | | 16 |
| | 10 | | 484 + 242 multi-RU within 80 MHz (non-contiguous) (484 + 242 within 80 MHz (non-contiguous)) | | | | | | | | 16 |
| | 11 | | 484 + 996 multi-RU within 160 MHz (contiguous) (484 + 996 within 160 MHz) | | | | | | | | 16 |
| Entries 224 to 239 (1110y3y2y1y0) | 00 | | 996-tone RU | | | | | | | | 16 |
| | 01 | | 996 + 484 multi-RU within 160 MHz (contiguous) (996 + 484 within 160 MHz (contiguous)) | | | | | | | | 16 |
| | 10 | | 996 + 484 multi-RU within 160 MHz (non-contiguous) (996 + 484 within 160 MHz (non-contiguous)) | | | | | | | | 16 |

TABLE 2-continued

| Resource unit allocation subfield RU allocation subfield (B7 B6 B5 B4 B3 B2 B1 B0) (resource unit indication part) | allocation Additional Resource unit subfield RU allocation subfield (B1 B0) (combination indication part) | #1 | #2 | #3 | #4 | #5 | #6 | #7 | #8 | #9 | Quantity of entries |
|---|---|---|---|---|---|---|---|---|---|---|---|
| | 11 | 996 + 2*996 multi-RU within 320 MHz (contiguous) (996 + 2*996 within 320 MHz) | | | | | | | | | 16 |
| Entries 240 to 255 (1111y3y2y1y0) | 00 | 2*996-tone RU | | | | | | | | | 16 |
| | 01 | 2*996 + 996-tone multi-RU within 320 MHz (contiguous) (2*996 + 996 within 320 MHz (contiguous)) | | | | | | | | | 16 |
| | 10 | 2*996 + 996-tone multi-RU within 320 MHz (non-contiguous) (2*996 + 996 within 320 MHz (non-contiguous)) | | | | | | | | | 16 |
| | 11 | Reserved (reserved) | | | | | | | | | 16 |

The combination indication part in the resource unit allocation subfield is an entry corresponding to the resource unit indication part in the second column. A row in which the entry corresponding to the resource unit indication part and the entry corresponding to the combination indication part are located correspondingly indicates a size and a location of one or more resource units corresponding to 20 MHz for transmitting the resource unit allocation subfield.

A resource unit less than a 106-tone RU is used to be allocated to only one STA, and a resource unit greater than or equal to the 106-tone RU may be used to allocate to one or more STAs. In 802.11be, the resource unit greater than or equal to the 106-tone RU can be allocated to a maximum of sixteen STAs.

Each resource unit indicated by a resource unit allocation subfield corresponding to each entry in the entries 0 to 15 of the resource unit indication part is used to be allocated to only one STA. In other words, each resource unit indicated by the resource unit allocation subfield corresponding to each entry in the entries 0 to 15 of the resource unit indication is less than the 106-tone RU.

One or more resource units indicated by a resource unit allocation subfield corresponding to each entry the entries 16 to 255 of the resource unit indication part include at least one resource unit greater than or equal to the 106-tone RU. In the one or more resource units indicated by the resource unit allocation subfield corresponding to each entry in the entries 16 to 255 of the resource unit indication, at least one resource unit may be used to be allocated to a plurality of STAs.

As shown in Table 2, the resource unit indication part of the resource unit allocation subfield has 8 bits (B7 B6 B5 B4 B3 B2 B1 B0), and the combination indication part thereof has 2 bits (B1 B0). The resource unit indication part includes 256 entries in total, and each entry 0f the resource unit indication part corresponds to four entries 0f the combination indication part.

A combination indication 00 indicates that an RU is not combined with another RU. In this case, for the entry 0 to the entry 115 in Table 2, if the combination indication is 00, content indicated by the entry 0 to the entry 115 is the same as the entry 0 to the entry 115 in Table 1 provided in 802.11ax.

For a small RU, a combination indication 01 indicates that an RU is combined with an adjacent low-frequency RU into a multi-RU in ascending order of frequencies. For example, for the entry 2 in Table 2, if the combination indication is 01, it indicates that a 26-tone RU with #8 is combined with a low-frequency 52-tone RU on the left into a multi-RU.

A combination indication 10 indicates that an RU is combined with an adjacent high-frequency RU into a multi-RU in ascending order of frequencies.

A combination indication 11 indicates that in RUs corresponding to the resource unit allocation subfield, one RU is combined with an adjacent high-frequency RU into a multi-RU in ascending order of frequencies, and another RU is combined with an adjacent low-frequency RU into a multi-RU. For example, for the entries 40 to 47 in Table 2, if the combination indication is 11, it indicates that a 26-tone RU with 2 # is combined with an adjacent high-frequency 52-tone RU on the right into a multi-RU, and indicates that a 106-tone RU with 6 # is combined with an adjacent low-frequency 26-tone RU on the left into a multi-RU.

Certainly, in another embodiment, meanings of the combination indications 01, 10, and 11 may be exchanged.

For example, the combination indication 01 may indicate that in RUs corresponding to the resource unit allocation subfield, one RU is combined with an adjacent high-frequency RU into a multi-RU in ascending order of frequencies, and another RU is combined with an adjacent low-frequency RU into a multi-RU. The combination indication 10 indicates that an RU is combined with an adjacent low-frequency RU into a multi-RU in ascending order of frequencies. The combination indication 11 indicates that an RU is combined with an adjacent high-frequency RU into a multi-RU in ascending order of frequencies.

For another example, the combination indication 01 indicates that an RU is combined with an adjacent high-frequency RU into a multi-RU in ascending order of frequencies. The combination indication 10 indicates that in RUs corresponding to the resource unit allocation subfield, one RU is combined with an adjacent high-frequency RU into a multi-RU in ascending order of frequencies, and another RU is combined with an adjacent low-frequency RU into a multi-RU. The combination indication 11 indicates that an RU is combined with an adjacent low-frequency RU into a multi-RU in ascending order of frequencies.

In this embodiment of this application, there are a plurality of constraint conditions for combining a plurality of RUs. One constraint condition includes: 1. A small RU is not combined with a large RU. 2. A combination between small RUs does not cross 20 MHz (a combination of small-size RUs shall not cross 20 MHz channel boundary). 3. A combination between small RUs should be contiguous (or adjacent). Based on the foregoing constraint condition, the combination between the small RUs may be a combination between one 52-tone RU and one 26-tone RU that are contiguous within 20 MHz, or a combination between one 106-tone RU and one 26-tone RU that are contiguous within 20 MHz. Locations of one 52-tone RU and one 26-tone RU that are contiguous within 20 MHz may be that the 52-tone RU is located on the left of the 26-tone RU, or may be that the 52-tone RU is located on the right of the 26-tone RU. Locations of one 106-tone RU and one 26-tone RU that are contiguous within 20 MHz may be that the 106-tone RU is located on the left of the 26-tone RU, or may be that the 106-tone RU is located on the right of the 26-tone RU. An RU combination manner with a constraint condition may be referred to as a constrained RU combination manner. In the constrained RU combination manner, balance between combination flexibility and a gain brought by the combination is considered, so that a combination of a plurality of RUs is more appropriate and less complex. Certainly, the RU combination manner may not include any constraint condition, that is, any RUs may be mutually combined. In this case, the combination manner may be referred to as an unconstrained RU combination manner.

In Table 2, an entry indicating a combination between large RUs is added. For example, for the entry 113 to the entry 255, when the combination indication is 10, it can indicate a combination between large RUs.

For ease of understanding, the following specifically describes content indicated by some entries in Table 2.

The entry 113 of the resource unit indication in Table 2 indicates a 242-tone RU, and indicates that the 242-tone RU is not allocated to a STA parking on a frequency domain segment on which the 20 MHz is located. A combination indication 00 corresponding to the entry 113 of the resource unit indication indicates that the 242-tone RU is not combined with another RU into a multi-RU. A combination indication 01 corresponding to the entry 113 of the resource unit indication indicates a 242+484 multi-RU contiguous within 80 MHz, and indicates that the 242+484 multi-RU is obtained by combining a 242-tone RU and a 484-tone RU.

The entry 114 of the resource unit indication in Table 2 indicates a 484-tone RU, and indicates that the 484-tone RU is not allocated to a STA parking on a frequency domain segment on which the 20 MHz is located. A combination indication 00 corresponding to the entry 114 of the resource unit indication indicates that the 484-tone RU is not combined with another RU into a multi-RU. A combination indication 01 corresponding to the entry 114 of the resource unit indication indicates a 484+242 multi-RU contiguous within 80 MHz, and indicates that the 484+242 multi-RU is obtained by combining a 484-tone RU and a 242-tone RU. A combination indication 10 corresponding to the entry 114 of the resource unit indication indicates a 484+242 multi-RU not contiguous within 80 MHz, and indicates that the 484+242 multi-RU is obtained by combining a 484-tone RU and a 242-tone RU. A combination indication 11 corresponding to the entry 114 of the resource unit indication indicates a 484+996 multi-RU contiguous within 160 MHz, and indicates that the 484+996 multi-RU is obtained by combining a 484-tone RU and a 996-tone RU.

The entry 115 of the resource unit indication in Table 2 indicates a 996-tone RU, and indicates that the 996-tone RU is not allocated to a STA parking on a frequency domain segment on which the 20 MHz is located. A combination indication 01 corresponding to the entry 115 of the resource unit indication indicates a 996+484 multi-RU contiguous within 160 MHz, and indicates that the 996+484 multi-RU is obtained by combining a 996-tone RU and a 484-tone RU. A combination indication 10 corresponding to the entry 115 of the resource unit indication indicates a 996+484 multi-RU not contiguous within 160 MHz and indicates that the 996+484 multi-RU is obtained by combining a 996-tone RU and a 484-tone RU. A combination indication 11 corresponding to the entry 115 of the resource unit indication indicates a 996+2*996 multi-RU contiguous within 320 MHz, and indicates that the 996+2*996 multi-RU is obtained by combining a 996-tone RU and a 2*996-tone RU.

The entry 116 of the resource unit indication in Table 2 indicates a 2*996-tone RU, and indicates that the 2*996-tone RU is not allocated to a STA parking on a frequency domain segment on which the 20 MHz is located. A combination indication 00 corresponding to the entry 116 of the resource unit indication indicates that the 2*996-tone RU is not combined with another RU into a multi-RU. A combination indication 01 corresponding to the entry 116 of the resource unit indication indicates a 2*996+996-tone multi-RU contiguous within 320 MHz, and indicates that the 2*996+996-tone multi-RU is obtained by combining a 2*996-tone RU and a 996-tone RU. A combination indication 10 corresponding to the entry 116 of the resource unit indication indicates a 2*996+996-tone multi-RU not contiguous within 320 MHz, and indicates that the 2*996+996-tone multi-RU is obtained by combining a 2*996-tone RU and a 996-tone RU.

The entries 192 to 207 of the resource unit indication in Table 2 indicate a 242-tone RU, and the entries 192 to 207 separately indicate that the 242-tone RU is allocated to one to sixteen STAs. A combination indication 00 corresponding to any one of the entries 192 to 207 of the resource unit indication indicates that the 242-tone RU is not combined with another RU into a multi-RU. A combination indication 01 corresponding to any one of the entries 192 to 207 of the resource unit indication indicates a 242+484 multi-RU contiguous within 80 MHz, and indicates that the 242+484 multi-RU is obtained by combining a 242-tone RU and a 484-tone RU.

The entries 208 to 223 of the resource unit indication in Table 2 indicate a 484-tone RU, and the entries 208 to 223 separately indicate that the 484-tone RU is allocated to one to sixteen STAs. A combination indication 00 corresponding to any one of the entries 208 to 223 of the resource unit indication indicates that the 484-tone RU is not combined with another RU into a multi-RU. A combination indication 01 corresponding to any one of the entries 208 to 223 of the resource unit indication indicates a 484+242 multi-RU contiguous within 80 MHz, and indicates that the 484+242 multi-RU is obtained by combining a 484-tone RU and a 242-tone RU. A combination indication 10 corresponding to any one of the entries 208 to 223 of the resource unit indication indicates a 484+242 multi-RU not contiguous within 80 MHz, and indicates that the 484+242 multi-RU is obtained by combining a 484-tone RU and a 242-tone RU. A combination indication 11 corresponding to any one of the entries 208 to 223 of the resource unit indication indicates a 484+996 multi-RU contiguous within 160 MHz, and indicates that the 484+996 multi-RU is obtained by combining a 484-tone RU and a 996-tone RU.

The entries 224 to 239 of the resource unit indication in Table 2 indicate a 996-tone RU, and the entries 224 to 239 separately indicate that the 996-tone RU is allocated to one to sixteen STAs. A combination indication 00 corresponding to any one of the entries 224 to 239 of the resource unit indication indicates that the 996-tone RU is not combined with another RU into a multi-RU. A combination indication 01 corresponding to any one of the entries 224 to 239 of the resource unit indication indicates a 996+484 multi-RU contiguous within 160 MHz, and indicates that the 996+484 multi-RU is obtained by combining a 996-tone RU and a 484-tone RU. A combination indication 10 corresponding to any one of the entries 224 to 239 of the resource unit indication indicates a 996+484 multi-RU not contiguous within 160 MHz, and indicates that the 996+484 multi-RU is obtained by combining a 996-tone RU and a 484-tone RU. A combination indication 11 corresponding to any one of the entries 224 to 239 of the resource unit indication indicates a 996+2*996 multi-RU contiguous within 320 MHz, and indicates that the 996+2*996 multi-RU is obtained by combining a 996-tone RU and a 2*996-tone RU.

The entries 240 to 255 of the resource unit indication in Table 2 indicate a 2*996-tone RU, and the entries 240 to 255 separately indicate that the 2*996-tone RU is allocated to one to sixteen STAs. A combination indication 00 corresponding to any one of the entries 240 to 255 of the resource unit indication indicates that the 2*996-tone RU is not combined with another RU into a multi-RU. A combination indication 01 corresponding to any one of the entries 240 to 255 of the resource unit indication indicates a 2*996+996-tone multi-RU contiguous within 320 MHz, and indicates that the 2*996+996-tone multi-RU is obtained by combining a 2*996-tone RU and a 996-tone RU. A combination indication 10 corresponding to any one of the entries 240 to 255 of the resource unit indication indicates a 2*996+996-tone multi-RU not contiguous within 320 MHz, and indicates that the 2*996+996-tone multi-RU is obtained by combining a 2*996-tone RU and a 996-tone RU.

In this way, the resource unit allocation subfield indicates RU allocation by using each entry in Table 2 provided in this embodiment of this application, and can indicate sixteen 16 STAs. In addition, in this indication manner, a structure of the resource unit allocation subfield is clearer and simpler. The resource unit indication is used to indicate resource unit allocation and a quantity of corresponding STAs. The combination indication is used to indicate only the combination, does not provide an indication in some cases, and indicates a quantity of users in some other cases.

Figure 12:
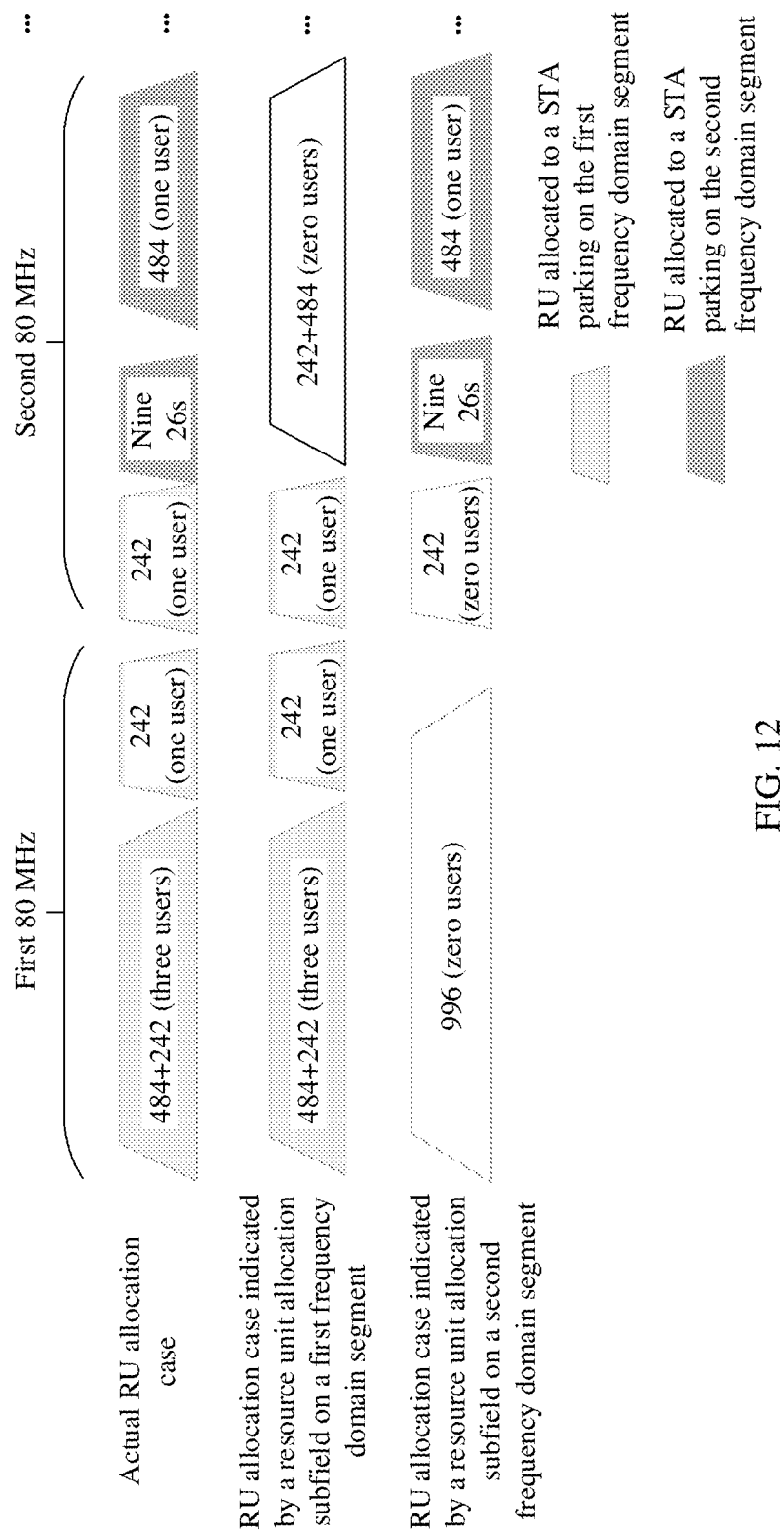
FIG. 12 is a schematic diagram of a resource unit allocation scenario according to still yet another embodiment of this application.

The foregoing embodiment corresponding to FIG. 7A may be alternatively applied to a scenario in which a plurality of RUs are allocated to one STA. In this scenario, the resource unit allocation subfield in the foregoing embodiment corresponding to FIG. 7A may provide an indication by using the entry in Table 2. For example, FIG. 12 is a schematic diagram of a resource unit allocation scenario according to an embodiment of this application. As shown in FIG. 12, the channel bandwidth for transmitting the PPDU is 320 MHZ, and the channel bandwidth for transmitting the PPDU is divided into four frequency domain segments. In ascending order of frequencies, a first frequency domain segment is the first 80 MHz, a second frequency domain segment is the second 80 MHz, a third frequency domain segment is the third 80 MHz, and a fourth frequency domain segment is the fourth 80 MHz. In this embodiment, a first signaling field transmitted on the first frequency domain segment and a second signaling field transmitted on the second frequency domain segment are specifically used as an example for description. Signaling fields transmitted on the third frequency domain segment and the fourth frequency domain segment are not listed one by one in this embodiment.

An actual resource unit allocation case of the 320 MHz is as follows: In ascending order of frequencies, the first 80 MHz corresponds to one 484+242 multi-RU and one 242-tone RU. The 484+242 multi-RU is allocated to three STAs parking on the first frequency domain segment, and the 242-tone RU is allocated to one STA parking on the first frequency domain segment. 20 MHz with a lowest frequency in the second 80 MHz corresponds to one 242-tone RU that is allocated to one STA parking on the first frequency domain segment. 20 MHz with a second-lowest frequency in the second 80 MHz corresponds to nine 26-tone RUs that are allocated to nine STAs parking on the second frequency domain segment. 40 MHz with a highest frequency in the second 80 MHz corresponds to a 484-tone RU that is allocated to one STA parking on the second frequency domain segment. For brevity, the third 80 MHz and the fourth 80 MHz are not shown.

A resource unit allocation subfield in the first signaling field transmitted on the first frequency domain segment provides an indication as follows: The first 80 MHz corresponds to one 484+242 multi-RU and one 242-tone RU, a quantity of user fields corresponding to the 484+242 multi-RU is 3 in the user specific field part, and a quantity of user fields corresponding to the 242-tone RU is 1 in the user specific field part; the 20 MHz with the lowest frequency in the second 80 MHz corresponds to one 242-tone RU, and a quantity of user fields corresponding to the 242-tone RU is 1 in the user specific field part; and one 242-tone RU corresponding to the second 20 MHz in the second 80 MHz and one 484-tone RU corresponding to the 40 MHz with the highest frequency in the second 80 MHz are combined into a multi-RU, and a quantity of user fields corresponding to the multi-RU is 0 in the user specific field part.

In this case, a resource unit allocation subfield corresponding to the first 20 MHz in the first 80 MHz may indicate, by using the combination indication 01 and an entry (that is, 1100y3y2y1y0=11010001) that indicates a 484-tone RU and a quantity 2 of users in the entries 208 to 223 (1100y3y2y1y0) in Table 2, that the 484-tone RU is combined with a 242-tone RU (namely, a 242-tone RU corresponding to 20 MHz with a lowest frequency in the second 40 MHz in the first 80 MHz) contiguous within 80 MHz into a 484+242 multi-RU, and a quantity of user fields corresponding to the 484+242 multi-RU is 2. A resource unit allocation subfield corresponding to the second 20 MHz in the first 80 MHz may indicate, by using the combination indication 01 and an entry (that is, 1100y3y2y1y=11010000) that indicates a 484-tone RU and a quantity 1 of users in the entries 208 to 223 (1100y3y2y1y) in Table 2, that the 484-tone RU is combined with the 242-tone RU (namely, the 242-tone RU corresponding to the 20 MHz with the lowest frequency in the second 40 MHz in the first 80 MHz) contiguous within 80 MHz into a 484+242 multi-RU, and a quantity of user fields corresponding to the 484+242 multi-RU is 1. Similarly, a resource unit allocation subfield corresponding to the third 20 MHz in the first 80 MHz may indicate, by using the combination indication 01 and an entry that indicates a 242-tone RU and a quantity 0 of users in the entries 192 to 207 (1100y3y2y1y0) in Table 2, that the 242-tone RU is combined with a 484-tone RU (namely, a 484-tone RU corresponding to the first 20 MHz and the second 20 MHz in the first 80 MHz) contiguous within 80 MHz into a 242+484 multi-RU, and a quantity of user fields corresponding to the 242+484 multi-RU is 0. It may be learned that the resource unit allocation subfield corresponding to the first 20 MHz, the resource unit allocation subfield corresponding to the second 20 MHZ, and the resource unit allocation subfield corresponding to the third 20 MHz indicate that there are three user fields corresponding to the 484+242 multi-RU in total.

A resource unit allocation subfield that corresponds to the second 20 MHz in the second 80 MHz and that is included in the signaling field, of the PPDU, transmitted on the first frequency domain segment may indicate, by using the entry 113 of the resource unit indication in Table 2 and the combination indication 10 corresponding to the entry 113, that an RU corresponding to the 20 MHz is a 242-tone RU, indicate that the 242-tone RU is combined with a 484-tone RU (namely, a 484-tone RU corresponding to the 40 MHz with the highest frequency in the second 80 MHz) contiguous within 80 MHz into a multi-RU, and indicate that a quantity of user fields corresponding to the multi-RU is 0. Resource unit allocation subfields corresponding to the third 20 MHz and the fourth 20 MHz in the second 80 MHz may indicate, by using the entry 114 of the resource unit indication in Table 2 and the combination indication 01 corresponding to the entry 114, that an RU corresponding to each 20 MHz is a 484-tone RU, indicate that the 484-tone RU is combined with a 242-tone RU (namely, a 242-tone RU corresponding to the second 20 MHz in the second 80 MHz) contiguous within 80 MHz into a multi-RU, and indicate that a quantity of user fields corresponding to the multi-RU is 0.

The resource unit allocation subfield in the foregoing embodiment corresponding to FIG. 7A does not merely provide an indication by using the foregoing example entry in Table 2, and may provide an indication by using another entry in Table 2 based on an actual RU allocation case in another embodiment. In this application, an entry specifically used by the resource unit allocation subfield for providing an indication is not specifically limited.

In addition, the resource unit allocation subfield in the embodiment corresponding to FIG. 7A does not merely provide an indication in the multi-RU indication manner shown in Table 2. There may be another implementation for the multi-RU indication manner.

For example, in another possible implementation, the entries 192 to 255 of the resource unit indication in Table 2 may be replaced with entries 192 to 225 of a resource unit indication in Table 3. Table 3 includes an entry indicating to allocate an RU greater than or equal to the 106-tone RU to zero to sixteen STAs.

TABLE 3

| Resource unit indication part of a resource unit allocation subfield RU allocation subfield (B7, B6, B5, B4, B3, B2, B1, B0) | Combination indication part of a resource unit allocation subfield Additional RU allocation subfield (B1, B0) | #1 | #2 | #3 | #4 | #5 | #6 | #7 | #8 | #9 | Quantity of entries (number of entries) |
|---|---|---|---|---|---|---|---|---|---|---|---|
| Entries 192 to 199 (11000y2y1y0) | 00 | | | | 242-tone RU | | | | | | 8 |
| | 01 | | | | 242+484 multi-RU within 80 MHz (contiguous) (242 + 484 within 80 MHz) | | | | | | 18 |
| | 10, 11 | | | | Reserved (reserved) | | | | | | 16 |
| Entries 200 to 207 (11001y2y1y0) | 00 | | | | 484-tone RU | | | | | | 8 |
| | 01 | | | | 484 + 242 multi-RU within 80 MHz (contiguous) (484 + 242 within 80 MHz (contiguous)) | | | | | | 8 |
| | 10 | | | | 484 + 242 multi-RU within 80 MHz (non-contiguous) (484 + 242 within 80 MHz (non-contiguous)) | | | | | | 8 |
| | 11 | | | | 484 + 996 multi-RU within 160 MHz (contiguous) (484 + 996 within 160 MHz) | | | | | | 8 |
| Entries 208 to 215 (11010y2y1y0) | 00 | | | | 996-tone RU | | | | | | 8 |
| | 01 | | | | 996 + 484 multi-RU within 160 MHz (contiguous) (996 + 484 within 160 MHz (contiguous)) | | | | | | 8 |
| | 10 | | | | 996 + 484 multi-RU within 160 MHz (non-contiguous) (996 + 484 within 160 MHz (non-contiguous)) | | | | | | 8 |
| | 11 | | | | 996 + 2*996 multi-RU within 320 MHz (contiguous) (996 + 2*996 within 320 MHz) | | | | | | 8 |
| Entries 216 to 223 (11011y2y1y0) | 00 | | | | 2*996-tone RU | | | | | | 8 |
| | 01 | | | | 2*996 + 996-tone multi-RU within 320 MHz (contiguous) (2*996 + 996 within 320 MHz (contiguous)) | | | | | | 8 |
| | 10 | | | | 2*996 + 996-tone multi-RU within 320 MHz (non-contiguous) (2*996 + 996 within 320 MHz (non-contiguous)) | | | | | | 8 |
| | 11 | | | | Reserved (reserved) | | | | | | 8 |
| Entries 224 to 231 (11100x2x1x0) | 00 | | | | 242-tone RU | | | | | | 8 |
| | 01 | | | | 242 + 484 multi-RU within 80 MHz (contiguous) (242+484 within 80 MHz) | | | | | | 8 |
| | 10, 11 | | | | Reserved (reserved) | | | | | | 16 |
| Entries 232 to 1239 (11101x2x1x0) | 00 | | | | 48-tone RU | | | | | | 8 |
| | 01 | | | | 484 + 242 multi-RU within 80 MHz (contiguous) (484 + 242 within 80 MHz (contiguous)) | | | | | | 8 |
| | 10 | | | | 484 + 242 multi-RU within 80 MHz (non-contiguous) (484 + 242 within 80 MHz (non-contiguous)) | | | | | | 8 |

TABLE 3-continued

| Resource unit indication part of a resource unit allocation subfield RU allocation subfield (B7, B6, B5, B4, B3, B2, B1, B0) | Combination indication part of a resource unit allocation subfield Additional RU allocation subfield (B1, B0) | #1 | #2 | #3 | #4 | #5 | #6 | #7 | #8 | #9 | Quantity of entries (number of entries) |
|---|---|---|---|---|---|---|---|---|---|---|---|
| | 11 | | | | 484 + 996 multi-RU within 160 MHz (contiguous) (484 + 996 within 160 MHz) | | | | | | 8 |
| Entries 240 to 247 (11110x2x1x0) | 00 | | | | 996-tone RU | | | | | | 8 |
| | 01 | | | | 996 + 484 multi-RU within 160 MHz (contiguous) (996 + 484 within 160 MHz (contiguous)) | | | | | | 8 |
| | 10 | | | | 996 + 484 multi-RU within 160 MHz (non-contiguous) (996 + 484 within 160 MHz (non-contiguous)) | | | | | | 8 |
| | 11 | | | | 996 + 2*996 multi-RU within 320 MHz (contiguous) (996 + 2*996 within 320 MHz) | | | | | | 8 |
| Entries 248 to 255 (11111x2x1x0) | 00 | | | | 2*996-tone RU | | | | | | 8 |
| | 01 | | | | 2*996 + 996-tone multi-RU within 320 MHz (contiguous) (2*996 + 996 within 320 MHz (contiguous)) | | | | | | 8 |
| | 10 | | | | 2*996 + 996-tone multi-RU within 320 MHz (non-contiguous) (2*996 + 996 within 320 MHz (non-contiguous)) | | | | | | 8 |
| | 11 | | | | Reserved (reserved) | | | | | | 8 |

The entries 192 to 199 of the resource unit indication in Table 3 indicate a 242-tone RU, and the entries 192 to 199 separately indicate that the 242-tone RU is allocated to one to eight STAs. A combination indication 00 corresponding to any one of the entries 192 to 199 of the resource unit indication indicates that the 242-tone RU is not combined with another RU into a multi-RU. A combination indication 01 corresponding to any one of the entries 192 to 199 of the resource unit indication indicates that the 242-tone RU is combined with a 484-tone RU into a multi-RU contiguous within 80 MHz.

The entries 200 to 207 of the resource unit indication in Table 3 indicate a 484-tone RU, and the entries 200 to 207 separately indicate that the 484-tone RU is allocated to one to eight STAs. A combination indication 00 corresponding to any one of the entries 200 to 207 of the resource unit indication indicates that the 484-tone RU is not combined with another RU into a multi-RU. A combination indication 01 corresponding to any one of the entries 200 to 207 of the resource unit indication indicates that the 484-tone RU is combined with a 242-tone RU into a multi-RU contiguous within 80 MHz. A combination indication 10 corresponding to any one of the entries 200 to 207 of the resource unit indication indicates that the 484-tone RU is combined with a 242-tone RU into a multi-RU not contiguous within 80 MHz. A combination indication 11 corresponding to any one of the entries 200 to 207 of the resource unit indication indicates that the 484-tone RU is combined with a 996-tone RU into a multi-RU contiguous within 160 MHz.

The entries 208 to 215 of the resource unit indication in Table 3 indicate a 996-tone RU, and the entries 208 to 215 separately indicate that the 996-tone RU is allocated to one to eight STAs. A combination indication 00 corresponding to any one of the entries 208 to 215 of the resource unit indication indicates that the 996-tone RU is not combined with another RU into a multi-RU. A combination indication 01 corresponding to any one of the entries 208 to 215 of the resource unit indication indicates that the 996-tone RU is combined with a 484-tone RU into a multi-RU contiguous within 160 MHz. A combination indication 10 corresponding to any one of the entries 208 to 215 of the resource unit indication indicates that the 996-tone RU is combined with a 484-tone RU into a multi-RU not contiguous within 160 MHz. A combination indication 11 corresponding to any one of the entries 208 to 215 of the resource unit indication indicates that the 996-tone RU is combined with a 2*996-tone RU into a multi-RU contiguous within 320 MHz.

The entries 216 to 223 of the resource unit indication in Table 3 indicate a 2*996-tone RU, and the entries 216 to 223 separately indicate that the 2*996-tone RU is allocated to one to eight STAs. A combination indication 00 corresponding to any one of the entries 216 to 223 of the resource unit indication indicates that the 2*996-tone RU is not combined with another RU into a multi-RU. A combination indication 01 corresponding to any one of the entries 216 to 223 of the resource unit indication indicates that the 2*996-tone RU is combined with a 996-tone RU into a multi-RU contiguous within 320 MHz. A combination indication 10 corresponding to any one of the entries 216 to 223 of the resource unit indication indicates that the 2*996-tone RU is combined with a 996-tone RU into a multi-RU not contiguous within 320 MHz. A combination indication 11 corresponding to any one of the entries 216 to 223 of the resource unit indication is reserved.

The entries 224 to 231 of the resource unit indication in Table 3 indicate a 242-tone RU, and the entries 224 to 231 separately indicate that the 242-tone RU is allocated to nine to sixteen STAs. A combination indication 00 corresponding to any one of the entries 224 to 231 of the resource unit indication indicates that the 242-tone RU is not combined with another RU into a multi-RU. A combination indication 01 corresponding to any one of the entries 224 to 231 of the resource unit indication indicates that the 242-tone RU is combined with a 484-tone RU into a multi-RU contiguous within 80 MHz.

The entries 232 to 239 of the resource unit indication in Table 3 indicate a 484-tone RU, and the entries 232 to 239 separately indicate that the 484-tone RU is allocated to nine to sixteen STAs. A combination indication 00 corresponding to any one of the entries 232 to 239 of the resource unit indication indicates that the 484-tone RU is not combined with another RU into a multi-RU. A combination indication 01 corresponding to any one of the entries 232 to 239 of the resource unit indication indicates that the 484-tone RU is combined with a 242-tone RU into a multi-RU contiguous within 80 MHz. A combination indication 10 corresponding to any one of the entries 232 to 239 of the resource unit indication indicates that the 484-tone RU is combined with a 242-tone RU into a multi-RU not contiguous within 80 MHz. A combination indication 11 corresponding to any one of the entries 232 to 239 of the resource unit indication indicates that the 484-tone RU is combined with a 996-tone RU into a multi-RU contiguous within 160 MHz.

The entries 240 to 237 of the resource unit indication in Table 3 indicate a 996-tone RU, and the entries 240 to 237 separately indicate that the 996-tone RU is allocated to nine to sixteen STAs. A combination indication 00 corresponding to any one of the entries 240 to 237 of the resource unit indication indicates that the 996-tone RU is not combined with another RU into a multi-RU. A combination indication 01 corresponding to any one of the entries 240 to 237 of the resource unit indication indicates that the 996-tone RU is combined with a 484-tone RU into a multi-RU contiguous within 160 MHz. A combination indication 10 corresponding to any one of the entries 240 to 237 of the resource unit indication indicates that the 996-tone RU is combined with a 484-tone RU into a multi-RU not contiguous within 160 MHz. A combination indication 11 corresponding to any one of the entries 240 to 237 of the resource unit indication indicates that the 996-tone RU is combined with a 2*996-tone RU into a multi-RU contiguous within 320 MHz.

The entries 248 to 255 of the resource unit indication in Table 3 indicate a 2*996-tone RU, and the entries 248 to 255 separately indicate that the 2*996-tone RU is allocated to nine to sixteen STAs. A combination indication 00 corresponding to any one of the entries 248 to 255 of the resource unit indication indicates that the 2*996-tone RU is not combined with another RU into a multi-RU. A combination indication 01 corresponding to any one of the entries 248 to 255 of the resource unit indication indicates that the 2*996-tone RU is combined with a 996-tone RU into a multi-RU contiguous within 320 MHz. A combination indication 10 corresponding to any one of the entries 248 to 255 of the resource unit indication indicates that the 2*996-tone RU is combined with a 996-tone RU into a multi-RU not contiguous within 320 MHz. A combination indication 11 is reserved.

The resource unit allocation subfield in the foregoing embodiment corresponding to FIG. 5 or FIG. 7A may provide an indication by using the entry in Table 3. A specifically selected entry may be determined based on an RU allocation case.

This embodiment of this application further provides a solution for indicating an RU through combination. The resource unit allocation subfield includes a resource unit indication and a 2-bit combination indication part. Combination indications in all resource unit allocation subfields corresponding to a large RU cooperate to indicate a combination case of the large RU. The STA determines a combination case of one large RU based on combination indications in all resource unit allocation subfields corresponding to the large RU, and learns of a specific combination location of a multi-RU. An entry 0f the resource unit indication part in any one of the foregoing Table 1, Table 2, or Table 3 may be used for the resource unit indication part.

The solution for indicating an RU through combination may be applied to a data transmission method in an embodiment of this application, and the data transmission method includes:

An AP generates a signaling field of a PPDU, where the signaling field includes at least two resource unit allocation subfields corresponding to one multi-RU, the multi-RU is obtained by combining at least two RUs included in a channel bandwidth for transmitting the PPDU, each resource unit allocation subfield in the at least two resource unit allocation subfields includes an indication part and a combination indication part, and combination indication parts in the at least two resource unit allocation subfields indicate that the at least two RUs are combined into the multi-RU.

The AP sends the signaling field.

Correspondingly, a STA receives the signaling field, to obtain the at least two resource unit allocation subfields in the signaling field.

With reference to Table 4, the following specifically describes the foregoing solution for providing an indication through combination.

Referring to Table 4, a 242-tone RU corresponds to one resource unit allocation subfield, that is, the 242-tone RU corresponds to one 2-bit combination indication. As shown in Table 4, a combination indication 00 indicates that no combination is performed. A combination indication 01 indicates that the 242-tone RU and a 484-tone RU are combined within 80 MHz into one multi-RU. A remaining combination indication (such as 11) may be used as a reserved entry to indicate another RU combination case or indicate other information.

A 484-tone RU corresponds to two resource unit allocation subfields, that is, the 484-tone RU corresponds to two 2-bit combination indications. As shown in Table 4, two combination indications 00 and 00 indicate that no combination is performed. Two combination indications 00 and 01 indicate that the 484-tone RU and a 242-tone RU are combined within 80 MHz into one multi-RU contiguous within 80 MHz. Two combination indications 00 and 10 indicate that the 484-tone RU and a 242-tone RU are combined within 80 MHz into one multi-RU not contiguous within 80 MHz. A remaining combination indication combination (such as 10 and 10, and 10 and 11) may be used as a reserved entry to indicate another RU combination case or indicate other information.

A 996-tone RU corresponds to four resource unit allocation subfields, that is, the 996-tone RU corresponds to four 2-bit combination indications. As shown in Table 4, four combination indications 00, 00, 00, and 00 indicate that no combination is performed. Four combination indications 00, 00, 00, and 01 indicate that the 996-tone RU and a 484-tone RU are combined within 160 MHz into one multi-RU contiguous within 160 MHz. Four combination indications 00, 00, 00, and 10 indicate that the 996-tone RU and a 484-tone RU are combined within 160 MHz into one multi-RU not contiguous within 160 MHz. A remaining combination indication combination (such as four 10s and four 11s) may be used as a reserved entry to indicate another RU combination case or indicate other information.

TABLE 4

| | | |
|---|---|---|
| 242-tone RU | 00 | 242-tone RU |
| | 01 | 242 + 484 multi-RU (combination within 80 MHz) |
| | 10 | Reserved (reserved) |
| | 11 | Reserved (reserved) |
| 484-tone RU | 00 00 | 484-tone RU |
| | 00 01 | 484 + 242 multi-RU (contiguous within 80 MHz) |
| | 00 10 | 484 + 242 multi-RU (non-contiguous within 80 MHz) |
| | . . . | . . . |
| 996-tone RU | 00 00 00 00 | 996-tone RU |
| | 00 00 00 01 | 996 + 484 multi-RU (contiguous within 160 MHz) |
| | 00 00 00 10 | 996 + 484 multi-RU (non-contiguous within 160 MHz) |
| | . . . | . . . |

The resource unit allocation subfield in the foregoing embodiment corresponding to FIG. 7A may provide an indication by using the entry in Table 4. For example, based on the example corresponding to FIG. 12, an actual resource unit allocation case of the 320 MHz is as follows: In ascending order of frequencies, the first 80 MHz corresponds to one 484+242 multi-RU and one 242-tone RU. The 484+242 multi-RU is allocated to three STAs parking on the first frequency domain segment, and the 242-tone RU is allocated to one STA parking on the first frequency domain segment. 20 MHz with a lowest frequency in the second 80 MHz corresponds to one 242-tone RU that is allocated to one STA parking on the first frequency domain segment. 20 MHz with a second-lowest frequency in the second 80 MHz corresponds to nine 26-tone RUs that are allocated to nine STAs parking on the second frequency domain segment. 40 MHz with a highest frequency in the second 80 MHz corresponds to a 484-tone RU that is allocated to one STA parking on the second frequency domain segment.

In this case, resource unit indications in resource unit allocation subfields of the first 20 MHz and the second 20 MHz in the first 80 MHz indicate a 484-tone RU. A combination indication in the resource unit allocation subfield of the first 20 MHz and a combination indication in the resource unit allocation subfield of the second 20 MHz may be respectively 00 and 01. In this case, the two combination indications cooperate to jointly indicate a 484+242 multi-RU. A resource unit indication in a resource unit allocation subfield of the third 20 MHz in the first 80 MHz indicates a 242-tone RU, and a combination indication is 01. In this case, the resource unit allocation subfield indicates that the third 20 MHz corresponds to a 242+484 multi-RU.

This embodiment of this application further provides a solution for indicating an RU through combination.

This application provides a method for indicating a resource unit through combination and a communication apparatus. The method includes: determining a physical layer protocol data unit PPDU, where the PPDU includes a signaling field, the signaling field includes a resource unit allocation subfield and a combination indication corresponding to the resource unit allocation subfield, the resource unit allocation subfield indicates a plurality of resource units, and the combination indication is used to indicate combination information of the plurality of resource units; and sending the PPDU. In the method provided in this application, one or more users may be supported in transmitting data by using a plurality of contiguous or non-contiguous RUs, and a combination case of the plurality of RUs is indicated to the user, to improve RU allocation flexibility of a system, and improve spectrum utilization of the system.

The resource unit allocation subfield includes a resource unit indication and a 2-bit combination indication. Combination indications that are transmitted on one content channel and that are in all resource unit allocation subfields corresponding to one large RU cooperate to indicate a combination case of the large RU. Combination indications that are transmitted on two channels and that are in a plurality of resource unit allocation subfields used to indicate one large RU are the same. In this way, the STA can determine a combination case of one large RU based on combination indications that are transmitted on one content channel and that are in all resource unit allocation subfields corresponding to the large RU.

For example, one 996-tone RU corresponds to four resource unit allocation subfields that are respectively a resource unit allocation subfield 1 to a resource unit allocation subfield 4. A combination indication that is transmitted on a CC1 and that is in the resource unit allocation subfield 1 is the same as a combination indication that is transmitted on a CC2 and that is in the resource unit allocation subfield 2. A combination indication that is transmitted on the CC1 and that is in the resource unit allocation subfield 3 is the same as a combination indication that is transmitted on the CC2 and that is in the resource unit allocation subfield 4.

Specifically, referring to Table 5, a 242-tone RU corresponds to one resource unit allocation subfield, that is, the 242-tone RU corresponds to one 2-bit combination indication. As shown in Table 4, a combination indication 00 indicates that no combination is performed. A combination indication 01 indicates that the 242-tone RU and a 484-tone RU are combined within 80 MHz into one multi-RU. A remaining combination indication (such as 11) may be used as a reserved entry to indicate another RU combination case or indicate other information.

A 484-tone RU corresponds to two resource unit allocation subfields, that is, the 484-tone RU corresponds to two 2-bit combination indications. The two combination indications are respectively transmitted on the CC1 and the CC2. The two combination indications are the same. As shown in Table 5, when two resource unit indications in the two resource unit allocation subfields corresponding to the RU indicate the 484-tone RU, the two combination indications 00 and 00 in the two resource unit allocation subfields are respectively transmitted on the CC1 and the CC2, and a combination indication 00 on either of the CCs indicates that no combination is performed; two combination indications 01 and 01 in the two resource unit allocation subfields are respectively transmitted on the CC1 and the CC2, and a combination indication 01 on either of the CCs indicates that the 484-tone RU and a 242-tone RU are combined within 80 MHz into one multi-RU contiguous within 80 MHz; similarly, two combination indications 10 and 10 in the two resource unit allocation subfields are respectively transmitted on the CC1 and the CC2, and a combination indication 10 on either of the CCs indicates that the 484-tone RU and a 242-tone RU are combined within 80 MHz into one multi-RU not contiguous within 80 MHz; and two combination indications 11 and 11 indicate that the 484-tone RU and a 996-tone RU are combined into one multi-RU.

A 996-tone RU corresponds to four resource unit allocation subfields, that is, the 996-tone RU corresponds to four 2-bit combination indications. The four combination indications are respectively transmitted on the CC1 and the CC2. The first combination indication is transmitted on the CC1, the second combination indication is transmitted on the CC2, the third combination indication is transmitted on the CC1, and the fourth combination indication is transmitted on the CC2. The first combination indication is the same as the second combination indication. The third combination indication is the same as the fourth combination indication.

When RUs indicated by resource unit indication parts in four resource unit allocation subfields corresponding to one RU each are a 996-tone RU, a combination indication may be but is not limited to the following cases.

Four combination indications in the four resource unit allocation subfields are 00, 00, 00, and 00, the first 00 and the third 00 that are transmitted on the CC1 indicate that no combination is performed, and the second 00 and the fourth 00 that are transmitted on the CC2 also indicate that no combination is performed. In practice, when the STA may receive two combination indications 00 and 00 on one CC, the STA may determine that no combination is performed.

Four combination indications in the four resource unit allocation subfields are 00, 00, 01, and 01. The first 00 and the first 01 are transmitted on the CC1, and indicate that the 996-tone RU and a 484-tone RU are combined within 160 MHz into one multi-RU contiguous within 160 MHz. The second 00 and the second 01 are transmitted on the CC2, and also indicate that the 996-tone RU and a 484-tone RU are combined within 160 MHz into one multi-RU contiguous within 80 MHz. In this way, the STA can determine, based on the combination indications 00 and 01 on one CC, that the 996-tone RU and the 484-tone RU are combined within 160 MHz into one multi-RU contiguous within 80 MHz.

Four combination indications in the four resource unit allocation subfields are 00, 00, 10, and 10. The first 00 and the first 10 are transmitted on the CC1, and indicate that the 996-tone RU and a 484-tone RU are combined within 160 MHz into one multi-RU not contiguous within 80 MHz. The second 00 and the second 10 are transmitted on the CC2, and indicate that the 996-tone RU and a 484-tone RU are combined within 160 MHz into one multi-RU not contiguous within 80 MHz.

A remaining combination indication combination (such as four 10s and four 11s) may be used as a reserved entry to indicate another RU combination case or indicate other information.

The resource unit allocation subfield in the foregoing embodiment corresponding to FIG. 7A may provide an indication by using the entry in Table 5. For example, based on the example corresponding to FIG. 12, in ascending order of frequencies, an actual resource unit allocation case of the 320 MHz is as follows: The first 80 MHz corresponds to one 484+242 multi-RU and one 242-tone RU. The 484+242 multi-RU is allocated to three STAs parking on the first frequency domain segment, and the 242-tone RU is allocated to one STA parking on the first frequency domain segment. 20 MHz with a lowest frequency in the second 80 MHz corresponds to one 242-tone RU that is allocated to one STA parking on the first frequency domain segment. 20 MHz with a second-lowest frequency in the second 80 MHz corresponds to nine 26-tone RUs that are allocated to nine STAs parking on the second frequency domain segment. 40 MHz with a highest frequency in the second 80 MHz corresponds to a 484-tone RU that is allocated to one STA parking on the second frequency domain segment.

In this case, resource unit indications in resource unit allocation subfields of the first 20 MHz and the second 20 MHz in the first 80 MHz indicate a 484-tone RU. A combination indication in the resource unit allocation subfield of the first 20 MHz and a combination indication in the resource unit allocation subfield of the second 20 MHz are 01. In this case, either combination indication 01 of the two combination indications 01 can independently indicate a 242+484 multi-RU contiguous within 80 MHz. In this way, when the resource unit allocation subfield of the first 20 MHz and the resource unit allocation subfield of the second 20 MHz are respectively transmitted on the two CCs, because the combination indications are the same, the STA only needs to read the resource unit indication indicating the 484-tone RU and the combination indication 01 that are in the resource unit allocation subfield on one of the CCs, and may determine that an RU indicated by the resource unit allocation subfield is the 242+484 multi-RU contiguous within 80 MHz.

In the foregoing embodiments provided in this application, the method provided in the embodiments of this application is separately described from the perspective of the access point and the station. To implement functions in the method provided in the embodiments of this application, the access point and the station may include a hardware structure and a software module, and implement the foregoing functions in a form of the hardware structure, the software module, or the hardware structure plus the software module. A function in the foregoing functions may be implemented in a form of a hardware structure, a software module, or a combination of the hardware structure and the software module.

TABLE 5

| | | |
|---|---|---|
| 242-tone RU | 00 | 242-tone RU |
| | 01 | 242 + 484 multi-RU (combination within 80 MHz) |
| | 10 | Reserved (reserved) |
| | 11 | Reserved (reserved) |
| 484-tone RU | 00 00 | 484-tone RU |
| | 01 01 | 484 + 242 multi-RU (contiguous within 80 MHz) |
| | 10 10 | 484 + 242 multi-RU (non-contiguous within 80 MHz) |
| | 11 11 | 484 + 996 multi-RU |
| 996-tone RU | 00 00 00 00 | 996-tone RU |
| | 00 00 01 01 | 996 + 484 multi-RU (contiguous within 160 MHz) |
| | 00 00 10 10 | 996 + 484 multi-RU (non-contiguous within 160 MHz) |
| | . . . | . . . |

Figure 13:
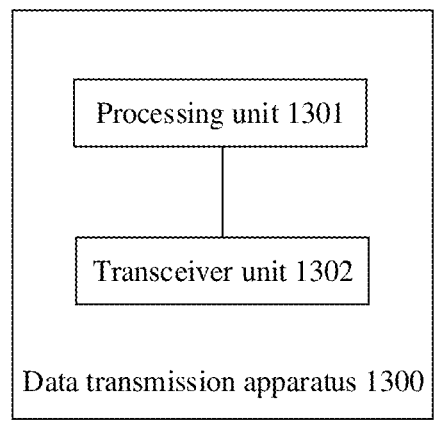
FIG. 13 is a schematic diagram of a module of a data transmission apparatus according to an embodiment of this application.

FIG. 13 is a schematic diagram of a structure of a data transmission apparatus according to an embodiment of this application. A data transmission apparatus 13 includes a processing unit 1301 and a transceiver unit 1302.

The processing unit 1301 is configured to generate a signaling field of a physical layer protocol data unit PPDU, where a channel bandwidth for transmitting the PPDU includes at least two frequency domain segments, and the at least two frequency domain segments include a first frequency domain segment, where the signaling field is transmitted on the first frequency domain segment, and includes a common field and a user specific field, the common field includes a resource unit allocation subfield, and the user specific field includes a user field; the resource unit allocation subfield indicates a resource unit RU included in the channel bandwidth for transmitting the PPDU, and indicates a quantity of user fields corresponding to an RU that is in the RU and that is allocated to a station parking on the first frequency domain segment; and the quantity of user fields corresponding to the RU allocated to the station parking on the first frequency domain segment represents a quantity of user fields that are contributed by the RU to one content channel in the user specific field, and the user field is a user field corresponding to the station parking on the first frequency domain segment.

The transceiver unit 1302 is configured to send the signaling field on the first frequency domain segment.

In this way, in the signaling field transmitted on the first frequency domain segment, the resource unit allocation subfield indicates the resource unit RU included in the channel bandwidth for transmitting the PPDU, and indicates the quantity of user fields corresponding to the RU that is in the RU and that is allocated to the station parking on the first frequency domain segment, but does not indicate, based on an actual resource unit allocation case, a quantity of users not allocated to the station parking on the first frequency domain segment, so that the user field can be simplified. In the user specific field part, a user field corresponding to an RU that does not park on the first frequency domain segment can be omitted or simplified, so that overheads of the signaling field of the PPDU can be reduced by reducing a quantity of user fields.

The data transmission apparatus 1300 may be a communication apparatus or an access point, or the data transmission apparatus may be deployed in a communication apparatus or deployed in an access point. The processing unit 1301 of the data transmission apparatus 1300 may be a processor, and the transceiver unit 1302 of the data transmission apparatus 1300 may be a transceiver.

For function implementation details and technical effects of each functional unit of the data transmission apparatus 1300 provided in this embodiment, refer to descriptions of related details of the method provided in the foregoing method embodiments. Details are not described herein again.

In some embodiments, the resource unit allocation subfield indicates that a quantity of user fields corresponding to an RU that is in the resource unit RU included in the channel bandwidth for transmitting the PPDU and that is not allocated to the station parking on the first frequency domain segment is 0, and the RU not allocated to the station parking on the first frequency domain segment is an RU greater than or equal to a 242-tone RU. In this way, a user field corresponding to the RU greater than or equal to the 242-tone RU can be omitted, so that overheads of the signaling field can be effectively reduced.

In some embodiments, a quantity, indicated by the resource unit allocation subfield, of user fields corresponding to an RU not allocated to the station parking on the first frequency domain segment is less than a quantity of user fields actually corresponding to the RU not allocated to the station parking on the first frequency domain segment. In this way, a quantity of user fields in the signaling field transmitted on the first frequency domain segment can be reduced, so that overheads of the signaling field can be reduced.

In some embodiments, the RU that is indicated by the resource unit allocation subfield and that is not allocated to the station parking on the first frequency domain segment is actually at least two RUs not allocated to the station parking on the first frequency domain segment. In this way, the at least two RUs not allocated to the station parking on the first frequency domain segment are indicated as one RU together, and an indication manner of the resource unit allocation subfield is simplified, so that a quantity of user fields corresponding to the at least two RUs is smaller, and overheads of the signaling field can be reduced.

In some embodiments, the at least two RUs are RUs less than a 242-tone RU. In this way, compared with a conventional technology in which the resource unit allocation subfield provides an indication based on the actual resource unit allocation case and each small RU needs to correspond to one user field, in the solutions of this application, the at least two small RUs allocated to the station parking on the first frequency domain segment are indicated as one RU together. In this way, the RU needs to correspond to only one user field, so that an indication of one user field can be omitted, and overheads of the signaling field can be reduced.

Figure 14:
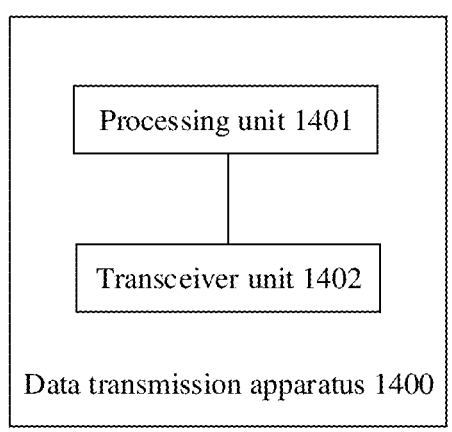
FIG. 14 is a schematic diagram of a module of a data transmission apparatus according to another embodiment of this application.

FIG. 14 is a schematic diagram of a structure of a data transmission apparatus according to an embodiment of this application. This embodiment of this application further provides a data transmission apparatus 1400, including a processing unit 1401 and a transceiver unit 1402.

The transceiver unit 1402 is configured to receive a signaling field of a physical layer protocol data unit PPDU on a first frequency domain segment, where a channel bandwidth for transmitting the PPDU includes at least two frequency domain segments, and the at least two frequency domain segments include the first frequency domain segment, where the signaling field includes a common field and a user specific field, the common field includes a resource unit allocation subfield, and the user specific field includes a user field; the resource unit allocation subfield indicates a resource unit RU in the channel bandwidth for transmitting the PPDU, and indicates a quantity of user fields corresponding to an RU that is in the RU and that is allocated to a station parking on the first frequency domain segment; and the quantity of user fields corresponding to the RU allocated to the station parking on the first frequency domain segment represents a quantity of user fields that are contributed by the RU to one content channel in the user specific field, and the user field is a user field corresponding to the station parking on the first frequency domain segment.

The processing unit 1401 is configured to: obtain, from the user field included in the user specific field in the received signaling field, a user field that carries an identifier of the station, and obtain data transmitted on an RU corresponding to the user field.

The data transmission apparatus may be a communication apparatus or a station, or the data transmission apparatus may be deployed in a communication apparatus or deployed in a station. The processing unit 1401 of the data transmission apparatus 1400 may be a processor, and the transceiver unit 1402 of the data transmission apparatus 1400 may be a transceiver.

In this way, in the signaling field received by the station on the first frequency domain segment, the resource unit allocation subfield indicates the resource unit RU included in the channel bandwidth for transmitting the PPDU, and indicates the quantity of user fields corresponding to the RU that is in the RU and that is allocated to the station parking on the first frequency domain segment, but does not indicate, based on an actual resource unit allocation case, a quantity of users not allocated to the station parking on the first frequency domain segment, so that the user field can be simplified. In the user specific field part, a user field corresponding to an RU that does not park on the first frequency domain segment can be omitted or simplified, so that overheads of the signaling field of the PPDU can be reduced by reducing a quantity of user fields.

For function implementation details and technical effects of each functional unit of the data transmission apparatus 1400 provided in this embodiment, refer to descriptions of related details of the method provided in the foregoing method embodiments. Details are not described herein again.

In some embodiments, the resource unit allocation subfield indicates that a quantity of user fields corresponding to an RU that is in the resource unit RU included in the channel bandwidth for transmitting the PPDU and that is not allocated to the station parking on the first frequency domain segment is 0, and the RU not allocated to the station parking on the first frequency domain segment is an RU greater than or equal to a 242-tone RU. In this way, a user field corresponding to the RU greater than or equal to the 242-tone RU can be omitted, so that overheads of the signaling field can be effectively reduced.

In some embodiments, a quantity, indicated by the resource unit allocation subfield, of user fields corresponding to an RU not allocated to the station parking on the first frequency domain segment is less than a quantity of user fields actually corresponding to the RU not allocated to the station parking on the first frequency domain segment. In this way, a quantity of user fields in the signaling field transmitted on the first frequency domain segment can be reduced, so that overheads of the signaling field can be reduced.

In some embodiments, the RU that is indicated by the resource unit allocation subfield and that is not allocated to the station parking on the first frequency domain segment is actually at least two RUs not allocated to the station parking on the first frequency domain segment. In this way, the at least two RUs not allocated to the station parking on the first frequency domain segment are indicated as one RU together, and an indication manner of the resource unit allocation subfield is simplified, so that a quantity of user fields corresponding to the at least two RUs is smaller, and overheads of the signaling field can be reduced.

In some embodiments, the at least two RUs are RUs less than a 242-tone RU. In this way, compared with a conventional technology in which the resource unit allocation subfield provides an indication based on the actual resource unit allocation case and each small RU needs to correspond to one user field, in the solutions of this application, the at least two small RUs allocated to the station parking on the first frequency domain segment are indicated as one RU together. In this way, the RU needs to correspond to only one user field, so that an indication of one user field can be omitted, and overheads of the signaling field can be reduced.

Figure 15:
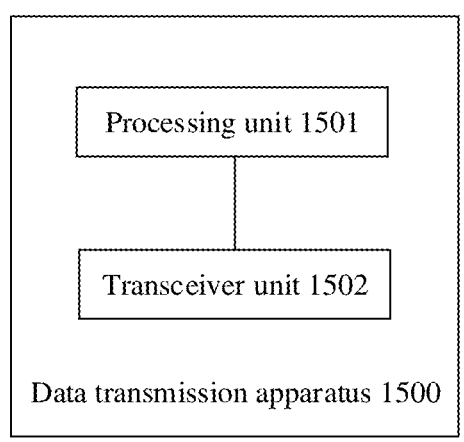
FIG. 15 is a schematic diagram of a module of a data transmission apparatus according to still another embodiment of this application.

FIG. 15 is a schematic diagram of a structure of a data transmission apparatus according to an embodiment of this application. This embodiment of this application further provides a data transmission apparatus 1500, including a processing unit 1501 and a transceiver unit 1502.

The processing unit 1501 is configured to generate a signaling field of a physical layer protocol data unit PPDU, where a channel bandwidth for transmitting the PPDU includes at least two frequency domain segments, and the at least two frequency domain segments include a first frequency domain segment.

The transceiver unit 1502 is configured to send the signaling field on the first frequency domain segment.

The signaling field includes a common field and a user specific field, the common field includes a resource unit allocation subfield, and the user specific field includes a user field; the resource unit allocation subfield indicates a resource unit RU in the channel bandwidth for transmitting the PPDU; an RU indicated by at least one resource unit allocation subfield included in the common field is a plurality of RUs less than a 242-tone RU; and each RU in the plurality of RUs less than the 242-tone RU corresponds to at least one user field, a user field corresponding to at least one first RU carries an identifier of a station parking on the first frequency domain segment, a user field corresponding to at least one second RU does not carry the identifier of the station parking on the first frequency domain segment, and at least a part of subcarriers corresponding to the second RU indicated by the resource unit allocation subfield belong to at least two RUS.

The data transmission apparatus may be a communication apparatus or a station, or the data transmission apparatus may be deployed in a communication apparatus or deployed in a station. The processing unit 1501 of the data transmission apparatus 1500 may be a processor, and the transceiver unit 1502 of the data transmission apparatus 1500 may be a transceiver.

In this way, compared with a manner of indicating the two RUs based on an actual case and indicating that each RU in the at least two RUs corresponds to at least one user field, in the solutions of this application, in the first signaling field transmitted on the first frequency domain segment, the resource unit allocation subfield indicates the at least two RUs as one RU through combination, and the RU corresponds to only one user field. Therefore, a quantity of user fields corresponding to a plurality of contiguous small RUs not allocated to the STA parking on the first frequency domain segment can be effectively reduced, so that overheads of the signaling field can be reduced.

In some embodiments, the resource unit allocation subfield indicates that a quantity of user fields corresponding to an RU that is in the resource unit RU included in the channel bandwidth for transmitting the PPDU and that is not allocated to the station parking on the first frequency domain segment is 0, and the RU not allocated to the station parking on the first frequency domain segment is an RU greater than or equal to a 242-tone RU. In this way, a user field corresponding to the RU greater than or equal to the 242-tone RU can be omitted, so that overheads of the signaling field can be effectively reduced.

In some embodiments, a quantity, indicated by the resource unit allocation subfield, of user fields corresponding to an RU not allocated to the station parking on the first frequency domain segment is less than a quantity of user fields actually corresponding to the RU not allocated to the station parking on the first frequency domain segment. In this way, a quantity of user fields in the signaling field transmitted on the first frequency domain segment can be reduced, so that overheads of the signaling field can be reduced.

In some embodiments, the RU that is indicated by the resource unit allocation subfield and that is not allocated to the station parking on the first frequency domain segment is actually at least two RUs not allocated to the station parking on the first frequency domain segment. In this way, the at least two RUs not allocated to the station parking on the first frequency domain segment are indicated as one RU together, and an indication manner of the resource unit allocation subfield is simplified, so that a quantity of user fields corresponding to the at least two RUs is smaller, and overheads of the signaling field can be reduced.

In some embodiments, the at least two RUs are RUs less than a 242-tone RU. In this way, compared with a conventional technology in which the resource unit allocation subfield provides an indication based on the actual resource unit allocation case and each small RU needs to correspond to one user field, in the solutions of this application, the at least two small RUs allocated to the station parking on the first frequency domain segment are indicated as one RU together. In this way, the RU needs to correspond to only one user field, so that an indication of one user field can be omitted, and overheads of the signaling field can be reduced.

For function implementation details and technical effects of each functional unit of the data transmission apparatus 1500 provided in this embodiment, refer to descriptions of related details of the method provided in the foregoing method embodiments. Details are not described herein again.

Figure 16:
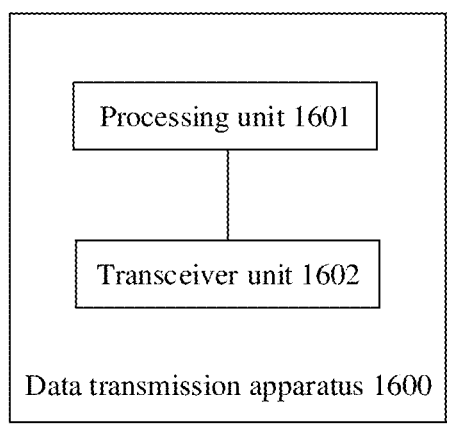
FIG. 16 is a schematic diagram of a module of a data transmission apparatus according to yet another embodiment of this application.

FIG. 16 is a schematic diagram of a structure of a data transmission apparatus according to an embodiment of this application. This embodiment of this application further provides a data transmission apparatus 1600, including a processing unit 1601 and a transceiver unit 1602.

The processing unit 1601 is configured to receive a signaling field of a physical layer protocol data unit PPDU on a first frequency domain segment, where a channel bandwidth for transmitting the PPDU includes at least two frequency domain segments, and the at least two frequency domain segments include the first frequency domain segment, where the signaling field includes a common field and a user specific field, the common field includes a resource unit allocation subfield, and the user specific field includes a user field; the resource unit allocation subfield indicates a resource unit RU in the channel bandwidth for transmitting the PPDU; an RU indicated by at least one resource unit allocation subfield included in the common field is a plurality of RUs less than a 242-tone RU; and each RU in the plurality of RUs less than the 242-tone RU corresponds to at least one user field, a user field corresponding to at least one first RU carries an identifier of a station parking on the first frequency domain segment, a user field corresponding to at least one second RU does not carry the identifier of the station parking on the first frequency domain segment, and at least a part of subcarriers corresponding to the second RU indicated by the resource unit allocation subfield belong to at least two RUs.

The transceiver unit 1602 is configured to: obtain, from the user field included in the user specific field, a user field that carries the identifier of the station, and obtain data transmitted on an RU corresponding to the user field. The data transmission apparatus may be a communication apparatus or a station, or the data transmission apparatus may be deployed in a communication apparatus or deployed in a station.

The data transmission apparatus may be a communication apparatus or a station, or the data transmission apparatus may be deployed in a communication apparatus or deployed in a station. The processing unit 1601 of the data transmission apparatus 1600 may be a processor, and the transceiver unit 1602 of the data transmission apparatus 1600 may be a transceiver.

In this way, in the signaling field received by the station on the first frequency domain segment, the resource unit allocation subfield indicates the resource unit RU included in the channel bandwidth for transmitting the PPDU, and indicates the quantity of user fields corresponding to the RU that is in the RU and that is allocated to the station parking on the first frequency domain segment, but does not indicate, based on an actual resource unit allocation case, a quantity of users not allocated to the station parking on the first frequency domain segment, so that the user field can be simplified. In the user specific field part, a user field corresponding to an RU that does not park on the first frequency domain segment can be omitted or simplified, so that overheads of the signaling field of the PPDU can be reduced by reducing a quantity of user fields.

In some embodiments, the resource unit allocation subfield indicates that a quantity of user fields corresponding to an RU that is in the resource unit RU included in the channel bandwidth for transmitting the PPDU and that is not allocated to the station parking on the first frequency domain segment is 0, and the RU not allocated to the station parking on the first frequency domain segment is an RU greater than or equal to a 242-tone RU. In this way, a user field corresponding to the RU greater than or equal to the 242-tone RU can be omitted, so that overheads of the signaling field can be effectively reduced.

In some embodiments, a quantity, indicated by the resource unit allocation subfield, of user fields corresponding to an RU not allocated to the station parking on the first frequency domain segment is less than a quantity of user fields actually corresponding to the RU not allocated to the station parking on the first frequency domain segment. In this way, a quantity of user fields in the signaling field transmitted on the first frequency domain segment can be reduced, so that overheads of the signaling field can be reduced.

In some embodiments, the RU that is indicated by the resource unit allocation subfield and that is not allocated to the station parking on the first frequency domain segment is actually at least two RUs not allocated to the station parking on the first frequency domain segment. In this way, the at least two RUs not allocated to the station parking on the first frequency domain segment are indicated as one RU together, and an indication manner of the resource unit allocation subfield is simplified, so that a quantity of user fields corresponding to the at least two RUs is smaller, and overheads of the signaling field can be reduced.

In some embodiments, the at least two RUs are RUs less than a 242-tone RU. In this way, compared with a conventional technology in which the resource unit allocation subfield provides an indication based on the actual resource unit allocation case and each small RU needs to correspond to one user field, in the solutions of this application, the at least two small RUs allocated to the station parking on the first frequency domain segment are indicated as one RU together. In this way, the RU needs to correspond to only one user field, so that an indication of one user field can be omitted, and overheads of the signaling field can be reduced.

For function implementation details and technical effects of each functional unit of the data transmission apparatus 1600 provided in this embodiment, refer to descriptions of related details of the method provided in the foregoing method embodiments. Details are not described herein again.

A person skilled in the art may further understand that various illustrative logical blocks (illustrative logical blocks) and steps (steps) that are listed in the embodiments of this application may be implemented by electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of the embodiments of this application.

This application further provides a computer-readable storage medium. The computer-readable storage medium stores a computer program, and when the computer-readable storage medium is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, a solid-state drive (solid-state drive, SSD)), or the like.

A person of ordinary skill in the art may understand that various numerals such as "first" and "second" in this application are merely used for differentiation for ease of description, and are not used to limit the scope of the embodiments of this application or represent a sequence.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
generating a first signaling field of a physical layer protocol data unit (PPDU), wherein a channel bandwidth used to transmit the PPDU comprises at least two frequency domain segments, and the at least two frequency domain segments comprise a first frequency domain segment; and
sending the first signaling field on the first frequency domain segment;
wherein the first signaling field comprises a common field and a user specific field, the common field comprises a resource unit allocation subfield, and the user specific field comprises at least one user field;
wherein the resource unit allocation subfield indicates at least one resource unit (RU)/multi-resource unit (MRU) comprised in the channel bandwidth used to transmit the PPDU, and the resource unit allocation subfield further indicates a first quantity of user fields corresponding to a first RU/MRU that is in the at least one RU/MRU and that is allocated to a station parking on the first frequency domain segment, and a second quantity of user fields corresponding to a second RU/MRU that is in the at least one RU/MRU and that is not allocated to any station parking on the first frequency domain segment, wherein the first quantity of user fields is indicated according to a quantity of stations to which the first RU/MRU is allocated that are parking on the first frequency domain segment, while the second quantity of user fields is not indicated according to the quantity of stations to which the second RU/MRU is allocated that are not parking on the first frequency domain segment; and and wherein the first quantity of user fields indicated by the resource unit allocation subfield corresponding to the first RU/MRU allocated to the station parking on the first frequency domain segment represents a quantity of user fields that are contributed to one content channel in the user specific field, and the second quantity of user fields indicated by the resource unit allocation subfield corresponding to the second RU/MRU allocated to the station parking on the first frequency domain segment represents the quantity of user fields that are contributed to one content channel in the user specific field.

2. The method according to claim 1, wherein the resource unit allocation subfield indicates that a quantity of user fields corresponding to the second RU/MRU is 0, and the second RU/MRU is an RU greater than or equal to a 242-tone RU.

3. The method according to claim 1, wherein an indicated quantity, indicated by the resource unit allocation subfield, of user fields corresponding to the second RU/MRU is less than an actual quantity of user fields actually corresponding to the second RU/MRU.

4. The method according to claim 3, wherein the second RU/MRU that is indicated by the resource unit allocation subfield is actually at least two second RUs/MRUs not allocated to any station parking on the first frequency domain segment.

5. The method according to claim 4, wherein the at least two second RUs/MRUs are RUs/MRUs less than a 242-tone RU.

6. The method according to claim 1, wherein the at least two frequency domain segments further comprise a second frequency domain segment, and when a RU corresponding to a lowest frequency 80 MHz of the channel bandwidth transmitting the PPDU is actually two 484-tone RUs, both of which are not allocated to a station parking on the second frequency domain segment, a resource unit allocation subfield in a second signaling field transmitted in the second frequency domain segment does not precisely indicate the two 484-tone RUs according to an actual quantity of user fields, nor does the resource unit allocation subfield precisely indicate the user field corresponding to the two 484-tone RUs according to the actual quantity of user fields.

7. The method according to claim 1, wherein the at least two frequency domain segments comprise a second frequency domain segment, and when a RU corresponding to a lowest frequency 80 MHz of the channel bandwidth transmitting the PPDU is actually two 484-tone RUs, both of which are not allocated to a station parking on the second frequency domain segment, a resource unit allocation subfield in a second signaling field transmitted in the second frequency domain segment indicates that the RU corresponding to the lowest frequency 80 MHz of the channel bandwidth used to transmit the PPDU is a 996-tone RU, and indicates that a quantity of user fields corresponding to the 996-tone RU in a user specific field is 0.

8. The method according to claim 1, wherein a quantity of resource unit allocation subfields included in the first signaling field corresponds to a size of the channel bandwidth transmitting the PPDU, and each of the resource unit allocation subfields corresponds to a bandwidth of 20 MHz.

9. A method, comprising:

receiving, by a station parking on a first frequency domain segment, a first signaling field of a physical layer protocol data unit (PPDU) on the first frequency domain segment, wherein a channel bandwidth used to transmit the PPDU comprises at least two frequency domain segments, and the at least two frequency domain segments comprise the first frequency domain segment;

wherein the first signaling field comprises a common field and a user specific field, the common field comprises a resource unit allocation subfield, and the user specific field comprises at least one user field;

wherein the resource unit allocation subfield indicates at least one resource unit (RU)/multi-resource unit (MRU) in the channel bandwidth used to transmit the PPDU, and indicates a first quantity of user fields corresponding to a first RU/MRU that is in the at least one RU/MRU and that is allocated to the station parking on the first frequency domain segment, and a second quantity of user fields corresponding to a second RU/MRU that is in the at least one RU/MRU and that is not allocated to any station parking on the first frequency domain segment, wherein the first quantity of user fields is indicated according to a quantity of stations to which the first RU/MRU are allocated that are parking on the first frequency domain segment, while the second quantity of user fields is not indicated according to the quantity of stations to which the second RU/MRU are allocated that are not parking on the first frequency domain segment; and wherein the first quantity of user fields indicated by the first RU/MRU represents a quantity of user fields that are contributed to one content channel in the user specific field that corresponds to the station parking on the first frequency domain segment; and obtaining, by the station parking on the first frequency domain segment from the at least one user field comprised in the user specific field in the first signaling field, a first user field that carries an identifier of the station parking on the first frequency domain segment, and obtaining data transmitted on an RU/MRU corresponding to the first user field, and the second quantity of user fields indicated by the resource unit allocation subfield corresponding to the second RU/MRU allocated to the station parking on the first frequency domain segment represents the quantity of user fields that are contributed to one content channel in the user specific field.

10. The method according to claim 9, wherein the resource unit allocation subfield indicates that a quantity of user fields corresponding to the first RU/MRU is 0, and the second RU/MRU is an RU greater than or equal to a 242-tone RU.

11. The method according to claim 9, wherein an indicated quantity, indicated by the resource unit allocation subfield, of user fields corresponding to the second RU/MRU is less than an actual quantity of user fields actually corresponding to the second RU/MRU.

12. The method according to claim 11, wherein the second RU/MRU that is indicated by the resource unit allocation subfield is actually at least two second RUs/MRUs not allocated to the station parking on the first frequency domain segment.

13. The method according to claim 12, wherein the at least two second RUs/MRUs are RUs/MRUs less than a 242-tone RU.

14. The method according to claim 9, wherein the at least two frequency domain segments further comprise a second frequency domain segment, and when a RU corresponding to a lowest frequency 80 MHz of the channel bandwidth transmitting the PPDU is actually two 484-tone RUs, both of which are not allocated to a station parking on the second frequency domain segment, a resource unit allocation subfield in a second signaling field transmitted in the second frequency domain segment does not precisely indicate the two 484-tone RUs according to an actual quantity of user fields, nor does the resource unit allocation subfield precisely indicate a user field corresponding to the two 484-tone RUs according to the actual quantity of user fields.

15. The method according to claim 9, wherein the at least two frequency domain segments further comprise a second frequency domain segment, and when a RU corresponding to a lowest frequency 80 MHz of the channel bandwidth used to transmit the PPDU is actually two 484-tone RUs, both of which are not allocated to a station parking on the second frequency domain segment, a resource unit allocation subfield in a second signaling field transmitted in the second frequency domain segment indicates that a RU corresponding to the lowest frequency 80 MHz of the channel bandwidth used to transmit the PPDU is a 996-tone RU, and indicates that a quantity of user fields corresponding to the 996-tone RU in a user specific field is 0.

16. The method according to claim 9, wherein a quantity of resource unit allocation subfields included in the first signaling field correspond to a size of the channel bandwidth transmitting the PPDU, and each of the resource unit allocation subfields corresponds to a bandwidth of 20 MHz.

17. A communication apparatus, comprising:
at least one processor; and
at least one transceiver;
wherein when a processor of the at least one processor executes a computer program or instructions in a memory, the processor is configured to:
generate a signaling field of a physical layer protocol data unit (PPDU), wherein a channel bandwidth used to transmit the PPDU comprises at least two frequency domain segments, and the at least two frequency domain segments comprise a first frequency domain segment;
wherein the signaling field is transmitted on the first frequency domain segment, and
comprises a common field and a user specific field, the common field comprises a resource unit allocation subfield, and the user specific field comprises at least one user field; wherein the resource unit allocation subfield indicates at least one resource unit (RU)/multi-resource unit (MRU) comprised in the channel bandwidth used to transmit the PPDU, and indicates a first quantity of user fields corresponding to a first RU/MRU that is in the at least one RU/MRU and that is allocated to a station parking on the first frequency domain segment, and a second quantity of user fields corresponding to a second RU/MRU that is in the at least one RU/MRU and that is not allocated to any station parking on the first frequency domain segment, wherein the first quantity of user fields is indicated according to a quantity of stations to which the first RU/MRU is allocated that are parking on the first frequency domain segment, while the second quantity of user fields is not indicated according to the quantity of stations to which the second RU/MRU is allocated that are not parking on the first frequency domain segment; and
wherein the first quantity of user fields corresponding to the first RU/MRU allocated to the station parking on the first frequency domain segment represents a quantity of user fields that are contributed to one content channel in the user specific field, and the second quantity of user fields indicated by the resource unit allocation subfield corresponding to the second RU/MRU allocated to the station parking on the first frequency domain segment represents the quantity of user fields that are contributed to one content channel in the user specific field; and
wherein a transceiver of the at least one transceiver is configured to send the signaling field on the first frequency domain segment.

18. The communication apparatus according to claim 17, wherein the resource unit allocation subfield indicates that a quantity of user fields corresponding to the second RU/MRU is 0, and the first RU/MRU is an RU greater than or equal to a 242-tone RU.

19. The communication apparatus according to claim 17, wherein an indicated quantity, indicated by the resource unit allocation subfield, of user fields corresponding to the second RU/MRU is less than an actual quantity of user fields actually corresponding to the second RU/MRU.

20. The communication apparatus according to claim 17, wherein the second RU/MRU that is indicated by the resource unit allocation subfield is actually at least two second RUs/MRUs not allocated to the station parking on the first frequency domain segment.

* * * * *